US007523022B2

(12) United States Patent
Thomas et al.

(10) Patent No.: US 7,523,022 B2
(45) Date of Patent: *Apr. 21, 2009

(54) SYSTEM FOR CREATING MEASURED DRAWINGS

(75) Inventors: Paul A. Thomas, San Rafael, CA (US); Trevor J. Vigoren, Petaluma, CA (US); Sean Vikoren, San Rafael, CA (US)

(73) Assignee: Metron Media, Inc., San Rafael, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 11/466,073

(22) Filed: Aug. 21, 2006

(65) Prior Publication Data

US 2006/0282235 A1 Dec. 14, 2006

Related U.S. Application Data

(63) Continuation of application No. 10/145,486, filed on May 14, 2002, now Pat. No. 7,130,774.

(60) Provisional application No. 60/290,968, filed on May 15, 2001.

(51) Int. Cl.
*G06F 17/50* (2006.01)
(52) U.S. Cl. .......................................... 703/1; 345/619
(58) Field of Classification Search ...................... 703/1; 707/103 R; 345/419–421, 619
See application file for complete search history.

(56) References Cited

U.S. PATENT DOCUMENTS

| 4,964,060 | A | * | 10/1990 | Hartsog | 703/1 |
|---|---|---|---|---|---|
| 5,444,836 | A | * | 8/1995 | Hollingsworth et al. | 345/634 |
| 5,552,992 | A | * | 9/1996 | Hunter | 700/118 |
| 5,745,751 | A | * | 4/1998 | Nelson et al. | 707/104.1 |
| 5,950,206 | A | * | 9/1999 | Krause | 707/104.1 |
| 6,014,503 | A | * | 1/2000 | Nagata et al. | 703/1 |
| 6,023,279 | A | * | 2/2000 | Sowizral et al. | 345/421 |
| 6,473,762 | B1 | * | 10/2002 | Knoblock et al. | 707/100 |
| 6,785,423 | B1 | * | 8/2004 | Joshi et al. | 382/235 |
| 6,952,705 | B2 | * | 10/2005 | Knoblock et al. | 707/103 R |

OTHER PUBLICATIONS

Nickerson, S. Report on CART, a computer assisted recording tool, Automation in Construction, vol. 5, Iss. 3, Sep. 1996, pp. 161-170.*

* cited by examiner

*Primary Examiner*—Russell Frejd
(74) *Attorney, Agent, or Firm*—Fliesler Meyer LLP

(57) ABSTRACT

A system for creating as-built or measured drawings is described herein. The invention allows an operator to collect a set of data at a job-site, in such a manner that individual components of the job-site are linked relative to one another and to use that data to create accurate measured drawings that reflect the structure and content layout of the site. A knowledge based system is used to parse the data in real-time to produce a visual indication that the data has been recorded correctly. Error minimizing functions are used to ensure data integrity. The data may then be uploaded to a central computer server, for content-checking, authorization, and archival purposes. Since the invention provides an integrated environment for recording data and creating drawings, the need to translate data between systems is minimized, reducing the possibility of errors due to operator mis-keying or mis-interpretation.

20 Claims, 44 Drawing Sheets

1100

SYSTEM FOR CREATING MEASURED DRAWINGS

CLAIM OF PRIORITY

This application is a continuation of U.S. Patent Application titled "SYSTEM FOR CREATING MEASURED DRAWINGS"; application Ser. No. 10/145,486, filed May 14, 2002, and subsequently issued as U.S. Pat. No. 7,130,774 on Oct. 31, 2006, which claims the benefit of U.S. Provisional Patent Application titled "SYSTEM FOR CREATING MEASURED DRAWINGS"; Application No. 60/290,968, filed May 15, 2001; both of which applications are incorporated herein by reference.

FIELD OF THE INVENTION

The invention relates to computer assisted structural or site data acquisition and rendering systems.

BACKGROUND OF THE INVENTION

Measured drawings, commonly referred to as "as-builts", are a set of architectural line drawings that are made from measurements of existing structures or building sites. These drawings accurately delineate the subject buildings and sites in their current existing condition. Typically used to display information for structural and aesthetic evaluation they are the first documents required in the remodel construction permit process. Thus, a measured drawing is always created after a building or structure is completed, sometimes many weeks, months, or years later. Measured drawings can include a floor plan, site plan, section and elevation drawings as well as structural engineering drawings that illustrate foundation and roof framing details to name a few. As they are defined, measured drawings contrast with architectural construction documents commonly referred to as "blueprints" which are created before the building or structure is built.

Measured drawings are used by a variety of people for a wide range of tasks. They are used for rentable space calculations, real property legal records, facilities management databases, historic structure records and emergency access plans among others. For example, an obvious user is an architectural or construction firm that wishes to ensure a particular building or site was constructed according to the architectural blueprint or design plans. Civil engineers, factory and plant designers, and landscape designers use measured drawings for similar purposes. Other, less obvious users of measured drawings include building and office managers, who may for example wish to determine and track the layout of offices within a particular floor of a building; and facilities managers, who will typically use measured drawings as a precursor to adequately coordinate the installation of facilities (electrical, plumbing, air-conditioning, etc.) after a new building has been completed structurally. Measured drawings are also of great use to the legal and insurance industry for gathering an accurate assay of a building's structural composition; and to emergency (fire, police, rescue) departments for creating accurate maps of major buildings that may at some point be entered or searched. In an increasingly important field, measured drawings are also used prior to renovation of older and perhaps architecturally significant buildings to verify the current state of the building or job-site.

A great advantage of measured drawings over the more ubiquitous and commonly known "blueprint" style of drawing is that a measured drawing takes into account and reflects any changes made to the building or structure subsequent to the initial construction period. Blueprints are almost never updated to reflect minor structural changes, such as moving doorways or windows, and are rarely updated to reflect even major changes, such as wall and ceiling modifications, and "add-ons". For some buildings, such as an old or domestic residence, a blueprint may never have existed, and if one does exist it is likely to be out of date and unuseable. Additionally, measured drawings can include features such as cabinets, fittings, fixtures and furniture, that may never have been specified in a blueprint or original floor plan.

The traditional process of gathering data for these unique drawings has not changed, employing limited technology and no standard methodology. The practitioner, usually an engineer or architect, must rely on his or her own logic. The typical solution has been a two person team of operators, armed with a camera, tape measure, pencil and sketchpad, who visits the job-site (a building, plant, engineering project or work area). The team takes a variety of measurements at each location (in each room of a building for example), and sketches a diagram with annotations for every line on the paper. The structural data, in the form of these photos, notes and sketches is then taken back to the office for transcribing into measured drawings, with either pencil and straight edge, or with the aid of a computer aided drawing (CAD) application.

Clearly, the traditional process is lacking in a standard methodology in which data is collected and verified. There are no set rules as to whether a sketch should be created for every structural element prior to leaving the work site, and there are no fixed links between the data measured and the sketch drawn—both are somewhat subjectively generated and dependent on the skill of the measurer/drawer respectively. The accuracy of the final measured drawing is dependent on a number of factors:

First, the skill of the operator in taking the initial measurements, and the accuracy of his/her instruments may effect the accuracy of the data. Skilled operators will obviously take better measurements than un-skilled operators, but sometimes even operators of equal skill have to make judgment calls as to how to proceed, and at that point their determinations may differ. Since the traditional process affords no rigorous schema or guidelines for taking measurements, discrepancies may creep in when two or more operators are working on the same job-site (as is a common occurrence). Furthermore, using traditional methods, measurements are most often manually taken (for example with a measuring tape), and then manually recorded (on paper). Very little automatic measuring/recording is ever used.

Second, there is no link between taking measurements and linking the measurements of one structural feature or one object to another. The operator takes a set of measurements and records them on paper (such as for example, wall 1: length, 12 feet; height, 8 feet). The next entry may be for another wall (wall 2: length, 8 feet; height, 8 feet), but no attempt is made to link or relate the two walls (entries) to one another. Typically, the only link that exists between two such entries is that the surveyor or operator personally knows them to be, say, at a right angle to each other, or has taken the foresight to sketch the walls appropriately. Such subjectiveness in linking structural components (walls, windows, and other objects such as doors and furniture) means that most often only the operator who sketched and noted the initial on-site measurements is fully knowledgeable or even capable of reading or deciphering those same measurements back in the office to create the final measured drawings.

Third, there is a loss of accuracy due to translation between systems. The traditional process of creating measured drawings involves a lot of translation between systems, some being manual (pen and paper-based) while others being automated or computerized (like CAD applications). The initial measurements are typically taken by a surveyor or contractor. As used herein the terms surveyor, contractor, and operator are used to refer to any person recording data for use in creating measured drawings, or using said data to actually create the drawings. Sometimes more than one surveyor will work at a job-site and these surveyors may use different systems for taking measurements, and different notations, etc. At some point each note on every sketch must be translated to a data format that is compatible with the drawing system, be it man or machine. The individual measurements need to be collected and someone must manually translate the measurements into a cohesive, consistent format. Errors may often creep in to the data at this point. The translation from sketch to CAD data is typically done by the CAD operator while creating the final CAD drawing. This is done according to his/her interpretation of the sketched drawing, one line at a time, which is again a potential source of error. When the sketch data does not translate to a perfect drawing, a skilled CAD operator will make adjustments, often according to their own subjectiveness to produce what appears to be the correct final drawing. Since so many individuals are involved, often using slightly different methods of interpretation, the traditional methods of creating measured drawings lack consistency, and it is not uncommon for two independent surveyors to create very different measured drawings for the exact same building.

There have been attempts to address the problems associated with the traditional measured drawings process. These include the PenMap application from Penmetrics, Inc. and the PlanSurveyor application from InfoQuest Technologies, Inc. Both of these systems utilize a computerized sketch pad and custom CAD software designed specifically to facilitate drawing of each element of a structure while walking the site. This approach does not provide a data acquisition procedure and requires the user to function as the data input/output, storage, KBS, and the draftsperson simultaneously. These systems replace the pencil and paper used in the traditional method, and as such are more convenient, but otherwise provide little other benefit. Other available systems incorporate automated measuring devices such as scanning lasers and photogrammetry, which are very sophisticated technology with limited application, are often difficult to use, and drive the cost of producing measured drawings upwards and beyond the reach of many potential consumers. What is needed is a system and a method that not only addresses the problems associated with the traditional method, namely the reliance on operator skill, the lack of relational linking between structural objects, and the loss of accuracy due to multiple translation between systems, but does so rapidly, conveniently, and at a cost that is desirable or accessible to the majority of consumers.

SUMMARY OF THE INVENTION

In accordance with the present invention a system and a method for creating as-built or measured drawings is described herein. The invention allows a surveyor, contractor or other equivalent operator to methodically collect a set of data at a job-site, and to use that data to create accurate measured drawings that reflect the structure, composition and content layout of the site. Data is collected in such a manner that individual components of the job-site are recorded relative to one another. This allows for a more rapid and convenient input of the data compared to traditional methods. The data collected comprises a series of entries, one for each structural element, that are linked by a relationship that mimics their real-world structural relationship. This may be a hierarchical linkage, in that one structural element is a member, or a subset, of another element (a parent element), or the linkage may instead be a functional linkage, in that one element has a direct interaction or effect on another element, or serves to further qualify its properties in some manner. The linkage may even be a purely vector linkage, simply linking the spatial position of one element to that of another element.

In some embodiments, a Knowledge-Based System (KBS) may be used to parse the data in real-time (i.e. at the job-site) to produce and display a drawing or a visual indication that the data has in fact been recorded correctly. The KBS contains a knowledge base of information which it uses to process and understand the relational linkage data generated by the recording process. Since the KBS understands the various means of linkage used by the system and the operator, and how the data may be variably recorded for structural elements depending on the methods used by the operator, it can generate an accurate and complete set of image data from the raw recorded data. Such recorded data may even be incomplete or contain subjective values, and the KBS system will attempt to validate it and use it to create the final measured drawing.

The recorded data may in some embodiments of the invention be subsequently uploaded to or stored on a central computer server, for content-checking authorization and archival purposes. Since data is often recorded subjectively, the ability to verify it and standardize it when necessary is a valuable asset. Distributed login mechanisms allow for secure authorization on an individual job-site basis, and further allows sharing of job-site data between many users.

The invention eliminates the need to switch between separate systems to perform recording and displaying tasks. Minimizing the need to translate data between systems reduces the possibility of errors due to operator mis-keying or misinterpretation. The combination of ease of data entry, ability to verify data, and reduction in data error, combined with the flexibility to share data with other third-party systems ensures the invention addresses the increasing demand for accurate and re-useable measured drawings.

DETAILED DESCRIPTION

In accordance with the present invention, a system and a method for creating as-built or measured drawings is described herein. Roughly described, the invention allows a surveyor or an equivalent operator to methodically collect a set of data, verify the data accuracy at a job-site, and to use that data to create accurate measured drawings that reflect the structure, composition and content layout of the job-site. A "Grapher" application is used to collect data and to create on-site measured drawings as desired, allowing the operator to verify their data. An optional "player" application can also be used to provide more sophisticated data editing and drawing capabilities. As used herein, the terms "site" and "job-site" are used to refer to any building, structure, or area for which measured drawings are desired. The data acquisition method and object data collected are structured and stored in such a manner that the individual components of the job-site are linked and recorded relative to one another. This allows for a more logical, accurate, rapid and convenient input of data compared to more traditional methods. In some embodiments a Knowledge Based System (KBS) may be used to parse the data in real-time (i.e. at the job-site) to produce a display of the job-site, or some other visual indication that the data has been recorded correctly. As used herein, the term "KBS" is used to refer to any database or repository of information that is used to describe individual building or structure elements, their functional or other attributes and their hierarchical placement or linkage within the framework of all structure elements. The data may in some embodiments of the invention be then uploaded or stored on a central computer server, for content-checking, authorization and archival purposes. Since the invention minimizes the need to translate data between systems it reduces the possibility of errors due to operator mis-keying or mis-interpretation.

Data Mapping

Figure 1:
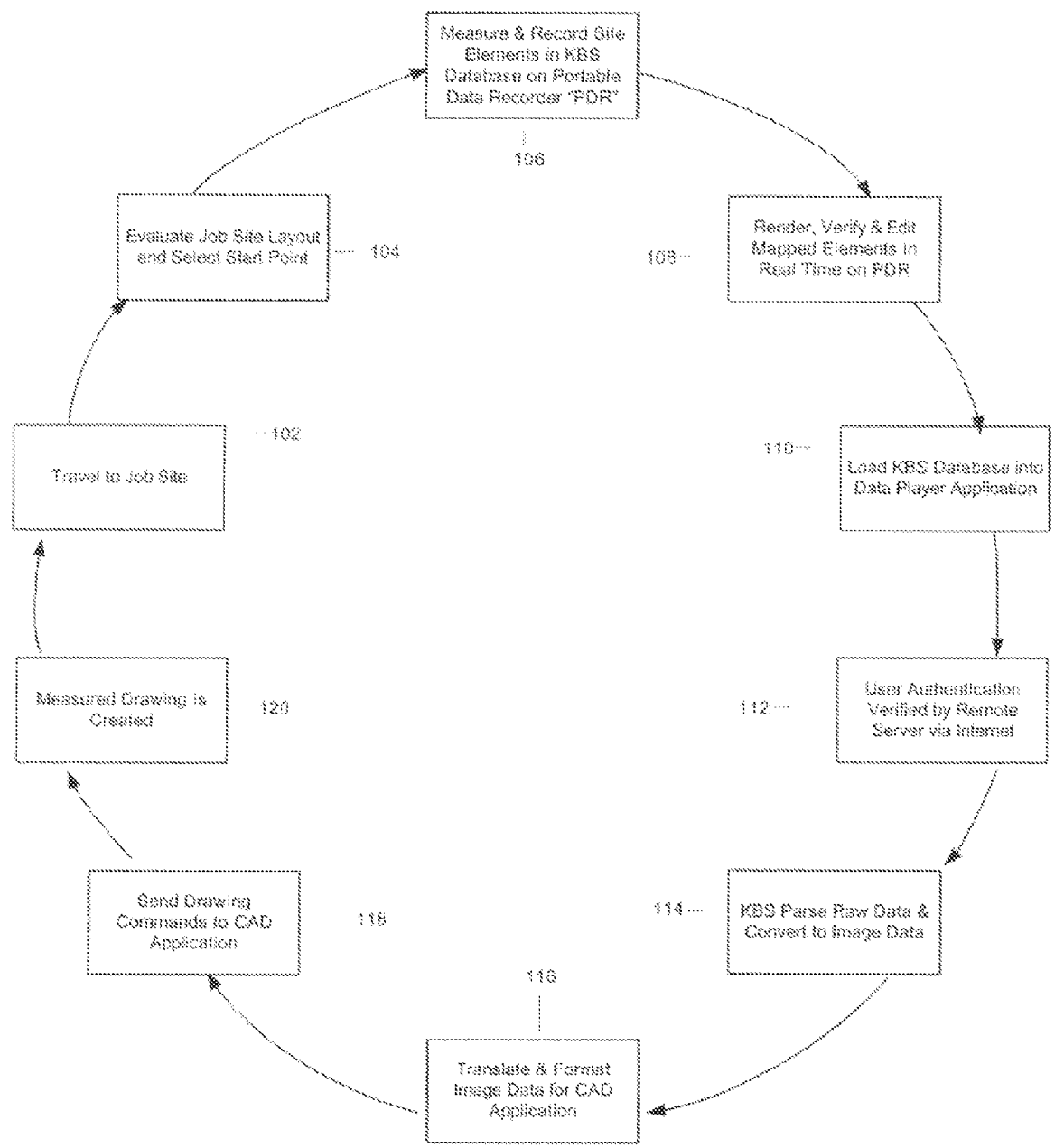
FIG. 1 shows a schematic of a process in accordance with an embodiment of the invention.

FIG. 1 illustrates a schematic overview of a method incorporating the invention for producing measured or as-built drawings. As shown in FIG. 1, the process may begin with an operator, user, or subcontractor being contracted to create a measured drawing of a particular building or job site. The system is particularly well suited to allowing subcontractors to operate the invention, since the initial training as to the method and procedure of how to add structural elements and their statistics to the database software application are minimal, and in several embodiments the system further includes features that allow geographically distributed subcontractors to share information stored at a central location, and to be authorized by a central login process.

As part of the initial data mapping process the operator makes a visit to the job-site in step 102. As referred to herein the job-site may comprise a building, a series of buildings, a particular floor (or floors) of a building, a factory, a civil engineering project, or any other physical location, construction site or land use. The most common job-site requiring measured drawings is a building floor, and so this specific example is widely used throughout this document to better illustrate the novel aspects of the invention. It will be evident to those skilled in the art that other types of job-sites may be measured, drawn, or mapped, while remaining within the spirit and scope of the invention.

On arriving at the job-site the operator will typically walk the site in order to record the necessary data to create the measured drawings (step 104). In accordance with an embodiment of the invention the operator carries a small hand-held data recording device. This may be a computer, for example a laptop or notebook computer, a handheld computer, a portable data assistant (PDA), or a dedicated data recording device. Operator-wearable devices can also be used, including those with touch-screen displays or heads-up visual display monitors. A serial, infra-red (IR) or radio frequency (RF) interface allows the data recording device to receive input from a variety of manual, operator-assisted, or automatic data input devices.

In step 106 the recorded data is recorded and stored in the data recording device using a "Grapher" application, for later use in creating the measured drawing. The invention utilizes a novel method of recording and storing data that allows for optimal speed in adding structural elements and their statistics to the database, reducing the amount of time the operator needs to spend at the job-site, and minimizing the chance of data entry error.

In one embodiment, the operator may choose, in step 108, to verify the recorded data in real-time, i.e. while still at the job-site. The Grapher application may thus be used to create measured drawings on-site if desired. The invention allows for various means of data verification, some automatic or KBS-based, others manual or operator-assisted. This presents a great improvement over traditional methods. Allowing the operator to view their recorded data in an easy-to-understand and easy-to-verify manner virtually eliminates the need for subsequent trips back to the job-site to recapture or clarify missing information.

When the operator is satisfied with the recorded data, they may synchronize or otherwise load their data into the data player application or "player" application (step 110). Since many operators, often at different contractor firms or organizations, may share a common job-site, or alternatively be prohibited from working on certain job-sites, the login process (step 112) may include routines to authorize a user or operator to work on a specific job-site or project. The login process may additionally include routines that check the validity of the recorded data against a centralized knowledge base of information, archive the data as a form of backup or update the data player application with new software patches or job-site information.

Following the login process, the data player application can be used to analyze or parse the recorded data (step 114). At this point in the process a copy of the data may be retrieved into a local database for further manipulation without affecting the authenticity of the originally-recorded data. The working data is converted to render data (step 114), in conjunction with a KBS system or a KBS-like database, to interpret the original recorded data and convert it into a set of drawing components, i.e., points, lines and arcs with their relative Cartesian coordinates. This amounts to a conversion of the data from the systems proprietary, yet easily-recorded, syntax into syntax that is translated and formatted for a computer aided drawing (CAD) application, or it may be output to file (step 116).

To allow for future expansion, and interoperability with other, third-party applications, such as CAD packages and their equivalents, an embodiment of the invention includes a translator for translating the rendered data into a format readily exportable to other systems and applications. As shown in step 118, in some embodiments the invention translates the rendered data into a drawing data format that can be used by, for example, an AutoCAD system (produced by AutoCAD, Inc.). The measured drawing is then created (step 120). This process allows an operator complete freedom of choice as to which software application he or she wishes to use to create the final measured drawing. Including a translator in this manner ensures that the invention can be incorporated into existing production environments without the need to change or to supplement existing file formats, and without requiring extensive operator re-training.

Having created the measured drawing, the operator may eventually decide that some elements of the job site were recorded incorrectly, perhaps in response to using an error-minimizing function on the data, an example of which is described below. In these instances, the operator may choose to revise a portion or all of the measurement data, and the process begins again with step 106.

Figure 2:
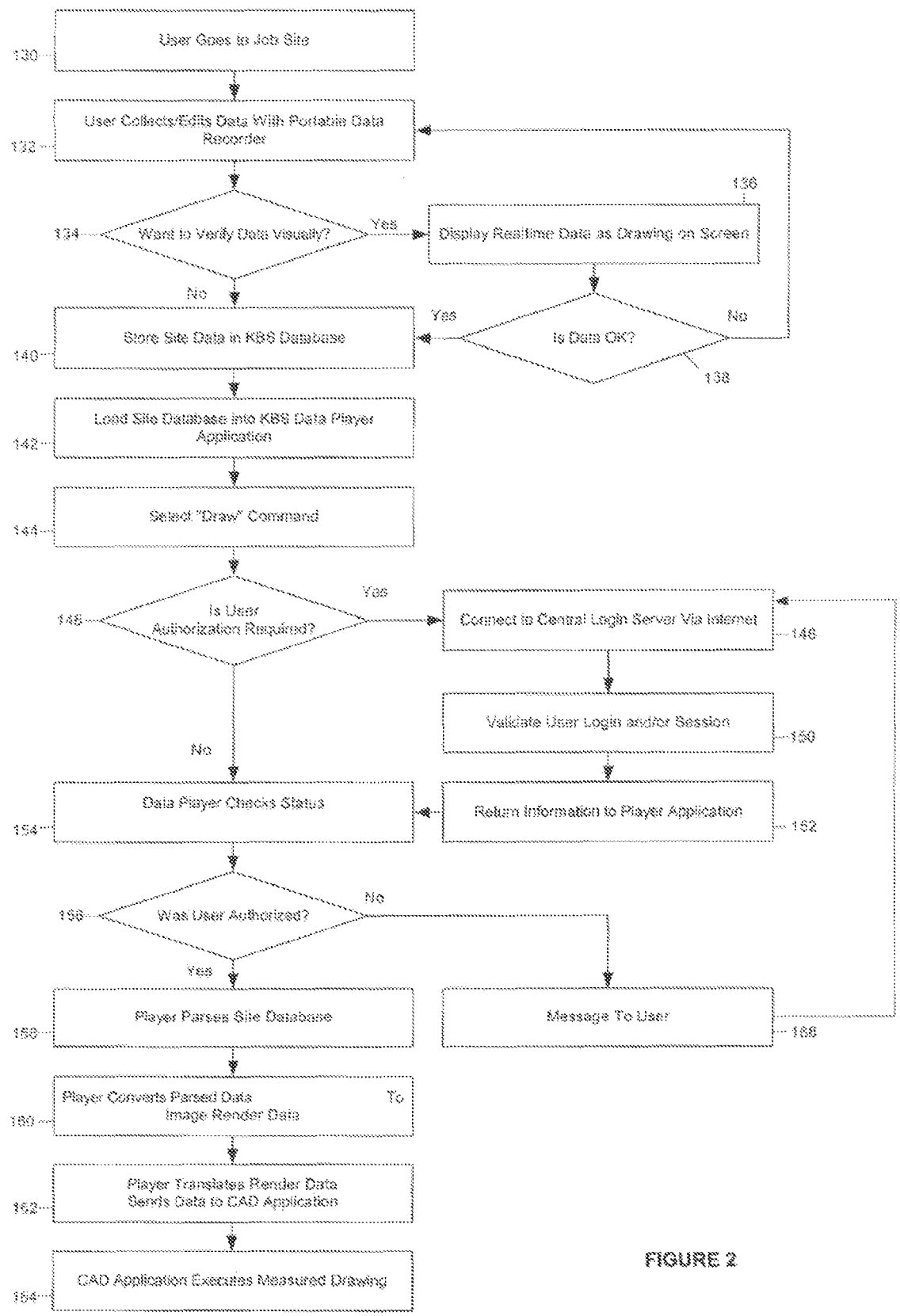
FIG. 2 shows a flowchart of a process in accordance with an embodiment of the invention.

FIG. 2 illustrates a flowchart detailing the steps required to create a measured drawing in accordance with the invention. In step 130, a user or operator visits the job-site. Data is collected with a portable data recorder or Grapher application as the operator walks around the site in step 132. The operator may at any point choose to verify, in step 134, that the data which has been recorded accurately reflects the job-site itself, for example a building, or an individual floor of a building. If the operator does choose to verify the data, then a drawing of the job-site is displayed in real-time on the data recorder's display screen as shown in step 136. The operator can readily and easily compare this generated drawing to the actual layout of the job-site and ensure the data has been recorded properly as shown by step 138. When satisfied that the data is an accurate representative of the physical site, the data is written to, or stored in, a working database in step 140. The operator can then proceed to take more measurements, start mapping a new area, or travel to a new job-site.

When all the necessary measurements have been taken, recorded, and optionally verified, the working database stored on the portable data recorder contains an entire record of the job-site in a proprietary format that reflects the manner in which the data was actually recorded. The invention allows data to be recorded and stored in a manner more analogous to, and hence easier to use with, the traditional process of taking as-built measurements. The structure of this recordation and storage in a database is described in further detail below.

When the user or operator is satisfied with the recorded data, they may synchronize or otherwise load their data into the data player application (step 142), and select the draw command (step 144). Some embodiments of the system also include a login step 146 which determines the user's authorization to work with the system as a whole, or with the system in conjunction with a specific job-site or job project. As used herein, the terms "job project" and "project" are used to refer to any collection of data relating to a specific job-site. The project may also include information that is not unique to any one particular job-site.

In one embodiment of the invention the login process can use the Internet (or another equivalent network or communications mechanism) to verify a user's credentials, as indicated by step 148. In accordance with this embodiment, an attempt is first made to connect the user's system (or more specifically their player software application) to a central login server using the Internet. The central login server contains user-specific, and optionally job-site or project-specific, data which it uses to authorize users. An initial connection step 150 can be used as a preliminary verification that the user's system is properly authorized to work with the application. If the login is refused by the central login server then the user's player software application will not be allowed to proceed. The login server may then provide information as to the user's personal authority to work with the application or with a specific job-site file (step 150). This information is returned to the user's system in step 152 where it is used to inform their data player software application of a proper login. Having confirmed the valid login (step 154), the process allows the user's player software application to work with the loaded database. At this point, the player application will commence parsing (step 158), to convert the parsed data to image render data in step 160, translate it to CAD data format in step 162, and create the measured drawing in step 164. An invalid system or user login allows the user to view and edit the original database, but it will not process or render the database (step 168).

Other embodiments of the invention may utilize a central storage server on which all of a user's data files are stored. The central storage server can be accessed via the Internet, the Web, or an equivalent form of remote communication. Wireless access devices such as those using the Wireless Application Protocol (WAP) may similarly be used. In accordance with this embodiment of the invention the user stores all the previously recorded job-site data on the central storage server. The central storage server provides the necessary authorization tools to authenticate and authorize the user, together with the logic necessary for using the data to create measured drawings. The measured drawings thus created can be conveniently processed and printed at a central location. In this manner the invention can be operated on a subscription or pay service basis, with easy accessibility from any point on, or connected to, the Internet. A service subscriber need only rent a portable data recorder device (or in the case of a subcontractor perhaps purchase their own portable data recorder device) and upload the data to the central storage server. Thereafter, all processing or printing can be performed at the central location and the final result—the measured drawings, delivered to the subscriber or subcontractor by regular postal service, courier, express mail delivery, electronic mail, the Internet, etc.

Figure 3:
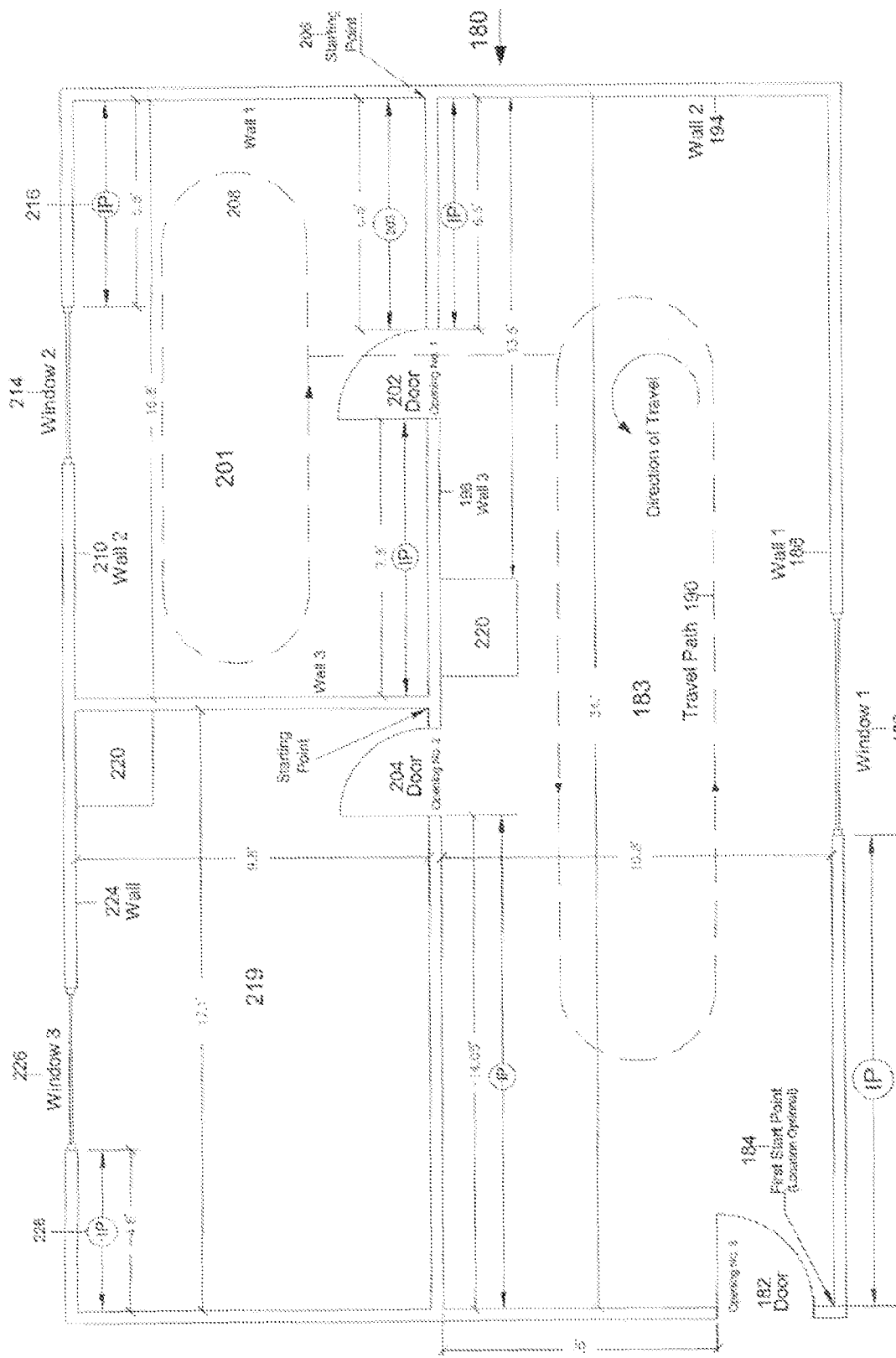
FIG. 3 shows an illustration of a floor plan being mapped in accordance with an embodiment of the invention.
Figure 4:
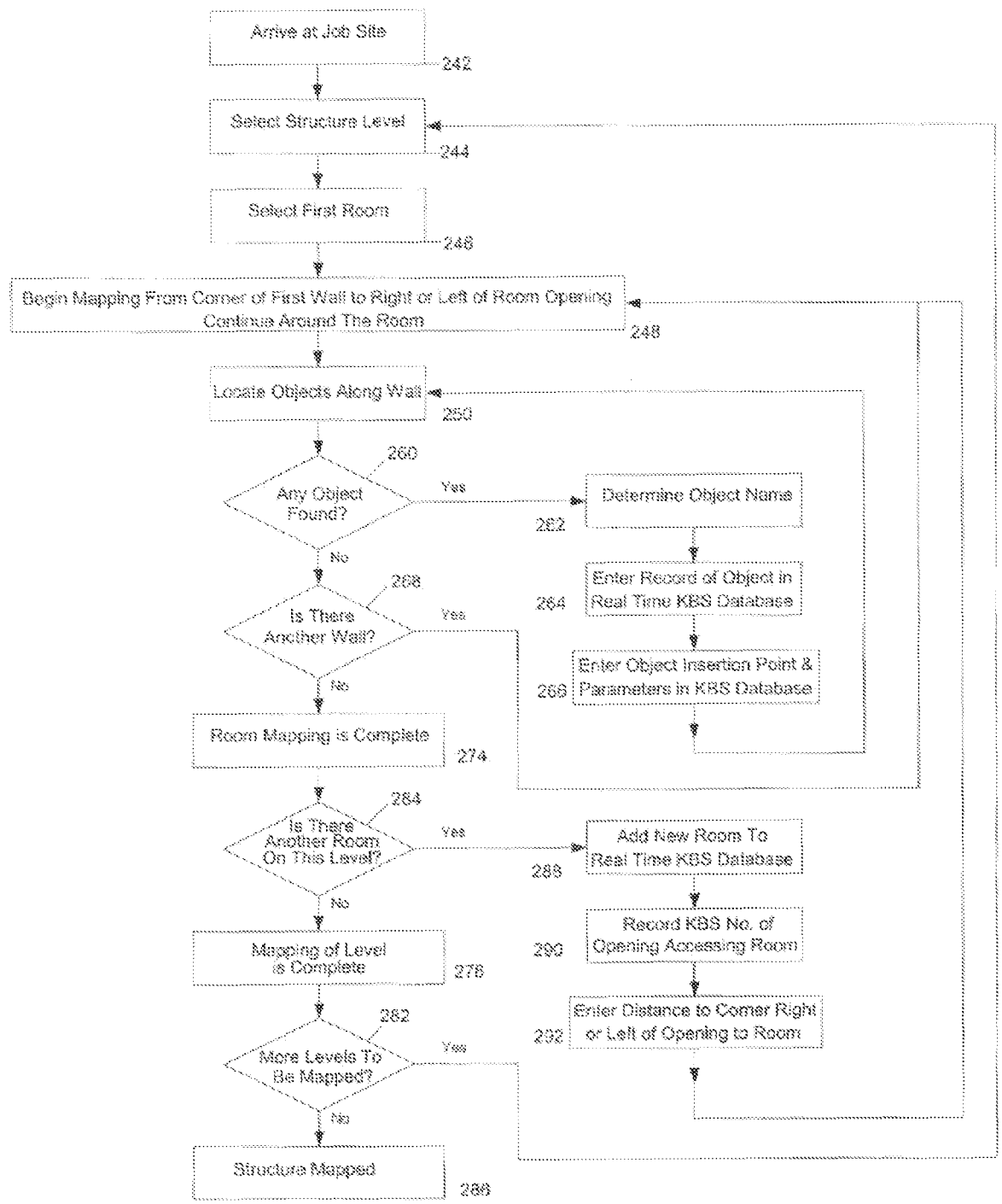
FIG. 4 shows a flowchart of a mapping process in accordance with an embodiment of the invention.

FIGS. 3 and 4 illustrate a mapping procedure used by an operator of the invention for surveying a floor of a building. As shown in FIG. 3, the operator chooses a starting point 184 from which to begin the survey operation. The portable data recorder is initialized with any necessary or global job-site information, such as job description and initial data settings (base site elevation, geographical location, etc.). The operator then proceeds to take data measurements of the first room 183 in a counter clockwise manner. The direction of travel 190 is not important to the operation of the invention but the counter clockwise direction is more commonly used in the surveying industry and is more closely related to the industry norm of making the "x" or horizontal axis the "zero degree" axis in final drawings. Individual structural components and features such as doors and windows are noted as they are encountered and duly recorded in the working database. It will be evident to one skilled in the art that the invention is not limited to the mapping of walls, doors, and windows and instead that any structural feature, such as a cabinet, closet, or even furniture and fixtures can be recorded by the invention in this manner. When the first room is finished, the operator moves on to survey the next room (or rooms) 201, 219 until the entire job-site has been surveyed and a complete set of working data has been recorded in the working database.

In one embodiment of the invention, individual rooms, structural features, building components and objects may be recorded relative to one another, i.e. linked to one another. For example, in the job-site shown in FIG. 3, rooms 183 and 201 may be referenced to one another by, for example, specifying a common doorway 202. But the flexibility of the system allows that rooms and objects need not necessarily share common elements in order to be linked. For example, room 201 can be linked to the first room 183 simply by specifying its starting point to be a specific distance and direction (or vector) from the window 188 of room 183. In this manner, all of the elements of a particular job-site can be linked to one or more of the other elements in that job-site. Hierarchical or object-embedded elements, such as doors and windows which are by definition embedded in wall structures, may be easily recorded by specifying the structural object or element (such as the wall) in which they are situated or embedded, and then recording an insertion point (IP) that designates the position of the embedded object in the containing (parent) structure. The example given in FIG. 3 shows a window 214 embedded in a wall 210 together with an associated insertion point 216. The insertion point 216 (hereinafter referred to simply as the "IP") specifies how far along the parent structural element the embedded structural element or embedded object begins. In those situations where the IP cannot be directly measured (such as when an obstacle blocks the path) a negative insertion point (negative IP) may be recorded instead. An example of this is the window 226 of FIG. 3 which has a negative IP 228. Since an obstacle 220 (perhaps a cupboard or a fireplace) blocks the path of the operator moving in the counter-clockwise direction, using a negative IP allows the operator to quickly and easily take a measurement from the opposite (clockwise) direction. The system recognizes whether a regular IP or a negative IP is being used and adjusts its conversion accordingly. In accordance with the invention, windows can just as readily be recorded relative to other elements, such as doors and other objects. The IP feature speeds up the recording process by providing a handy recording tool for embedded elements that is readily understandable and easily used by the operator.

Figure 12:
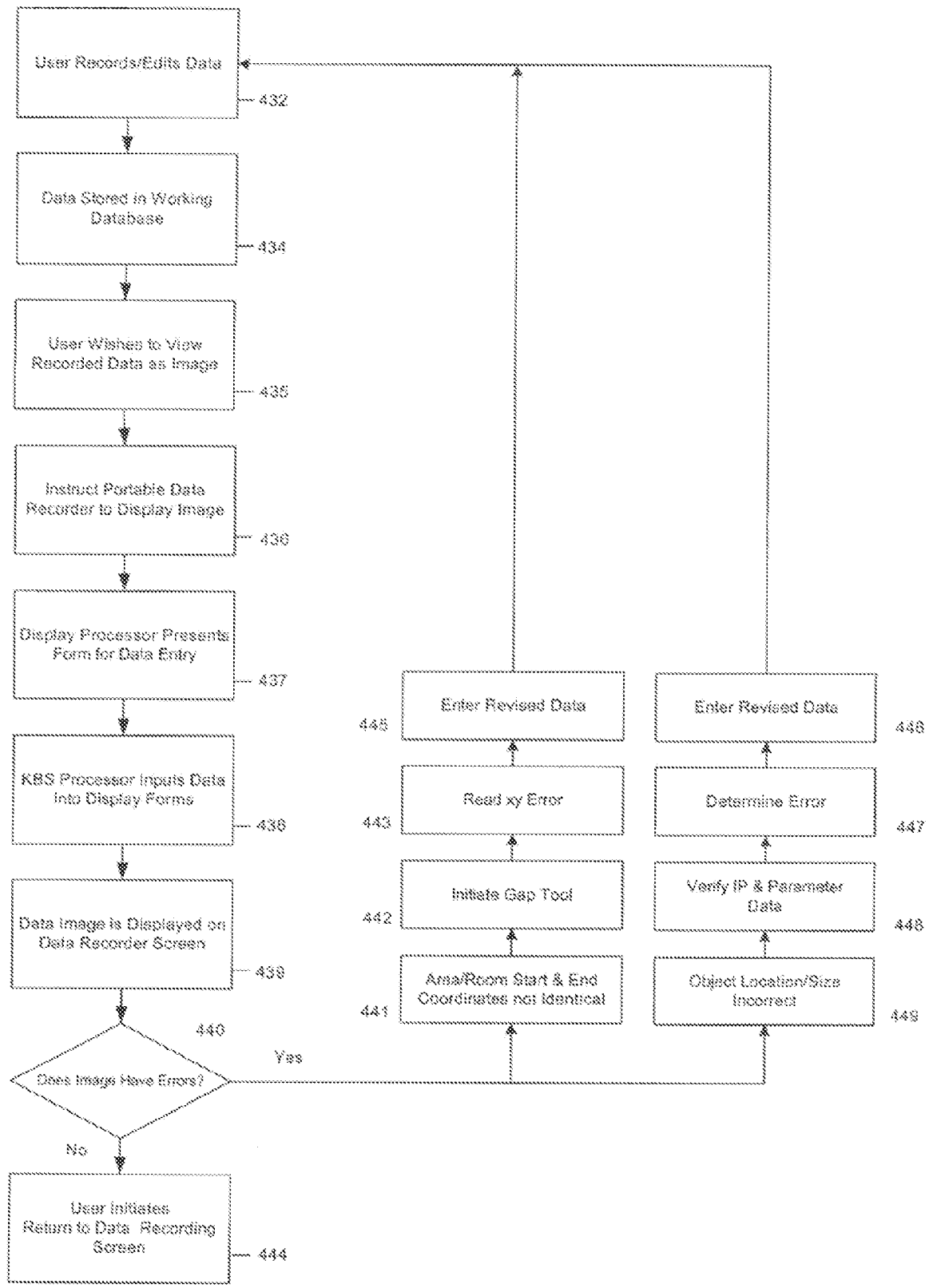
FIG. 12 shows a flowchart of a area or level draw display and data verification method in accordance with an embodiment of the invention.

FIG. 4 illustrates the steps required to map the building structure of FIG. 3. In this embodiment, on arrival of the job-site (step 242) the operator must decide upon an initial starting point or origin from which to map the first building level (step 244). The operator selects a first room of a building level in step 246 (which need not necessarily be the closest room to the entry point, and begins taking measurements in step 248. During the mapping procedure data is recorded on all structural elements, walls, fixtures etc., as desired by the operator, continuing around the room until back at the room's starting point. For each wall, entry is made of any objects present inside, within, upon, referenced or attached to that particular wall (step 250). When an object is found (step 260), the operator determines the name (step 262) and type of object (step 262), its features, enters it in the database (step 264) insertion point, and any other related parameters, and enters this data in a working database (step 266). Linkage information relating that object or structural element either to the start point or to another object or structural element is inherent to the data structure. The invention uses a knowledge base (KBS) to record which types of objects comprise which types of parameters. For example, doors may be left-striking or right-striking, i.e. a door entry may include a variable or parameter that indicates the striking orientation, and this striking parameter may be set to either left, or right. Since the striking orientation is dependent on the side from which the door is viewed. The invention automatically allows such parameters to be chosen when the object type requires it for complete definition. The invention further uses knowledge of the linkage between objects to determine certain values (for example in FIG. 3 it may deduce from the sequence of the measurements that the operator is recording door 202 from within room 183, so it automatically takes into account the side from which the door is viewed). If there are more walls (or features) to map then the process continues by mapping the next wall, (step 268) and so on until the entire room is completely mapped and recorded in step 274. The operator may choose to verify his/her data entry by selecting the render option and employing the error correction tools at this time (FIG. 12). The operator may then choose additional rooms to map. Typically, the choice of subsequent rooms are made by walking from one room to the next via a doorway or common opening, since this is the most familiar method a surveyor uses to create as-built drawings. Accordingly the invention allows room linkage via a doorway, although the invention also allows linking of rooms by any equivalent means, including by reference to common hallways, windows, spaces etc.

When all rooms have been mapped then the level is deemed to be finished (step 278). A check is made for any other levels to be mapped (step 282). When all levels have been mapped then the job-site itself (in this example the building) is complete (step 286). The operator may then use tje Grapher application to create a measured drawing, or they may log-in to the player application and create the measured drawings using a third-party CAD application.

Figure 5:
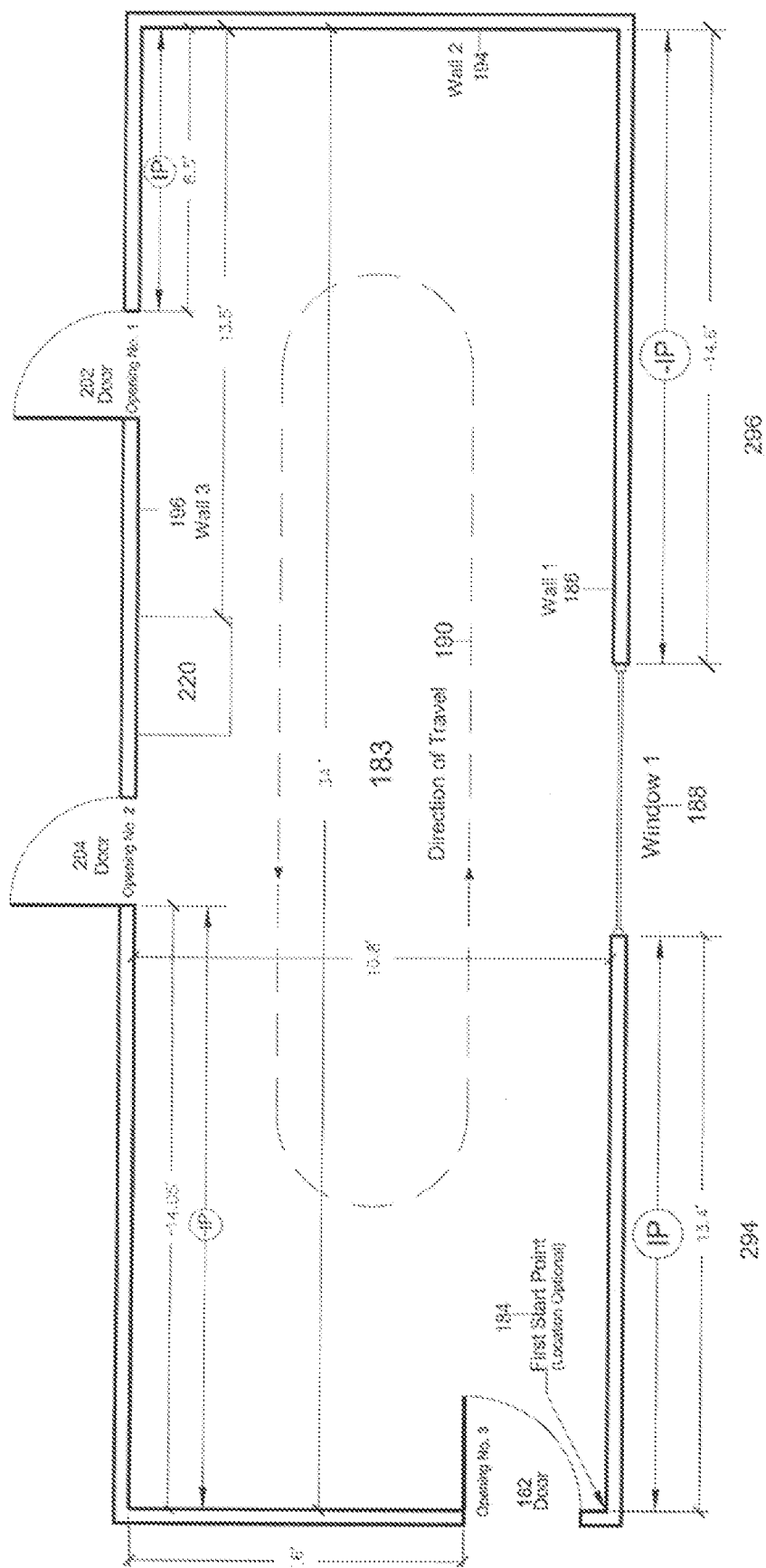
FIG. 5 shows an illustration of a room being mapped in accordance with an embodiment of the invention.

FIG. 5 shows a detailed view of a portion of the structure of FIG. 3, and illustrates in further detail how measurements of the structure elements are recorded. As the operator maps the area by moving around room 183 they encounter various structure elements, including, as shown in this example, a wall (wall 1) 186, a window (window 1) 188, another wall (wall 2) 194, another wall (wall 3) 196, a doorway (door 1) 202, and another doorway (door 2) 204. The system automatically links all elements in a level, from start point to last object, using a polar coordinate system that can be selected to be completely transparent to the user. In most cases this amounts to entering the measurements for each parent element and their object IPs as the operator encounters them. To the operator this task is as simple or familiar as walking around the room and thinking to himself or herself "there is a first wall, which contains a window; then there is a second wall at a perpendicular left-angle to the first; then there is a third wall, again at a perpendicular angle, which contains a door."

Referring again to FIG. 3, the operator will map the rooms 183, 201 by entering each structural element or object in the database, and the system will link them in a relational manner. The final set of measurements taken by the operator may appear as shown in Table 1.

TABLE 1

| Parent Object | Parent/child Object | Parent/child Object | Parent/child Object | Start or IP | Linkage Vector Data | Dimensions & (Coordinates) |
|---|---|---|---|---|---|---|
| Level 1 | Rm 183 | | | Right of Access Opening to Corner | Rm 183 & Start Point on Level (0,0,0,)* | (0,0,0) |
| | | Wall 1 (186) | | Start Point | Start Point Data (0,0,0)* | Length 34' (default ∠ = 0°)* |
| | | | Window 1 | IP 13.4' | Wall 1*, IP 13.4' | Length 4', etc. |
| | | Wall 2 (90° Left) | | End of last wall | End Wall 1* | Length 10.8' (∠ = 90°)* |
| | | Wall 3 (90° Left) | | End of last wall | End Wall 2* | Length 34' (∠ = 180°)* |
| | | | Opening #1 (Door 202) | IP 6.5' | Wall 3*, IP 6.5' | Length 2.5', etc |
| | | | Object (220) | IP 13.5' | Wall 3, IP - 13.5' | Length 3', etc. |
| | | | Opening #2 (Door 204) | IP - 14.05' | Wall 3, IP - 14.05' | Length 2.5', etc. |
| | | Wall 4 (90° Left) | | End of last wall | End Wall 3 | Length 10.8' (∠ = 270°)* |
| | | | Opening #3 | IP 7.6' | Wall 4, IP 7.6' | Length 2.5', etc. |
| Level 1 | Rm 201 | Start Point | | | 6.5' to Right of Opening #1 | (tracked by system) |
| | | Wall 1 | | Start Point* | Start Point Data | Length 9.8' (∠ = 90°)* |

TABLE 1-continued

| Parent Object | Parent/child Object | Parent/child Object | Parent/child Object | Start or IP | Linkage Vector Data | Dimensions & (Coordinates) |
|---|---|---|---|---|---|---|
| | | Wall 2 (90° Left) | | End of last wall | End Wall 1* | Length 16.8' (∠ = 180°)* |
| | | | Window 2 | IP 5.8' | Wall 2*, IP 5.8' | Length 4', etc |

*= calculated and/or inserted automatically by KBS

As shown in Table 1, the entries by themselves are not fully self-describing. For example, the entry for door 204 (opening #2) does not provide exact coordinates for the position of the door, (i.e. neither a displacement nor a direction). It merely describes the physical attributes of the door itself, and the door's relation to another object or wall (in this example IP-14.05', or negative 14.05 feet). Similarly, wall 3 is not described in absolute terms, but is instead described only by its physical attributes and its relationship to another wall (in this example, wall 3 is specified as being "left of end" of the previous wall). This manner of linking is compatible with the way in which most operators or surveyors perceive the various walls and objects. For example, they do not typically think of a particular window in the absolute terms a skilled CAD designer may use, but instead think of it in terms of the area, or more precisely, the wall in which it is located. In this manner, entries for all structural elements and objects can be recorded in a short period of time, and without reliance on a fixed coordinate system.

In accordance with one embodiment, the system provided by the invention uses the raw data and the sequence of recording to fill in any gaps in the recorded data in real-time, and to further qualify the measured data prior to recording this data in the working database. In the example shown in Table 1, the system uses the information in the Knowledge Base to create the additional values for "Start Points" and "coordinates" and to further qualify the "linkage vector" used to link one recorded structure element or object to a preceding one. In a similar manner, new areas, rooms, and levels can be added and stored using linkage vectors. The operator does not need to specify exact coordinates but instead may merely specify each (new) object's type and relative link to a previously recorded object. The method provided by the invention offers considerable advances over traditional methods in not requiring the operator to learn or adapt to a new coordinate mapping system. Also, since the invention records structure elements not in strictly absolute terms but in relative terms, the operator does not need to continuously or consciously realign themselves with an absolute coordinate, such as a zero degree or an X axis—they can instead simply record the entire structure using relative links. This is of particular importance in large or complex structures, such as industrial factory sites having large atrium spaces or many corridors, where an operator's sense of direction and thus his/her knowledge of an absolute axis or direction may become confused.

It will be evident to one of skill in the art that although tables are shown for the purpose of illustration, other forms of data structures can be used while remaining within the spirit and scope of the invention, and that the invention should not be limited by the examples given above to illustrate the various features and advantages in one particular embodiment.

Input Devices

Figure 6:
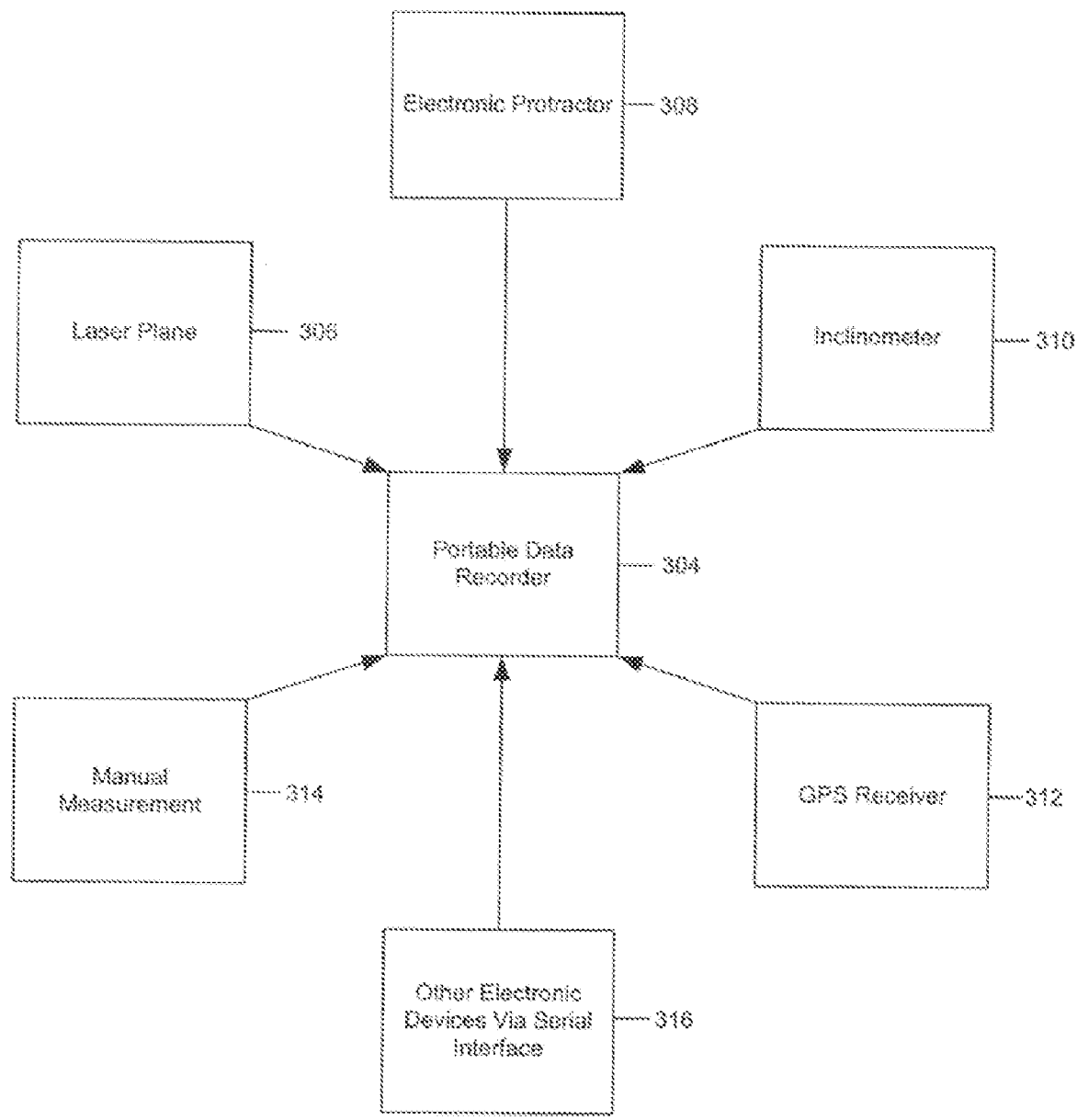
FIG. 6 shows an illustration of various measurement input devices for use with an embodiment of the invention.

Various methods and input devices can be used to enter or transmit data to the portable data recording device itself. Some of these input devices are shown in FIG. 6. These input devices include, but are not limited to, laser planes, electronic protractors, inclinometers, global positioning systems, serial transducers, and their equivalents. It will be evident to those skilled in the art that a wide variety of other input means can be used while remaining within the spirit and scope of the invention.

Laser planes 306 typically comprise one or more orthogonal laser beams. When placed at any point in a room, the laser beams can be used to determine the proportions of the room. Each orthogonal laser beam is reflected by a surface, for example a wall, door, ceiling or floor. the reflectance data is then used to calculate the room's dimensions, length, width and height, in addition to object/wall distances etc. An electronic serial, infra-red (IR), or radio frequency (RF) signal can be used to transmit data to the portable recording device.

Electronic protractors 308 work similarly to laser planes in using a serial, IR or RF link to transfer data to the portable recording device. The electronic protractor utilizes two freely moving arms that, when placed along the juncture of two walls instantly and accurately records the angle of the walls relative to one another. In accordance with an embodiment of the invention, the portable data recorder includes Left (L) and Right (R) buttons or icons. An operator may use these icons in conjunction with the electronic protractor to quickly specify the angle and direction of wall angles. For example to specify a new wall at approximately 45° to the left of the current one, the operator simply clicks the L button and places the protractor in the juncture between the walls—the angle is automatically recorded together with the entry for the new wall.

An inclinometer 310 can be used to measure the angle of an inclined structure, object, or ramp and transmit the measured data to the portable recorder. The global positioning system 312 uses satellite signals to accurately pinpoint locations throughout the job-site. It will be evident that many other types of electronic and mechanical devices 316 can be used to communicate position and/or measurement data to the data recorder by any combination of wired, infra-red, radio-frequency, or equivalent means. Manual input devices 314 (such as keyboards, tape measurements, and voice-activated interfaces) can be used to replace, supplement, or verify measurements taken with automatic data input devices.

Figure 7:
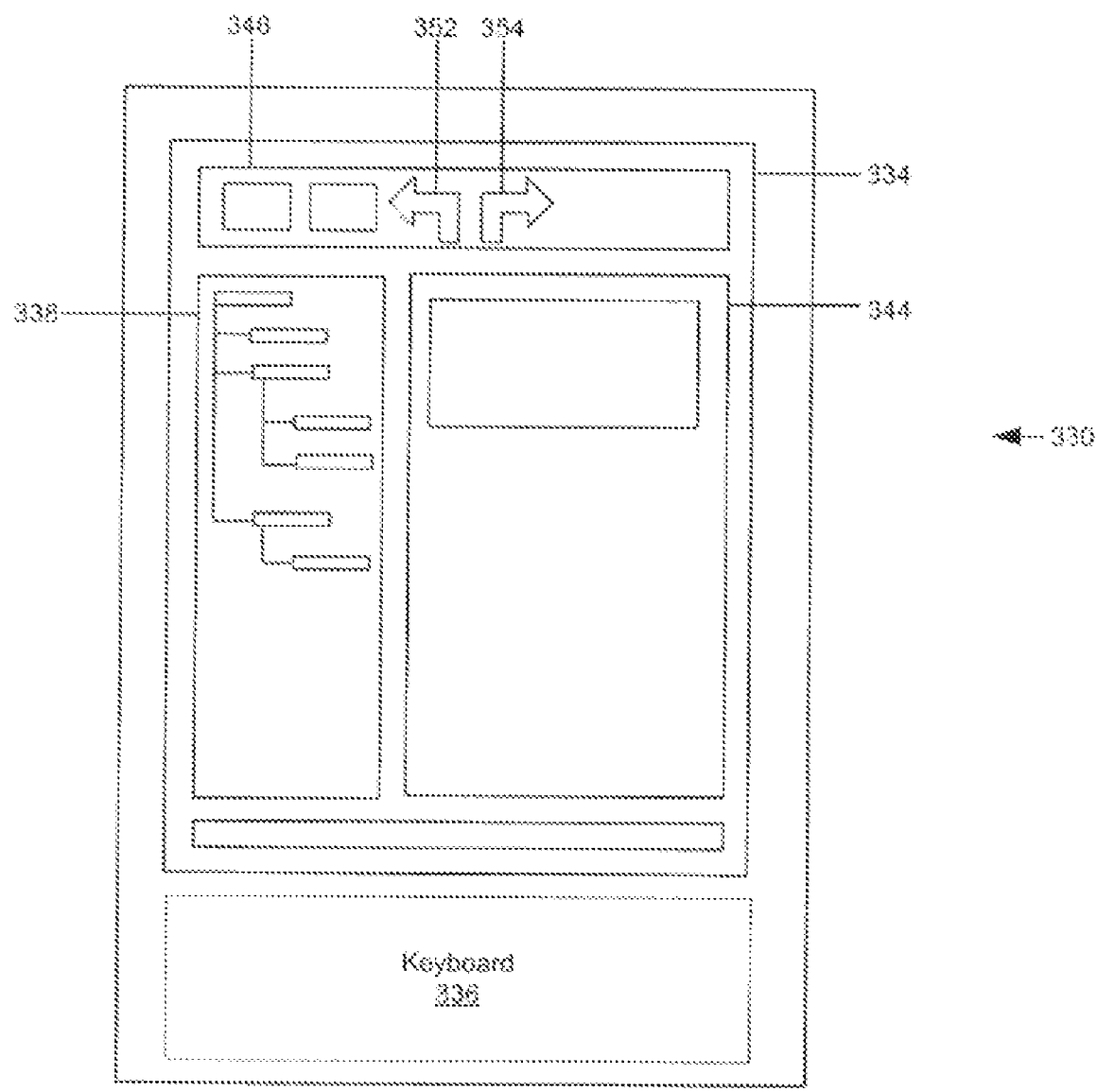
FIG. 7 shows a portable data recorder for use with the invention.

FIG. 7 shows an example of a portable data recording device 330 for use with an embodiment of the invention. Such a data recording device 330 is an example of the type of device which may be used as a portable data recorder 306 of FIG. 6. In one embodiment data recording device 330 is a PDA device or a handheld computing device, although alternative means for recording data can be used while remaining within the scope and spirit of the invention. In one implementation data recording device 330 includes a processor, memory, one or more input devices, and one or more output devices. Data recording device 330 also includes a visual display and a user input device, for example a mouse-like pointer, or a touch-screen 334. A keyboard 336 may be used for data entry and/or automatic data input devices can be connected to the recorder. In one embodiment the recorded data is displayed as a series of object element entries in a data tree portion of the screen 338. The data tree mimics the hierarchical nature of the structural elements (i.e. areas contain rooms, rooms contain walls, walls contain doors, etc.). Additional comments, object variables and other information is displayed in a data input portion 344. A plurality of buttons or icons along the top of the screen 348 allow the operator to quickly enter common data elements. For example an icon may be provided to allow an operator to quickly insert a new wall, or to start the mapping of a new area. Special "quick-link" buttons such as, for example, "L (left)" 352 and "R (right)" 354 icons, assist in the mapping process by allowing the operator to quickly record data for a new wall to the left or right (respectively) of an existing wall. The recording device is ideally suited to mimic or conform to the process which a typical surveyor or operator would follow in mapping a job-site by traditional means, although the invention greatly assists in this task by automating many common steps.

Figure 8:
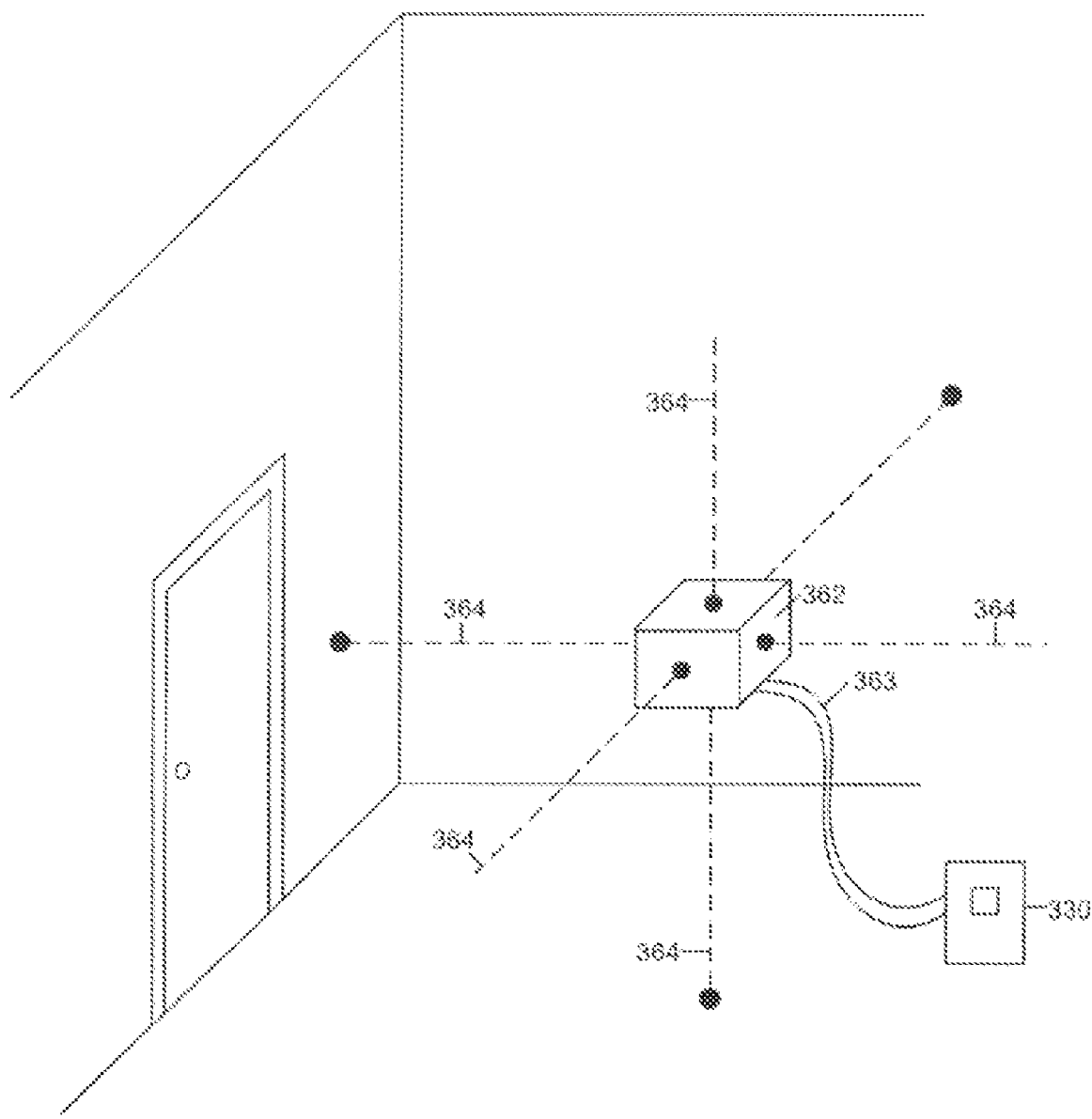
FIG. 8 shows an illustration of a measuring device for use with an embodiment of the invention.

FIG. 8 illustrates the use of such an automatic data input device as described above to take measurements and to communicate those measurements to a portable data recorder. As shown in FIG. 8, a laser beam or light-emitting-diode (LED) generator 362 transmits multiple laser beams in orthogonal directions 364. Reflections of the various beams from structural surfaces such as walls, floors, doors, windows, ceilings, and objects such as cabinets, fixtures, and furniture, allow an object's dimensions or its displacement to be measured. These measurements are communicated to the portable data recorder 330 via a serial interface 363. Such a setup may be used to take multiple measurements simultaneously. As illustrated in FIG. 8, for example, the wall length and ceiling height measurements are determined by the laser plane and communicated directly to the portable data recorder for further processing and storage. It will be evident that other forms of communication can be used, including infra-red, radio frequency or equivalent means.

Software Functions

Figure 9:
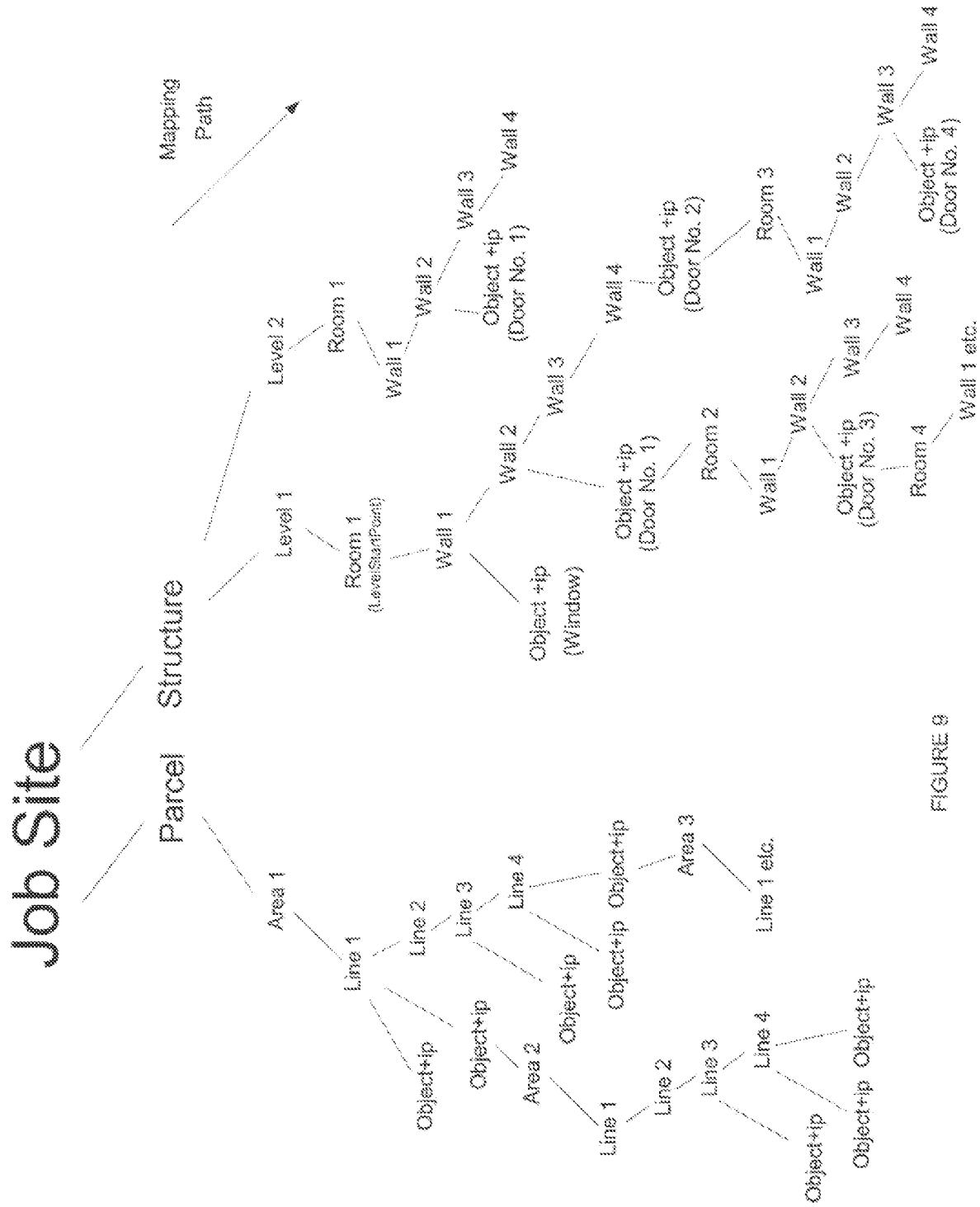
FIG. 9 shows an illustration of a hierarchy of objects and structural elements in accordance with an embodiment of the invention.

FIG. 9 illustrates the hierarchical nature in which job-site elements that are mapped by the operator are subsequently stored in a working database. In accordance with one embodiment of the invention, a job-site is usually divided into areas, structures, and levels which in turn contain rooms. A convenient way to represent this in a stored database is by means of a hierarchical linking shown schematically in FIG. 9 and in further detail in FIG. 10. The rooms contain walls, and the walls contain objects. Elements may be linked by providing each entry with a pointer to their parent element (for example Structure 1 ->Level 1; Room 1 ->; Wall 1, Wall 2, Wall 3 ->Room 2), and optionally with a point to their child element or elements (for example Room 2 _>Wall 1, Wall 2, Wall 3). The invention thus allows Parcel Areas, Structures, Levels, Rooms, Walls, Objects and attributes to be linked or embedded relative to one another. This particular hierarchical relationship need not be strictly adhered to and other forms of linking, such as by common functionality (e.g. all doors linked together) or by physical placement (e.g. furniture linked to the closest structural object) can be used. In practice however, the operator will typically map the job-site in the descending order or sequence shown.

Figure 10:
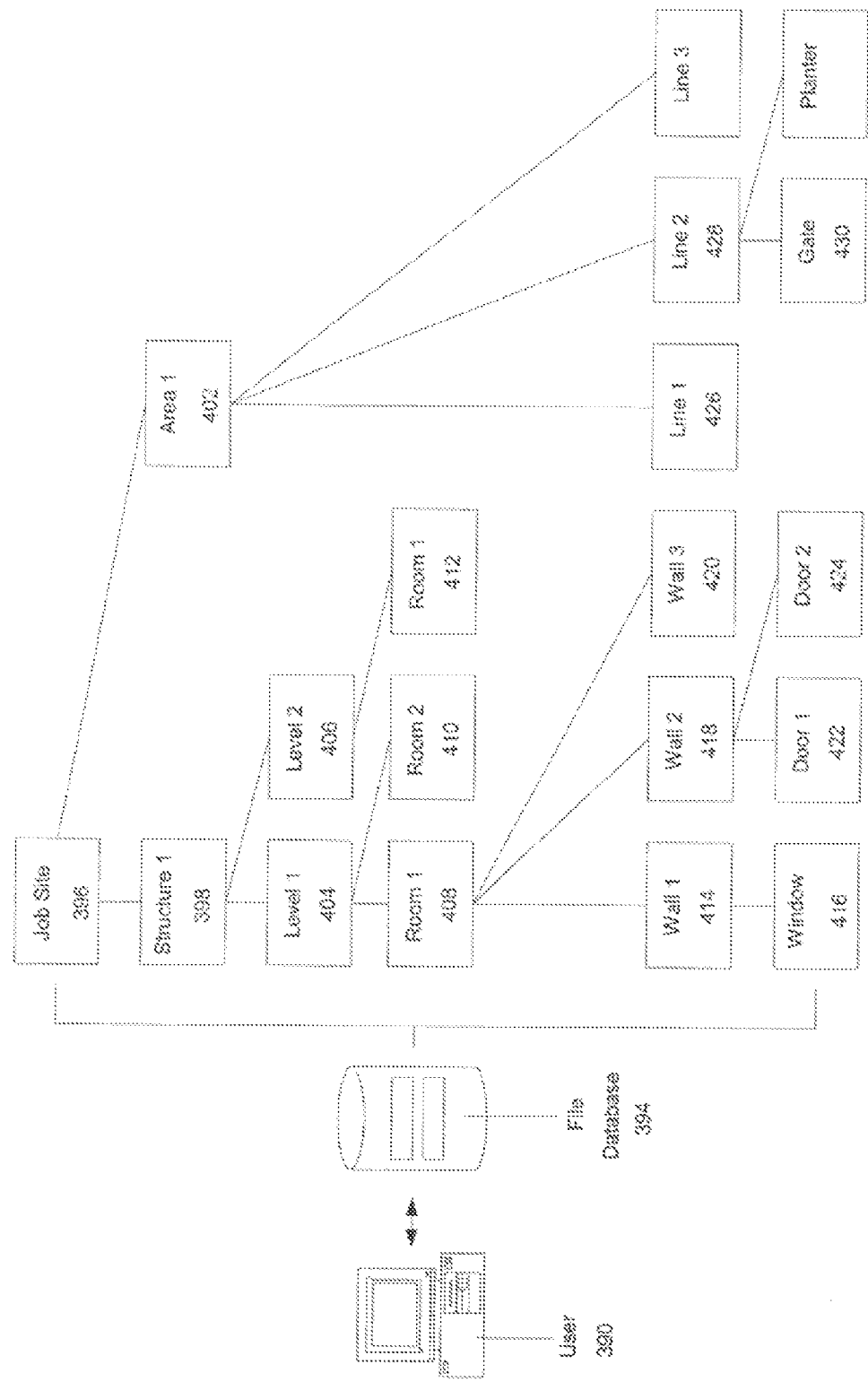
FIG. 10 shows a schematic of a database storage system in accordance with an embodiment of the invention.

FIG. 10 shows an example of the data storage structure used with a particular embodiment of the invention. The working database contains a series of entries relating to the job-site. These include global entries for the job-site itself 396, entries for the structures 398, levels 404, 406, rooms 408, 410, 410, walls 414, 418, 420, objects 416, 422, 424, areas 402, lines 426, 428 and gates 430 in the job-site, and so on, all appropriately linked to reflect their relative connection or link. Each entry may include a pointer to the next entry (or entries) in the list, or alternatively a database structure embodying the hierarchy may be provided, and the appropriate values filled in as needed. The database structure is directly viewable in real-time on the display of the portable data recording device (as shown in FIG. 11, 346), and provides assistance to the user in verifying the data and ensuring the data is entered with appropriate links.

Figure 11:
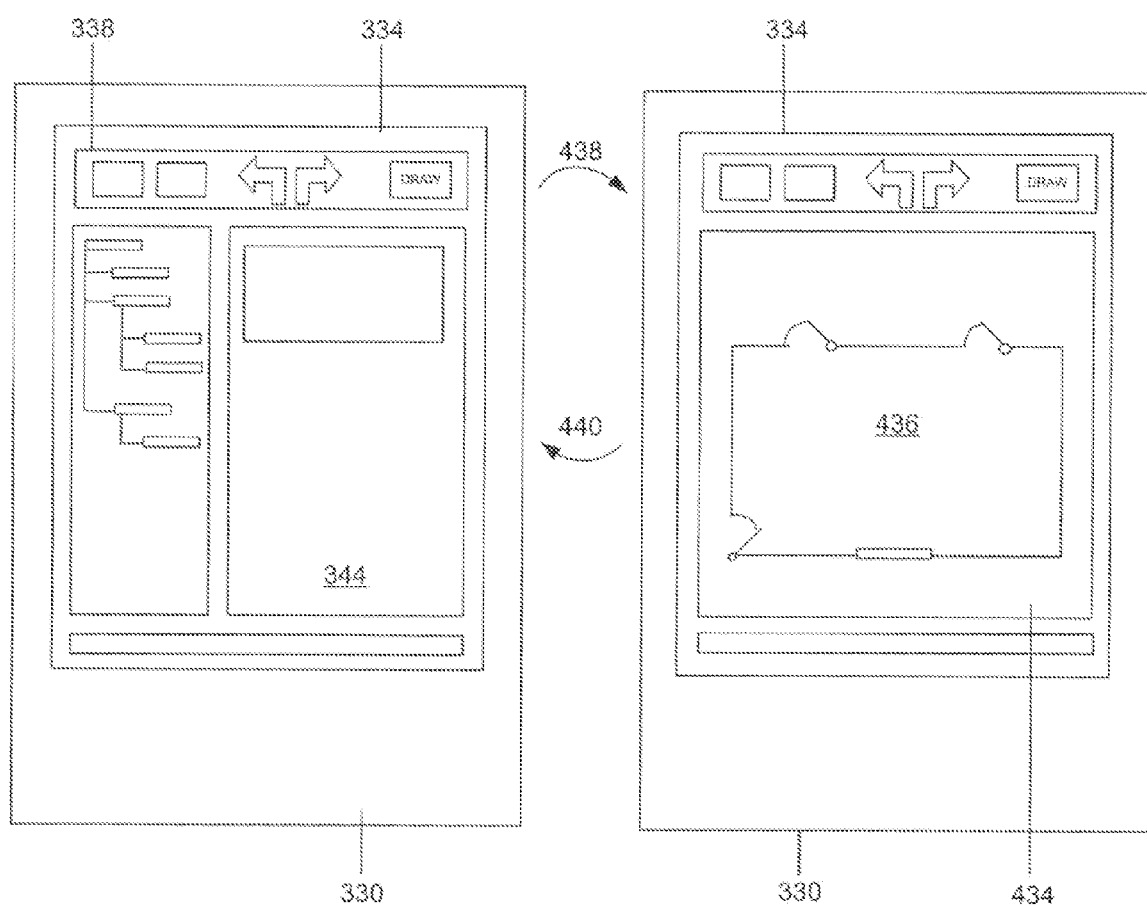
FIG. 11 shows an illustration of a portable data recorder and a verification screen in accordance with an embodiment of the invention.

FIGS. 11 and 12 illustrate an embodiment of a portable data recorder device 330 that allows the operator to view and verify their recorded data in real-time before they leave the job-site. Clicking a "view job-site" icon on the portable data recorder or sending some other form of command allows the operator to view an on-screen illustration "area draw" or "level draw" of the job-site as recorded. If the illustrated job-site appears incomplete or incorrect in some way the operator can click a "view job data" icon to toggle back to the job data entry screen 344. This toggling is represented by the arrows 340 and 342 shown in FIG. 11.

FIG. 12 illustrates, at a high level, a method used to produce the visual job-site display. The "view job data" and "view job-site features" use the image rendering and drawing processes described in further detail below. As shown in FIG. 12, having already recorded (step 432) and stored (step 434) the data the operator then instructs the portable data recorder to display the data (step 435) either in full or in part. The portable device contains a Knowledge Based System (KBS) system which it uses in step 436 to parse the recorded data and convert it into a set of drawing element entries. The drawing element entries are fed to a drawing process which calls drawing routines to create the displayed drawing.

In one embodiment the drawing process supports a form-based interface for the transfer of data to the drawing routines. This encourages modularity, and allows the drawing routines to be modified independently of the data rendering routines. In accordance with this particular embodiment a data form is provided by the drawing package (step 437). The KBS system fills in this form with the recorded data (step 438).

Regardless of the transfer method used, the actual process is transparent to the user—all they see is the displayed image (step 439). When they are done verifying the image/data accuracy (step 440), and are satisfied, they may return to the data entry screen and continue with the process of recording data (step 444).

Distributed Login

Figure 13:
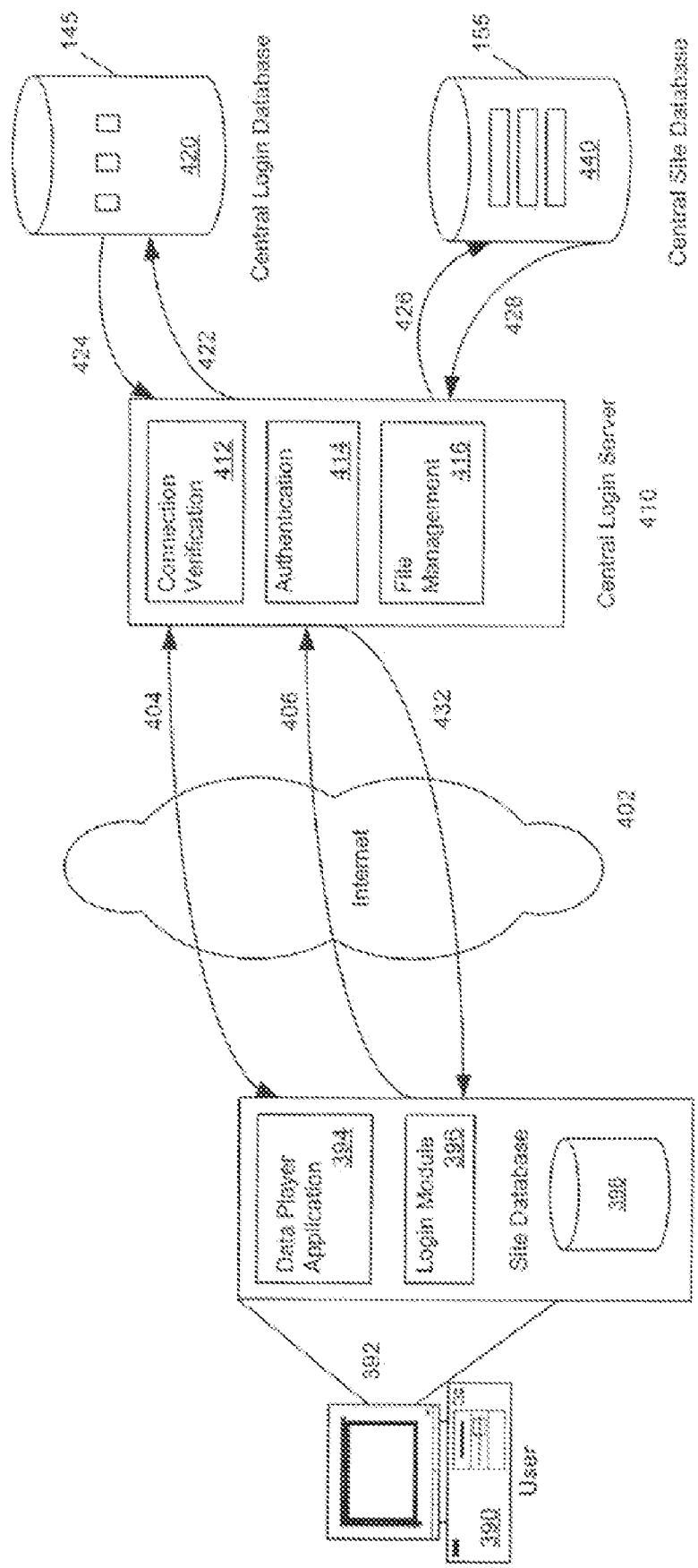
FIG. 13 shows a schematic of a distributed system in accordance with an embodiment of the invention.
Figure 14:
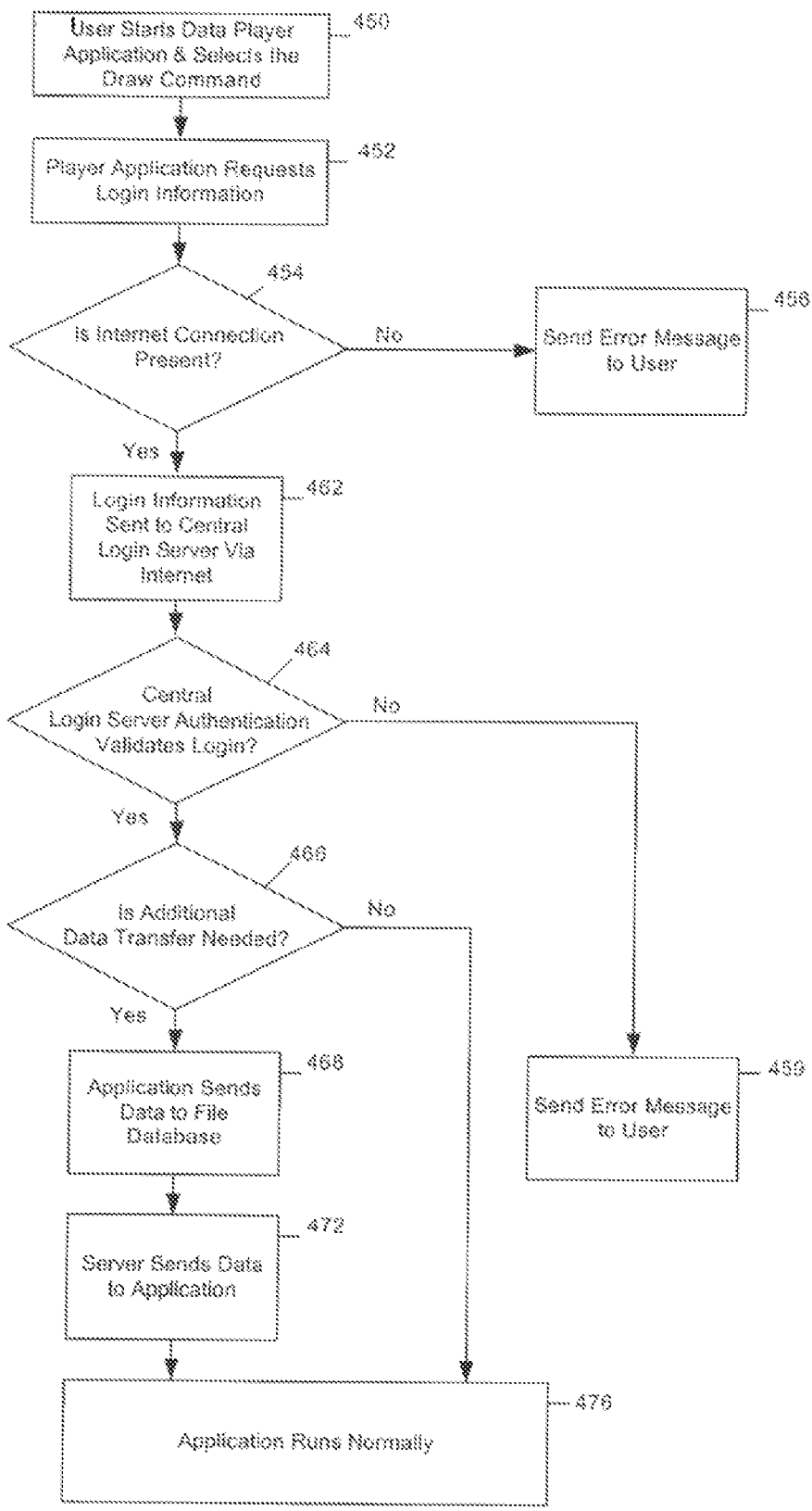
FIG. 14 shows a flowchart of a login process in accordance with an embodiment of the invention.

FIG. 13 illustrates a distributed system for authorizing a user to access the system or work with specific job-site data. The method used by the system to accomplish this is shown in the flowchart of FIG. 14. As shown in FIG. 13, a user (who may be the operator of the recording device, an associate, a surveyor or a subcontractor) 390 operates the client player software application 392 (the "player"), typically at the associate's or contractor's premises or on the job-site. In one embodiment the player software application may comprise three portions; a data processor player 394, which handles the processing of job-site data, and creates the measured drawings; a job-site or working database 398 which contains the recorded data for one or more job-sites; and a login module 396 that is used to authenticate or authorize the user to operate the system.

The system used to authenticate the user is detailed in FIG. 13. On first initializing the application, the system verifies a connection via the Internet 402 (or any equivalent distributed communications medium) to a remote server or server application. This provides an initial authorization based on the user's machine or computer. At any point in time a central administrator may authorize or deny access to the connection verification module 412 from a specific client or associate system. This is particularly useful when the system is provided to independent contractors who may only work on a single project and cannot be relied upon to promptly return their copy of the system software (usually just the client player application) when the project is finished. Being able to deny access to the connection verification module from the contractors machine effectively prevents them from further using the software.

The login module then accepts login information from a user (which may or may not include a specific job-site reference) and passes it to an authentication module 414 on the central server. The central server includes an authorization database 420 to effect user authentication, and duly reports the status of the login attempt back to the client (player) application. The method used by the invention serves a further benefit in that additional information, such as system updates, software patches, etc., may be transferred at this time also, as may actual job-site data files or extracts of such files. These data files can be stored on a central site database 440 for backup or verification purposes.

The advantages of using such a distributed login system are three-fold:

1. The connection verification module ensures that only authorized machines are allowed to initiate a connection. Other machines will be refused. This is particularly beneficial in environments where the client software (the player application) is distributed freely, but limits must be placed on its usage. By insisting that the machine running the application be connected to the Internet and successfully connect to a central server, unauthorized machines will not be able to start or run the application. The method ensures that the application may be rapidly distributed, such as by Web download, to all interested parties, but that controls are maintained on its usage.

2. Since the central login server may contain job-specific data, individual machines and/or users may be authorized to work only on certain projects, or only with certain permission levels. For instance, two geographically separated users having separate machines and logins, may be allowed to work on the same project, (and perhaps no other projects), but one user may have full permission to edit the project while the other has read-access only. The invention provides a method for authorizing users based on user name, job-site, and machine code, all from a central location and mostly transparent to the end user.

3. The distributed login allows for communication of other data during the login process. For example, data pertaining to specific projects can be uploaded or downloaded to the central server without any intervention or knowledge of the user. Project data files may be archived, or checked, for consistency, validity, and accuracy. This is particularly important when dealing with large job-sites, or job-sites being mapped by a number of surveyors. Centralized consistency checking can be used to minimize errors due to different operators interpretations or methods of taking measurements.

FIG. 14 illustrates the method used in the distributed login process. After starting the client software application, loading the job site database and selecting the draw command, the application first requests log in information (step 442). This login information may include a user login name, login password, and optionally a specific job-site project to work on. It then checks for a connection to a remote server (or more particularly a connection verification module of the remote server) via the Internet (step 454). If no Internet connection is found then the process sends an error message (step 456).

If successful, the information is sent, in step 462, via the Internet to a central login server, which validates the login step (step 464) in conjunction with a central authorization database. The information is sent in step 462 via the Internet to a central login server, which validates the login (step 464) in conjunction with a central authorization database. If the login is unsuccessful then the process exits with an error message (step 459). As an optional step, the client may send or receive information from the central login server in addition to authorization information. This may include sending copies or extracts of the job-site working database to the central login server for data backup, data verification, and data consistency-checking in steps 468, 472. When the login process is complete, (i.e. has passed both the system authority check via the Internet, and the user authority check via the central login server), the application continues in a normal runtime mode (step 476).

Player Application

Figure 15:
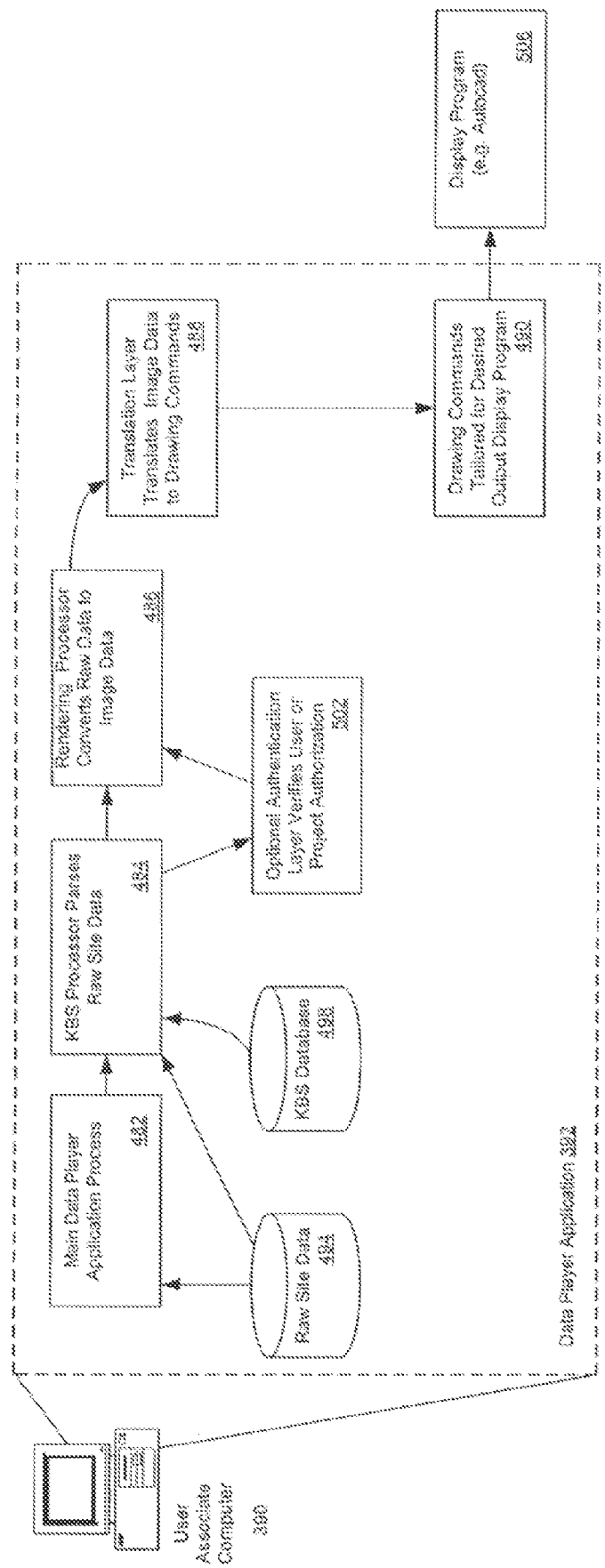
FIG. 15 shows a schematic of a software application in accordance with an embodiment of the invention.

The client machine (i.e. the machine used by an operator, customer, surveyor, subcontractor or other type of user to access the working database or mapped data and create the measured drawings) comprises a client player application (or simply a client application or player application) to handle the task of processing data and creating drawings. Within the client player application itself, various components handle the tasks required to produce the final measured drawings. These components are illustrated in FIG. 15. As shown therein, the client application may comprise a main player process 482, a knowledge-based processor (KBS processor) 484, a rendering processor 486, and a translation layer 488. It will be evident that, although referred to as individual processors, any number or even all of the processors may be incorporated into a single central processing unit (CPU) or may be implemented by components, modules, components, or functions of one or more software applications. Raw job-site data 494 is stored in a database or an equivalent data structure, as a series of entries, each of which has been mapped by an operator with a portable recording device. A KBS database 498 contains the necessary information or intelligence to parse the raw data entries to create more recognizable structure elements. Optional authentication layers 502 are provided to authenticate the user or to authorize access to any of the various components, databases, or inherent software functions. The client application may also include a set of embedded drawing commands or a drawing library 490 to allow direct output of the measured drawing (as a series of drawing commands) to a third-party or external CAD application 506, such as IntelliCAD (developed by the IntelliCAD Technology Consortium) or AutoCAD (developed by Autodesk, Inc).

Figure 16:
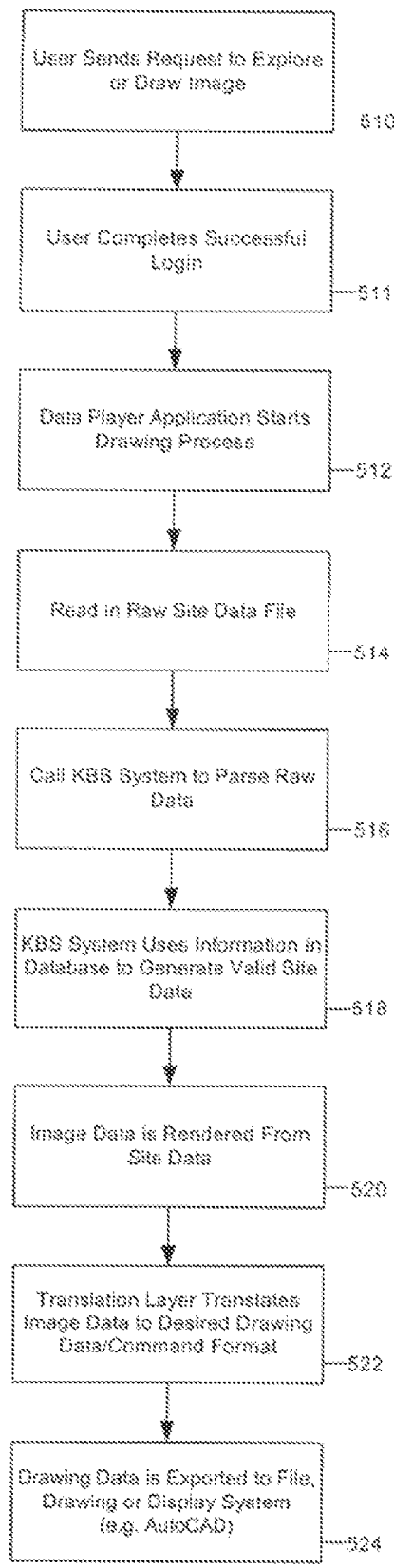
FIG. 16 shows a flowchart of an image rendering process in accordance with an embodiment of the invention.
Figure 17:
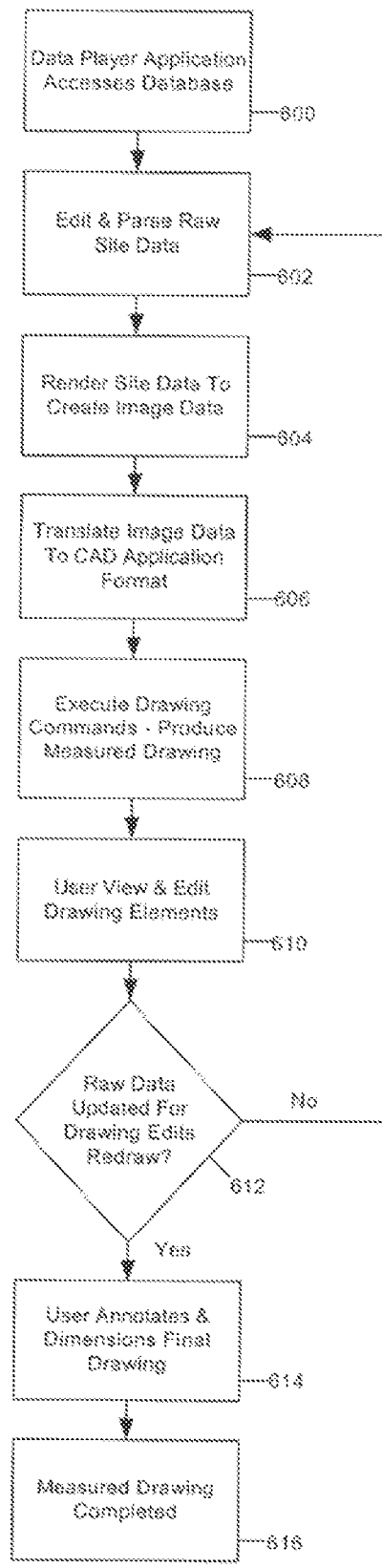
FIG. 17 shows a flowchart of a image rendering and drawing modification process in accordance with an embodiment of the invention.
Figure 18:
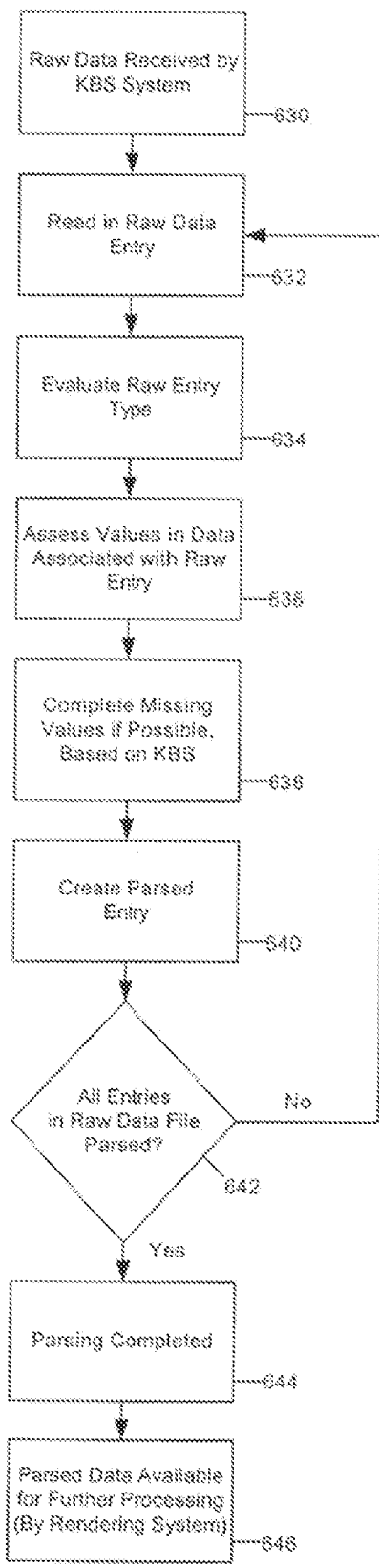
FIG. 18 shows a flowchart of a KBS-parsing method in accordance with an embodiment of the invention.

The process used by the client application to create the measured drawing is shown in FIG. 16, while FIGS. 17, 18 and 19 further detail the specific steps in creating the drawing. As shown in FIG. 16 the operator or user must first send a request to draw the image, or prepare the measured drawing (step 510). The client player application starts the drawing process by first reading the raw job-site data into the application from a database or other permanent storage (steps 512, 514). A Knowledge Based System (KBS) function is called upon to parse the raw data (step 516). The KBS system uses a knowledge base of information to interpret the raw data and convert it into a meaningful set of structure descriptions (step 518). In one embodiment, this amounts to taking the minimalist data entries taken at the job-site, and using a KBS database to determine a more complete entry for each structure element. Tables 1 and 2 above illustrate one aspect of the KBS parsing in that the KBS can be used to determine the start point of each structure element from the raw data. However, the KBS may similarly be used to extend data entries in a variety of other ways. For example, the KBS may further clarify such structural features as whether a door has six or eight panels. When the structure element is properly determined by the KBS, the process renders a set of image data describing the actual dimensions and placement of each structure element in standard screen display coordinates (step 520). Such coordinates may include Cartesian, polar or any other equivalent displayable coordinate system. At this point, the linkage information is no longer needed and the structure element can instead be defined in terms of absolute coordinates. A translation layer is used to convert the screen coordinates into any of a number of proprietary drawing formats, or drawing commands (step 522). These drawing commands may then be passed to an external or third-party CAD application for further display, processing, and manipulation (step 524).

FIG. 17 illustrates in further detail the steps in extracting data from the working database, and exporting it to a CAD application, where it can be used to create a measured drawing. Optionally, the measured drawing may be further modified in the CAD application, and the changes transmitted back to the working database. In order to accomplish this the client player application is first initialized by the operator or any user. In step 602 a raw job-site data file is read in from either a working database or from a central archive database. In those embodiments in which the working data (either the job-site data itself or a copy of it) is stored on a central server accessible via the Internet, the client application may access the central server via any Internet protocol, such as hypertext transfer protocol http. The working data need not necessarily be copied from the central server to the client machine—in some embodiments the client application can directly manipulate the data on the central server without transferring it. A KBS system is used in step 604 to render the data and convert the raw relational entries previously recorded for each structural element into coordinate entries that are independent of the link between the structural elements. The KBS system uses a knowledge base of information to perform the rendering. The data is then translated in step 606 by a translator which converts the data into a drawing format that can be directly imported by the CAD application (step 608). Some embodiments allow the operator to modify drawing elements if so desired (step 610). Any changes made to the drawing in this manner are similarly translated by the translator and parsed by the KBS system in a reverse manner (step 612) to create new data entries in the working database for each modified structural element (step 602).

The parsing step 602 of FIG. 17 is detailed further in the flowchart of FIG. 18. As shown therein, raw data is received by the KBS system (step 632). Each raw data entry is first evaluated for validity (step 634). This check for validity attempts to verify that each entry corresponding to a structure element is properly formed and contains all required values. For example, door entries should contain height and width measurements. Any values or measurements associated with or stored in the data entry are assessed, and if some are missing or seem incorrect (as detected by step 636), the system attempts to correct or estimate for them (step 638. A parsed entry which is independent of the relational linkage is thus created (step 640). The process is repeated until all entries in the working database for this particular job-site have been parsed (step 644). This parsed data can then be made available in step 646 for further processing, translation to another format, or export to a third-party CAD or equivalent system.

Figure 19A:
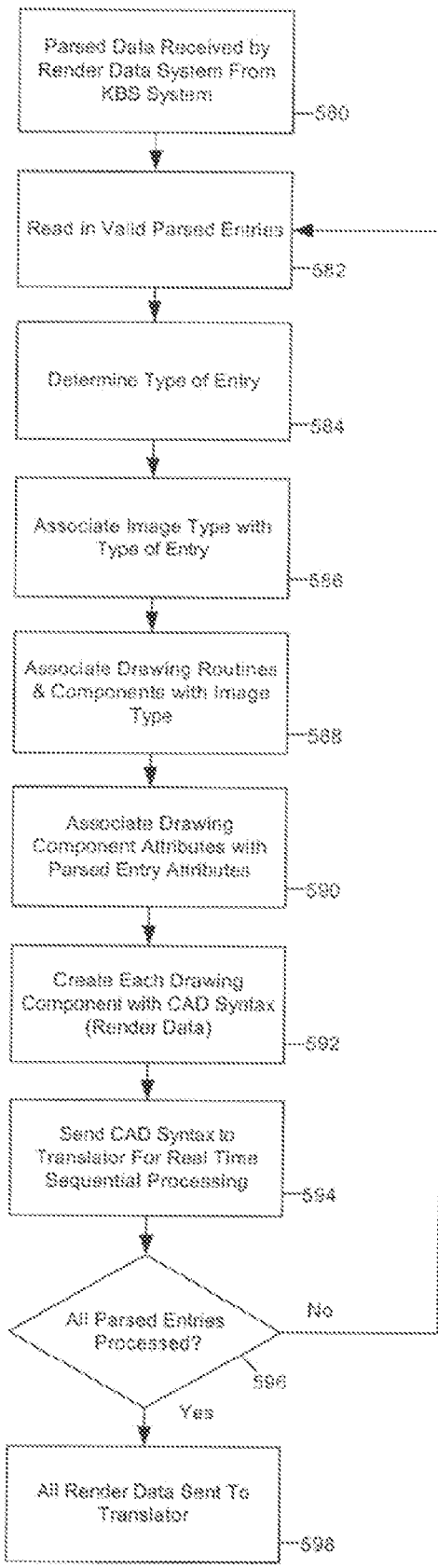
FIG. 19A shows a flowchart of a parsed data conversion to render data method in accordance with an embodiment of the invention.

FIG. 19A details the steps required to complete the render data step 604 of FIG. 17, in accordance with an embodiment of the invention. FIG. 19A shows the steps involved in converting parsed site data to image render data. Parsed data is received from the KBS system (step 580). Each parsed entry is first analyzed in step 584 to determine its type, for example whether it defines a door, a fixture, or a piece of furniture. Different entry types may be handled differently, such as written to different drawing layers. The entry is then associated with a corresponding drawing element type, (step 586), and the values associated with the parsed entry used to find an appropriate drawing components and routines for each image (step 588), and to associate that drawing component attributes with the entry image attributes (step 590). The invention then creates syntax (render data) for each image component (step 592). Each drawing component, in the form of render data, is then sent to the translation layer for processing (step 598).

Figure 19B:
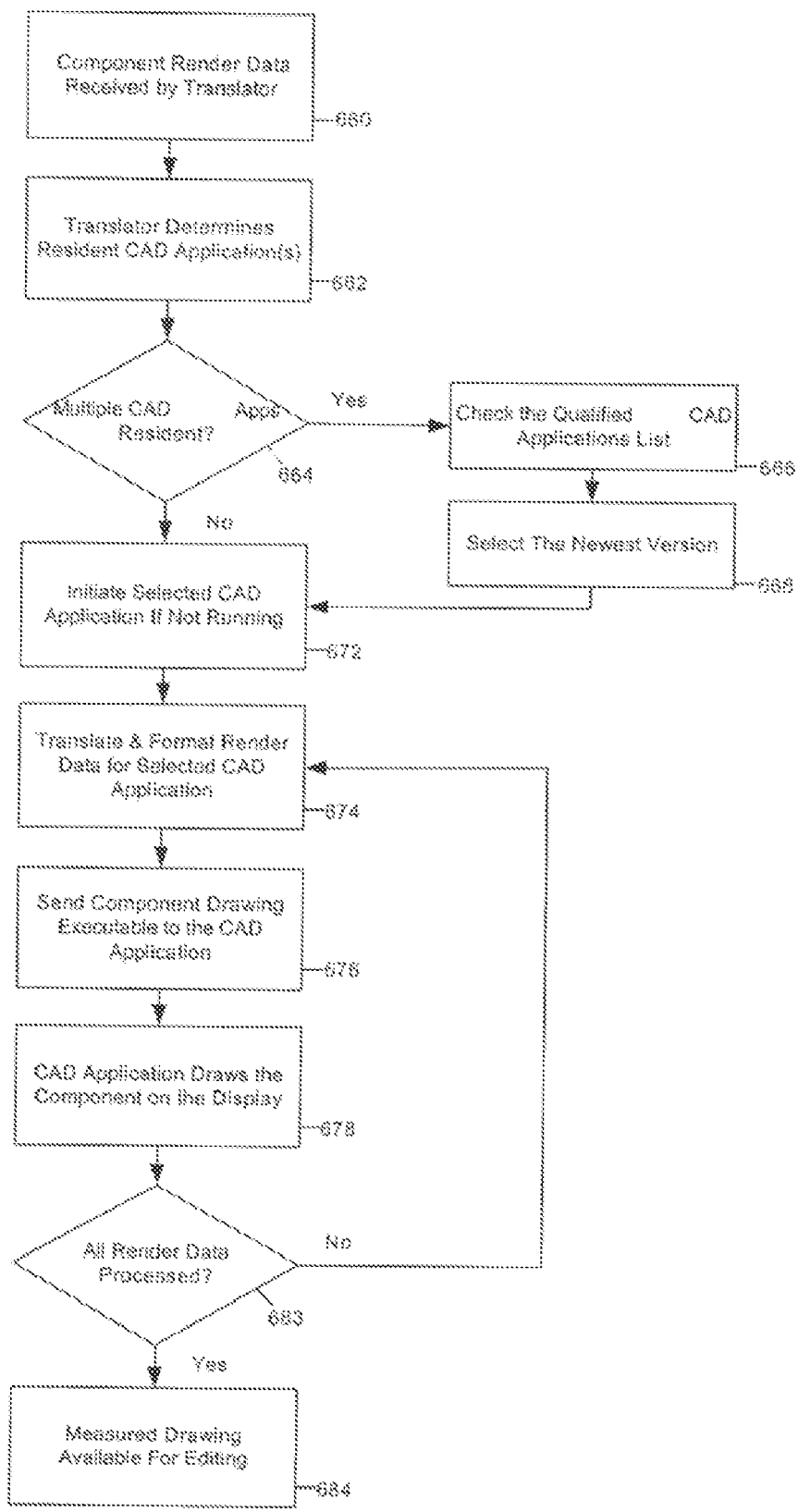
FIG. 19B shows a flowchart of a render data translation to drawing data method in accordance with an embodiment of the invention.

FIG. 19B details the steps required to complete the translation step 606 of FIG. 17, in accordance with an embodiment of the invention. FIG. 19B shows the steps involved in translating data for further use by a drawing package in creating the final measured drawing. The drawing package used may be an internal (native) application or it may be an external, third-party application. Image render data is received from the KBS system (step 660). This rendered data is independent of structural element linkage, but may be in proprietary format unusable by third-party software applications. The translator determines the resident CAD application to be used for final rendering of the measured drawings (step 662). Each rendered entry is first analyzed to determine its type, for example whether it defines a door, a fixture, or piece of furniture. Different entry types may be handled differently, such as written to different drawing layers. The entry is then associated with a corresponding drawing element type, and the values associated with the rendered entry used to find an appropriate drawing element, and to associate that drawing element with the data entry and appropriate values (step 674). The invention then uses the information to generate corresponding instructions and send the executables in the CAD language to actually create or display the drawing element on the screen (step 676). Each drawing element instruction can be communicated to the CAD drawing application as it is generated so that the measured drawing is effectively created in real-time as each of the data entries are translated (step 678). This feature allows a skilled CAD operator to supervise the final drawing process and spot any obvious mistakes as the drawing commands are processed.

Level Draw Feature

Embodiments of the invention may include a built-in "level draw" feature, that allows an operator to quickly create accurate displays of job-sites on their portable data recording device. This feature allows the operator to quickly display measured drawings while still on-site and allows them to spot potential problems without having to return to the office first. The level draw feature may be used at any point in the process of recording data, such as indicated by step 136 of FIG. 2, and step 462 of FIG. 12. When the level draw feature is invoked, it is used to create a display of the current building or structure level and display it on the screen in the manner shown in FIG. 11, wherein the user may toggle between a data entry screen 344 and a level draw screen 436.

Figure 20:
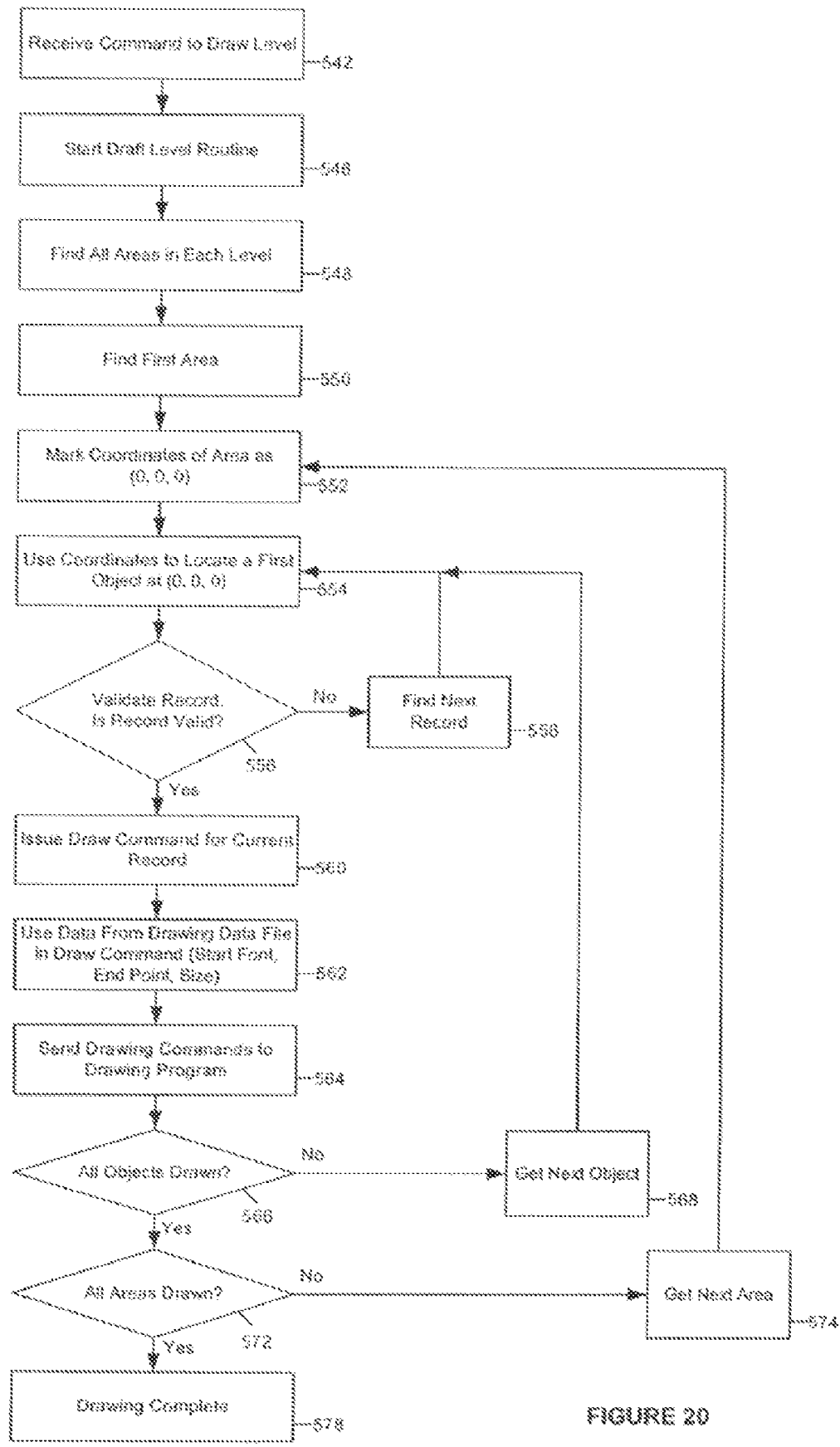
FIG. 20 shows a high-level flowchart of a level draw display process in accordance with an embodiment of the invention.
Figure 21:
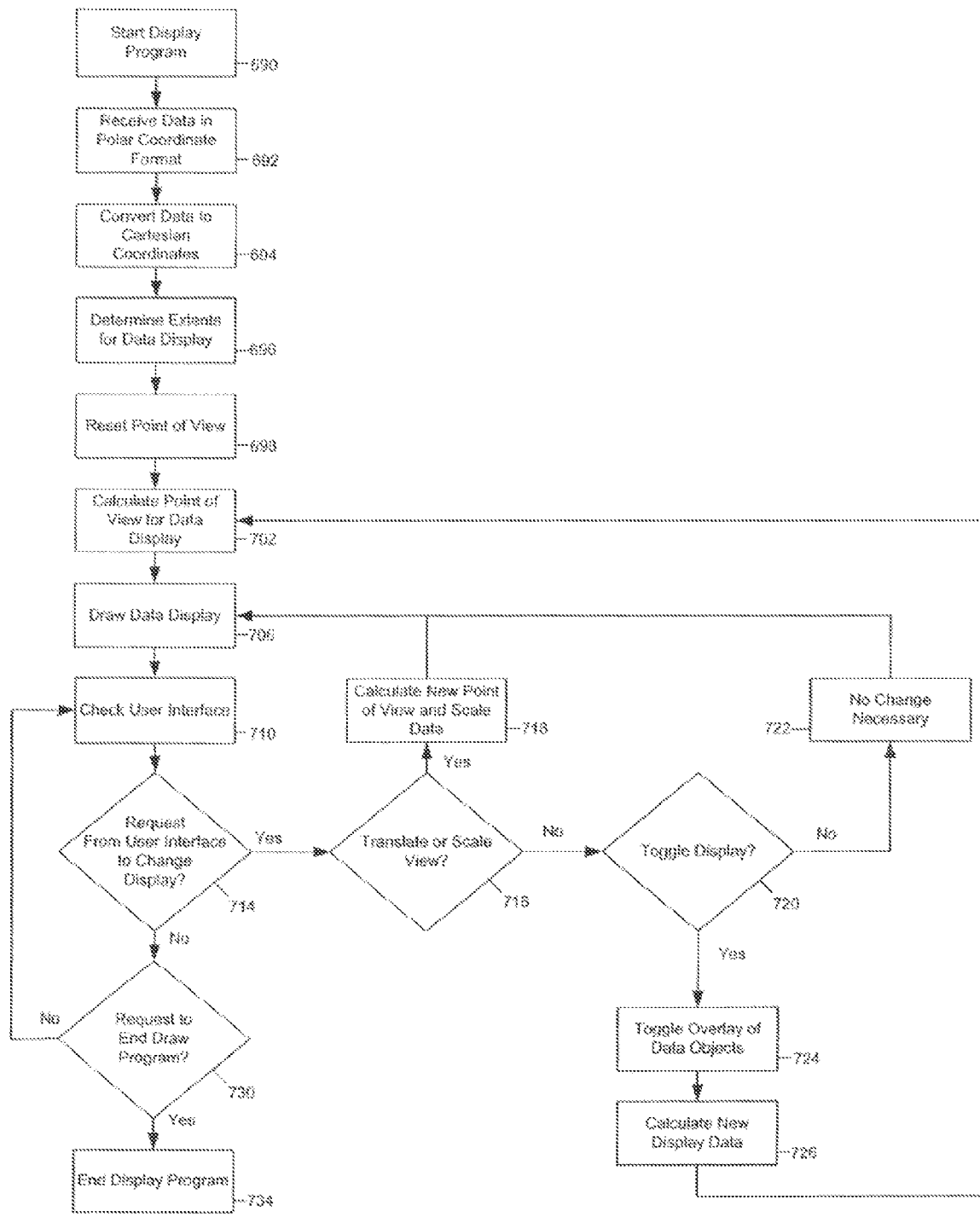
FIG. 21 shows a flowchart of a display central process in accordance with an embodiment of the invention.

FIG. 20 illustrates a high level flowchart of the operation of a level draw process in accordance with an embodiment of the invention, while FIG. 21 shows a flowchart of a data conversion and display process for use with the level draw feature. FIGS. 22, 23, 24 and 25 show flowcharts of the details of the data conversion and level draw display process described by FIG. 21.

FIG. 20 shows the steps involved in creating a level draw display, or simply a "level drawing" in accordance with an embodiment of the invention. The level drawing is intended as a quick display mechanism to allow the operator to quickly view the area or level of the job-site in which they are working, and to confirm that the data as recorded corresponds to the physical layout of the area. A translation layer receives a command from the operator to generate the level drawing for the job site (step 540). The command is interpreted to act upon the currently selected or active level (step 542). The level draw routine then takes over (step 546) and proceeds to find all areas on the chosen level which should be drawn (step 548). The first active area is found (step 550), and its coordinates set to initial values (step 552). Then, for each object or structure element, the process extracts the object entry from the database (step 554), validates it to ensure it is correctly formed (step 556), and issues commands to draw the object on screen (step 560). The process then continues with finding and drawings successive objects (step 558). For each object, data is extracted from the drawing data file (step 562) and sent to the drawing program (step 564). A check is made in step 566 to see if other objects need to be drawn, and if so the process repeats the drawing steps for those objects (step 568). When all objects on a particular area have been drawn, a check is made to see if other areas exist that need to be drawn (step 572), and if so those areas are processed (step 574). The process continues until the entire level (or group of areas) has been displayed.

FIG. 21 shows the steps involved in the display central process when using the level draw feature. In accordance with one embodiment of the invention, the actual data recorded during the mapping steps is stored in the working database in polar coordinate format (step 692). When the level draw feature is selected the entries are extracted and converted to Cartesian (X-Y) coordinates for ease of display (step 694). An extent determination step, (step 696), determines the maximal extent of the data in each (X and Y) axis. These extents are used to determine the initial point of view (or the display region) for creating the display. Initially, the point of view is set to a default value (step 698) that is sufficiently sized to contain all the data within the chosen extents, and to display that data in an optimal way (i.e. not too big, and not too small) on the screen (step 702). The Cartesian format data is then parsed to create the actual display (step 706). When the data has been properly displayed as a drawing on the screen, the process enters an interaction step 710, wherein the user interface is continuously checked for any user interaction. This interaction may amount to a user clicking on a portion of the screen so as to zoom in to, zoom out from, or to pan across the image. Interaction steps 710 and 714 operate in combination much like a state machine—nothing takes place or alters the state of the system unless there is a user interaction. When a user interaction is detected in step 714, the state is altered and depending on that user interaction a number of paths may be followed:

1. If the user wishes to end the level draw program (step 730) then the level draw process terminates and control returns to the calling program or application.

2. If the user wishes to translate the point of view of the drawing (step 716), such as zoom into the drawing, or pan from side to side, then the process calculates a new point of view (step 718) and redraws the display based upon the new point of view settings.

3. If the user wishes to toggle display overlays on or off, (step 720), then the display overlays are laid upon (or conversely removed from) the display in step 724, and the display redrawn in step 726. Display overlays may include such features as different colors for object layers, measurement data readouts that display the actual recorded value of each structural component beside the component itself, and corrected or error-minimized overlays showing how an optimally adjusted area or level might appear, relative to the raw recorded data.

Other types of overlays may be used to add or display features useful to the operator in interpreting the level drawing. Such features may include a gap triangle overlay, described in further detail below, that can be used to indicate the degree of "room closing" in the drawing, i.e., the gap between two mapped or recorded elements as a result of some error in the mapping/measurement process.

Since the interaction step 714 acts much like a state machine, unless the user specifies a change to the level draw display the process will assume no change is currently necessary and will loop back to check again for a user request (step 722). At any point the user may request to end the level draw program (step 730), at which point the process ends and control is returned to the calling program (step 734).

Figure 22:
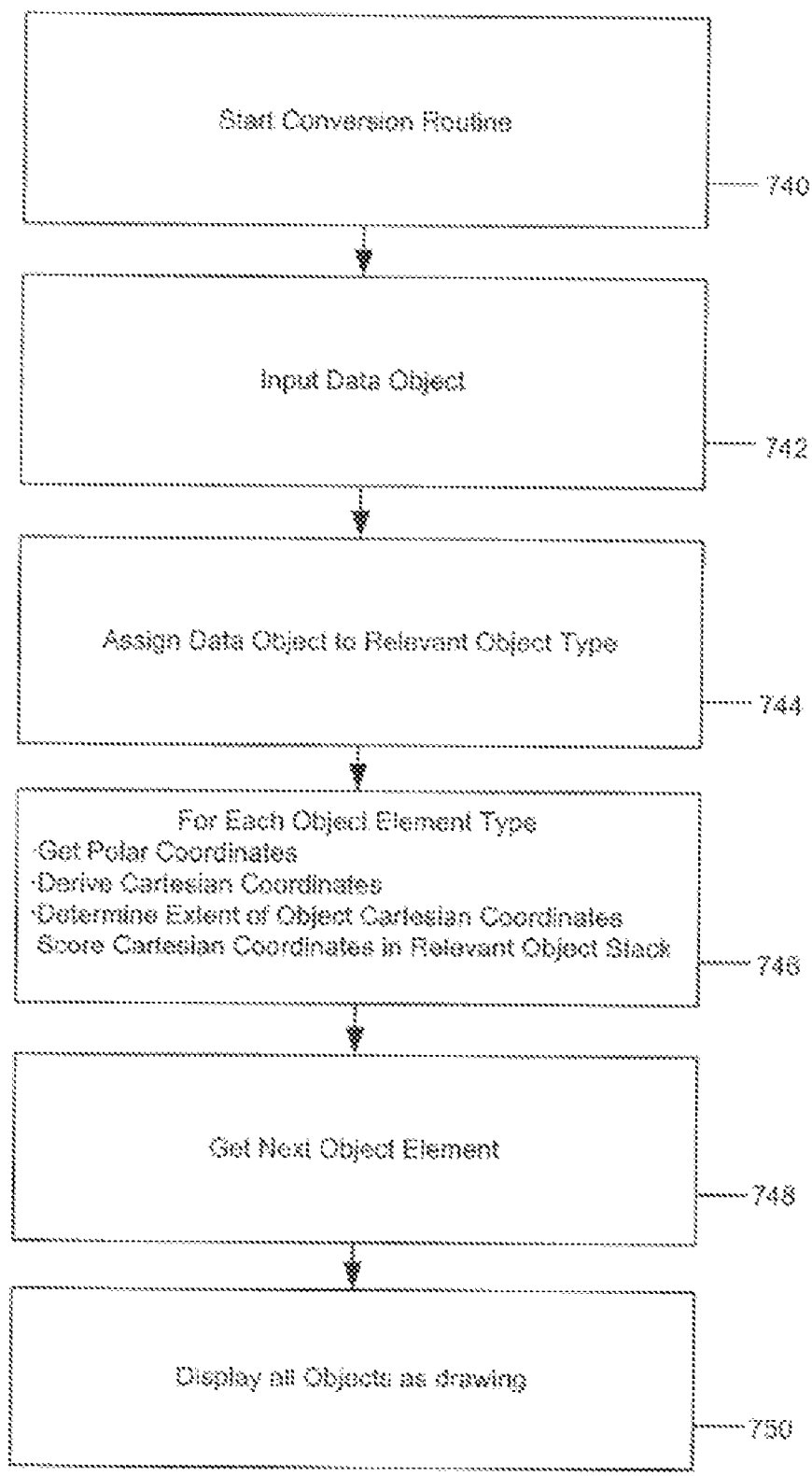
FIG. 22 shows a flowchart of a data conversion and area/level draw display process in accordance with an embodiment of the invention.
Figure 23:
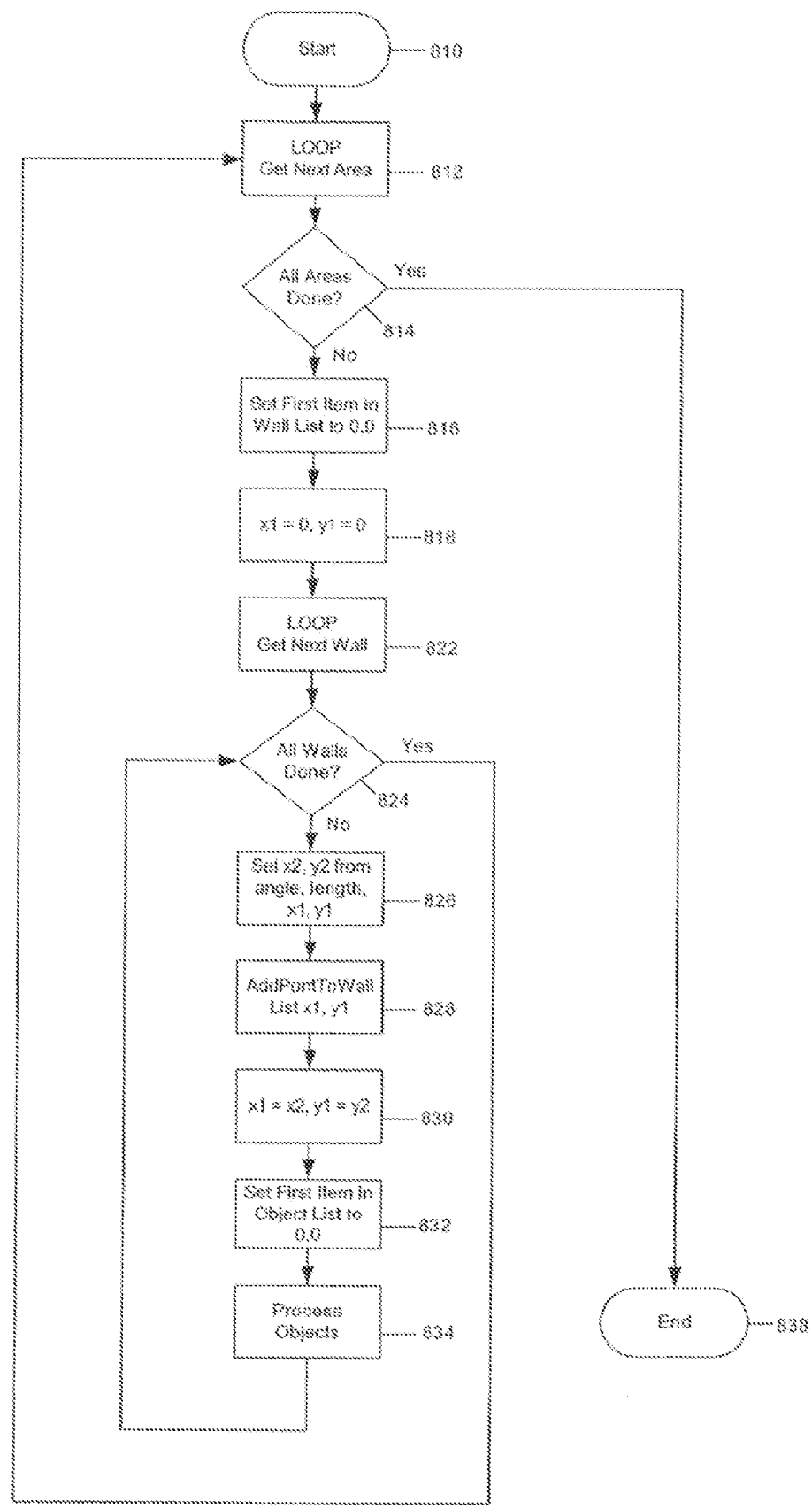
FIG. 23 shows flowchart of a detailed routine for use with the area and level draw display process of FIG. 22.
Figure 24:
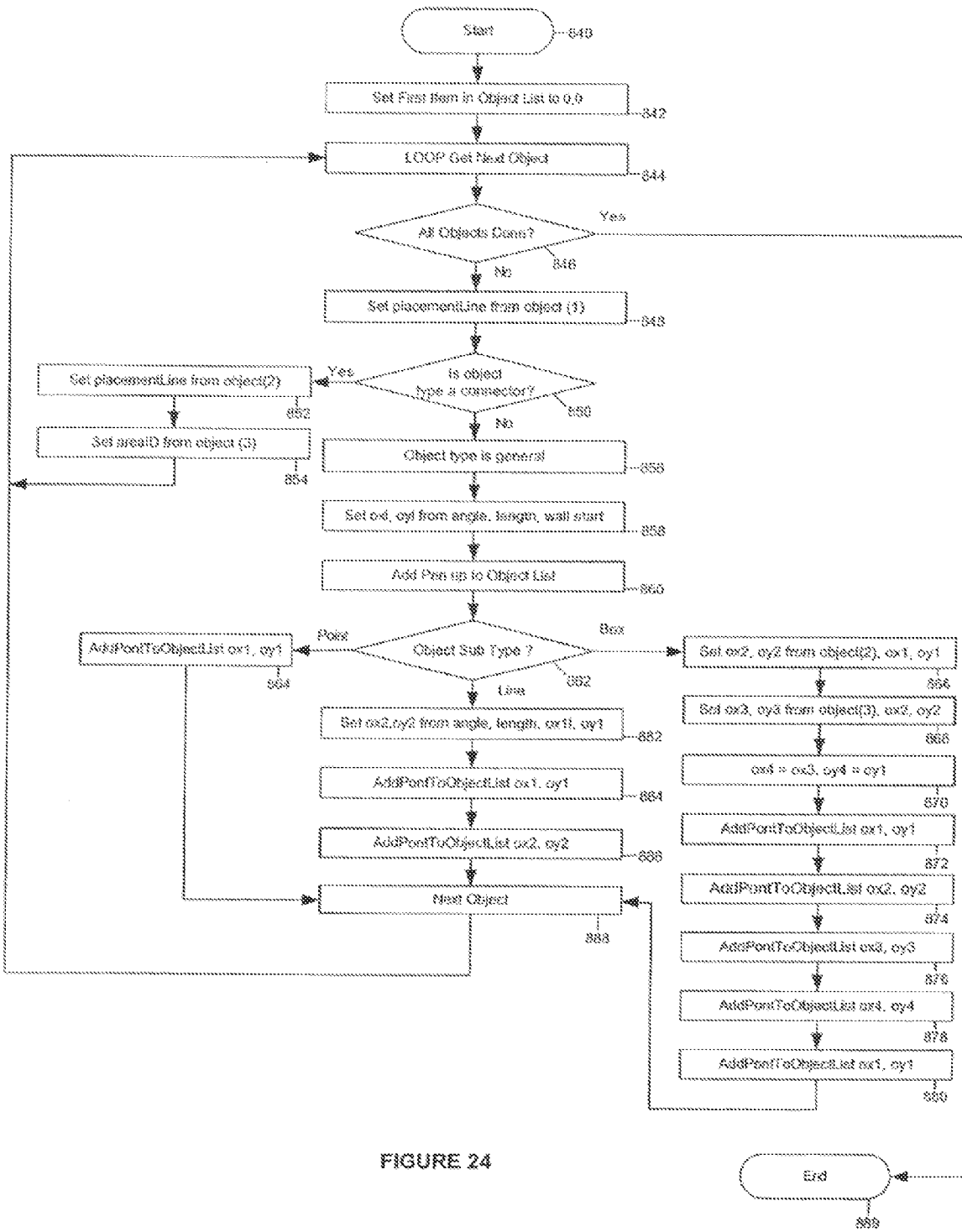
FIG. 24 shows a flowchart of a detailed routine for use with the area and level draw display process flowchart of FIG. 22.
Figure 25:
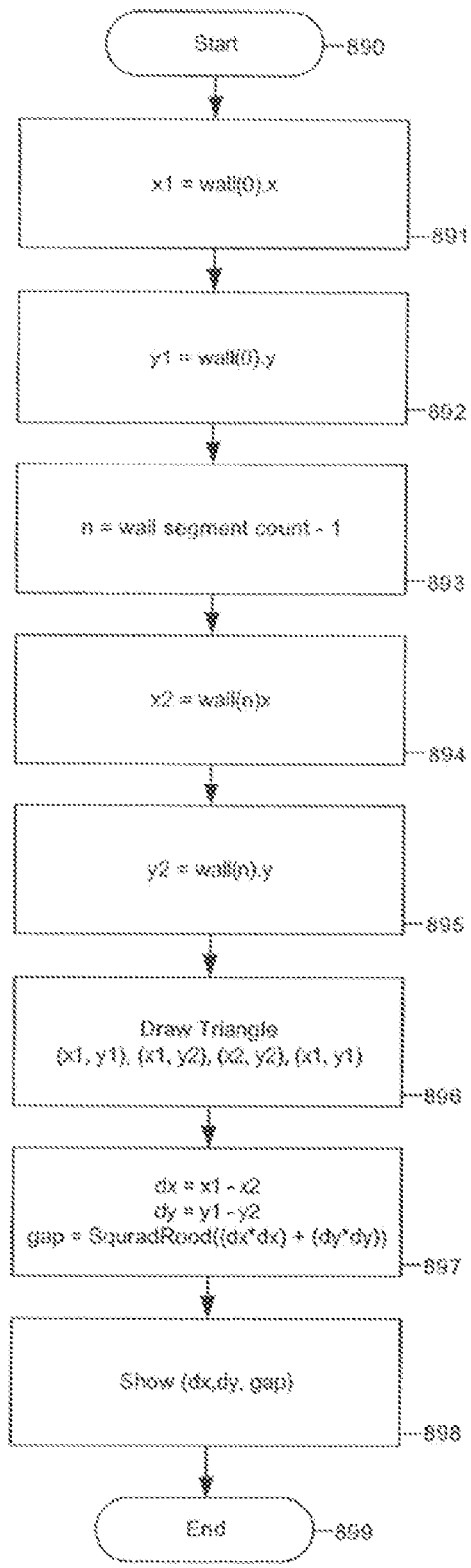
FIG. 25 shows a flowchart of a detailed routine for displaying xy error for use with the area or level draw display process of FIG. 22.

FIGS. 22, 23 and 24 illustrate in detail the steps involved in generating and displaying the level draw display, and may be encompassed within step 706 of FIG. 21. FIG. 25 illustrates the steps involved in calculating an error gap triangle display that may then be used as an overlay to assist the operator in interpreting the displayed data (specifically the displayed level or area).

In regard to FIG. 22, when the level draw feature is selected, a conversion routine is started (step 740) to convert the data from its stored, relationally-linked format, into a format suitable for display. Each structure element or object within the display extents is chosen from data storage as input into the level draw routine (step 742). In accordance with one embodiment of the invention, structure elements and objects are assigned an object type as they are processed, (step 744). For example, wall objects may be assigned to an object type "wall." Window objects may be assigned as "window-type" objects, furniture objects to a furniture type, and so on. Then, the invention retrieves the polar coordinates for each object type, derives the Cartesian coordinates, and stores those coordinates in a corresponding object stack (step 746). One stack is maintained for each object type (step 746). Storing all the objects in a stack in this manner allows the system to generate a display of only, say, the walls of the structure, very quickly and with minimal processing. Subsequent structure elements are filtered and assigned to their relevant stack in this manner (step 748). When complete, the object stacks (and their Cartesian coordinates) may be processed to generate the level display.

FIG. 23 shows in further detail the conversion of the polar coordinate data to Cartesian coordinates. When the conversion routine is started (step 810), the process first checks for an area to be processed (step 812). If all areas have already been processed, the routine terminates (step 838), but if any areas are ready to be processed (converted from polar to Cartesian coordinates), as determined in step (step 814), the process extracts an entry from the wall type object stack (step 816) and sets the first entry from that stack equal to coordinates (0,0) in step 818. The process then loops to find the next wall (step 822). If all the walls from the wall type object stack have been processed, as determined in step 824, the process begins processing of the next area. Otherwise, as each wall is extracted and processed, its start point is calculated from knowledge of the previous entry (step 826). The new wall's coordinates are thus calculated (step 828), and are used as the starting point for the subsequent entry (step 830). As each wall entry's coordinates are calculated and processed, the objects contained within that particular wall are processed (step 834) by taking each entry from the object stack that relates to the current wall, and processing its coordinates in a similar fashion as described above.

FIG. 24 shows a further detail of the object processing routine, and illustrates how the process recognizes "true objects" or structure elements from "connector objects". Connector objects are used to connect true objects (walls, windows, etc.) but are not by themselves real-world objects. They may however take a part in the error minimization and gap triangle features described below. In FIG. 24 a first object is selected for processing (step 842). The process uses a loop (steps 844, 846, 888) to check for the presence of subsequent objects, beginning with the current object. A placement line is first calculated (step 848) to determine the position of the next structure element, which may be a wall object, a non-wall object, or a connector object (a connector). The current object is first determined as to whether or not it is a connector (step 850). Connector objects are hidden from view and are primarily used as displacements or vectors for other (non-connector) objects (steps 852, 854). If the current object is not a connector then it is instead considered a general type object (step 856). Its initial start coordinates are calculated from knowledge of the object's dimensions (length, height) and its insertion point into another object, such as a wall (step 858). A pen-up command or equivalent (step 860) may be issued to effectively distinguish between wall elements and other (non-wall) objects. If the penup command is not used, each of the non-wall objects would be consecutively linked together, creating an on-screen jumble of lines and connections. Then, depending on whether the object is a point object, a line object, or a box object, the process may handle the drawing of the object in a number of different ways (step 862). Point objects are simply inserted as their coordinates dictate (step 864). Line objects (that may be typically used to represent windows, doors, etc.) are inserted as their coordinates and their angle, length and displacement dictate (steps 882, 884, 886). Box objects (that represent structural features, three-dimensional objects and furniture, etc.) are inserted as a number of points and connected line segments (steps 866-880).

FIG. 25 illustrates a flowchart of a gap triangle feature for use with an embodiment of the invention. The gap triangle may be overlaid on an area or level drawing to indicate the error present when two or more segments of the area drawing that should join or abut one another actually don't as presented by the data. The gap triangle feature can thus be incorporated into any level draw or display step, such as step 462 of FIG. 12, step 578 of FIG. 20, or step 706 of FIG. 21. The process begins by calculating a starting coordinate for a first wall segment, in terms of Cartesian X and Y coordinates x1, y1 (steps 891, 892). The last wall segment in the series is found (step 893), and it's coordinates similarly calculated x2, y2 (steps 894, 895). The result is a sequence of points (x1, y1), (x1, y2), (x2, y2) that when joined together create a triangle (step 896). This triangle may be represented on the screen or display as a visual indicator, or more conveniently, the values of length, width, and hypotenuse extracted (dx, dy, gap) (step 897), and these values indicated on the display (step 898). The option of being able to see these values on the display gives the operator a good indication as to how the room or area drawings is "closing", or fitting together properly, what measurements may be in error, and most likely should be adjusted or re-measured to ensure the room closes properly.

Data Error Minimization

An embodiment of the invention includes built-in features which attempt to automatically detect and minimize any errors in the recorded data which result in portions of the building, structure, or job-site not meshing together correctly when displayed or drawn. The data error minimization feature introduces a measure of imprecision into the data processed by the system and then allows it to equilibrate to an optimally error-free state. Roughly described, in one embodiment of the feature the minimization process forces the start and end points of the area (a level, a room, etc.) to join or close. This task may force a couple of wall segments (namely the first and last wall segments) to be slightly distorted away from their recorded measurements, introducing a measure of imprecision in the data. The closing process is then repeated with a second set of wall segments, and so on around the entire room or area, until all of the wall segments have been slightly modified so as to minimize the total error.

Since the method used by the current invention is prone to finding local minima rather than the global minimum as it searches for a solution, noise may be introduced into the data to force the system to test beyond the local minima for the true global minimum and hence the best solution. The error minimization feature may be used in conjunction with the triangle gap feature described above, or can be incorporated into any level draw or display step, such as step 462 of FIG. 12, step 578 of FIG. 20 and step 706 of FIG. 21.

There are several parts to the error minimization process. First, the recording error is estimated within a small local portion of the recorded data, perhaps over two drawing elements. Most commonly the two drawing elements chosen are wall segments, since the operator is most often concerned with the error on the recorded wall element or wall object data, and not necessarily the error on the non-wall object data. Of course, the same methods may be used to minimize the error over just the wall segments, just the non-wall objects, or any combination of these and other structural elements. Following the initial local error determination, the error can be distributed across the entire polygon representing the area on the screen.

The first step of estimating the error on a single segment or pair of drawing elements can be evaluated by considering a number of contributing factors, which may be chosen to best reflect the real-world problems encountered, or the particular wishes of the operator. Some typical criteria include:

A small decrease in the measured length, such as the length of a wall, contributes less error than a small increase. This reflects problems with typical laser tool and other distance measurement devices that tend to overestimate inter-wall distances, rather than underestimate them. The problem most commonly occurs whenever the laser level device is not maintained perfectly level to the floor, and so measures the inter-wall separation at a slight diagonal angle, and hence determines too large a value for the distance. Accordingly the system compensates more for overestimation than underestimation.

A change in angle contributes eight times the error that a change in length contributes. This reflects the operator's desire to keep angles fixed at their measured values, primarily for a more convenient display, and also because wall angles are rarely measured inaccurately. Accordingly, the length is more likely to change when adjusting the displayed drawing since the change in length results in a smaller error. A change in angle of 180 degrees will contribute the maximum angle error, while a change in length of 100% will contribute the maximum length error.

A nearby orthogonal angle will contribute little, and/or possibly negative, error. In practice, this causes inter-wall angles to 'pop' or snap to a nearby orthogonal, which is typically a desired feature in the final measured drawings.

The segment error is set to equal the sum of the angle and the length errors, with the sum then squared. Squaring the error in this manner causes the system to have a preference for smaller errors. This drives the distribution of calculated error across or throughout the area being investigated:

$$segment\_error = (angle\_error + length\_error)^2$$

Having chosen a method and criteria by which to calculate the error value, an error function is derived encompassing each of these error criteria. The local (two-segment) error may then be minimized according to this function by using a minimum angle step and a minimum length step, and recalculating the function at each iteration. In one embodiment the error is estimated by placing a two dimensional grid over two neighboring segments, and using an anchor point to fix their position in space relative to the area as a whole. The anchor point may be a third segment, or it may be an end of either of the two segments that will not be moved by the error minimizing step.

Figure 27:
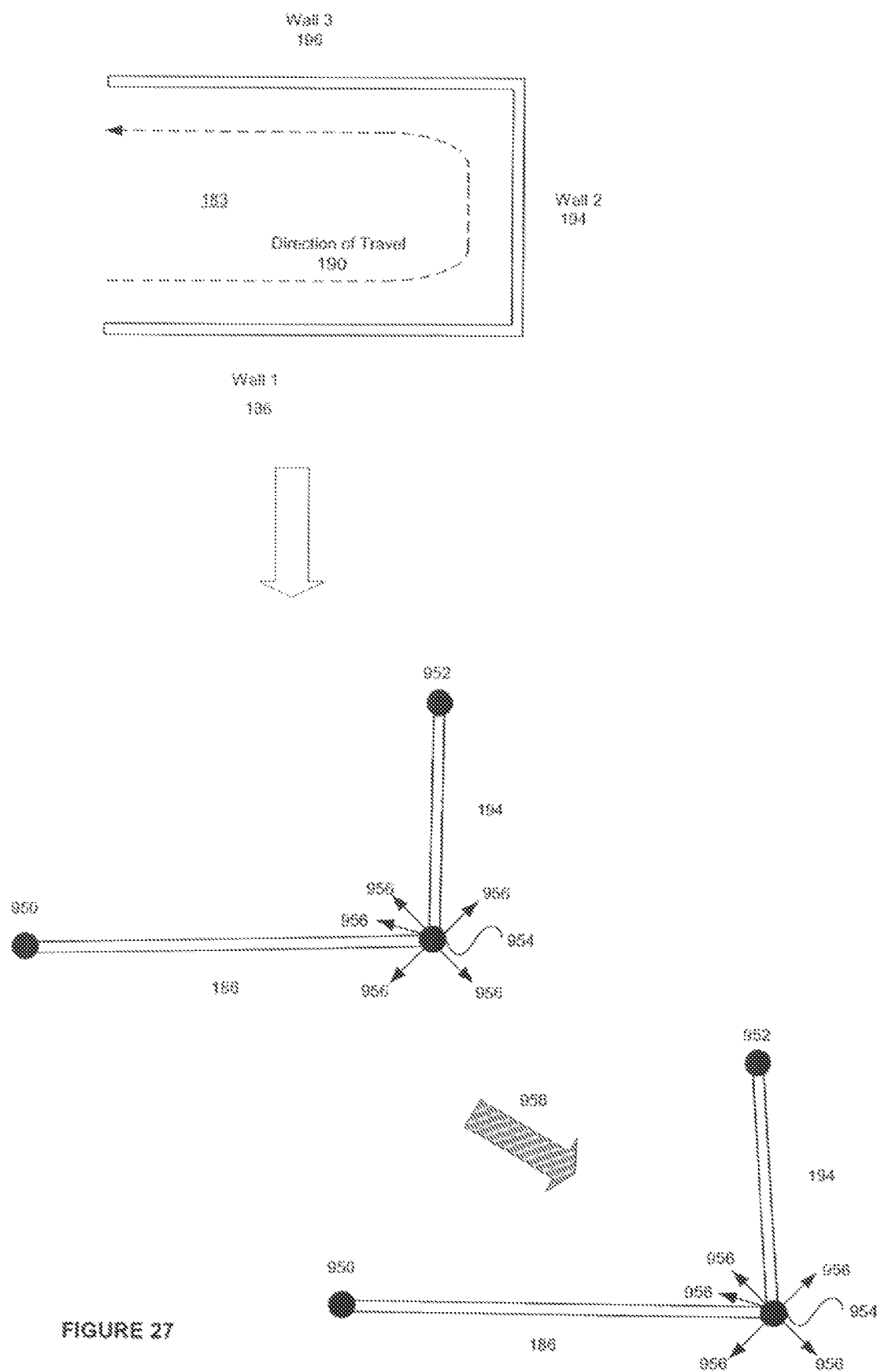
FIG. 27 shows an illustration of an error minimization step for use with the process of FIG. 26.

For example, as shown in FIG. 27, two wall segments, wall 1, 186 and wall 2, 194 neighbor, or are connected to, one another. To estimate and/or minimize the error on these two segments, both segments are first fixed in place relative to an anchor point, in this case the distal ends of each segment 950, 952. The connection point 954 is then free to move in all directions 956. As the connection point is moved, the angle separating the two segments varies, as does the length of each segment. After each movement 958, the error function can be evaluated to determine whether this move results in a minimizing of the error. This process may continue for a fixed period of time, or number of steps, or until a convergent minimum error is found. The minimum total error configuration is then selected as the error value for that segment.

The total error for the current area under investigation (i.e. the sum of all area segments) may then be minimized in an optimal fashion. As a first step, the final segment in the area is made to end at the beginning of the first segment in the area, i.e. the area is forced to "close". The error minimization is then applied to successive adjacent segment pairs around the area perimeter until the entire polygon representing the work area is adjusted to a convergent or minimum error state.

Since the squaring of the error places a strong downward emphasis on the system making a small change preferable to a large change, this causes the system to distribute the change over as many joints as possible. This emphasis or pressure also tends to force the system to find a solution rather than to meander about or enter into an unending series of changes. A cycle limit may be placed on the system to ensure a solution is found in a reasonable period of time, even if it is not necessarily the optimal solution.

Figure 26:
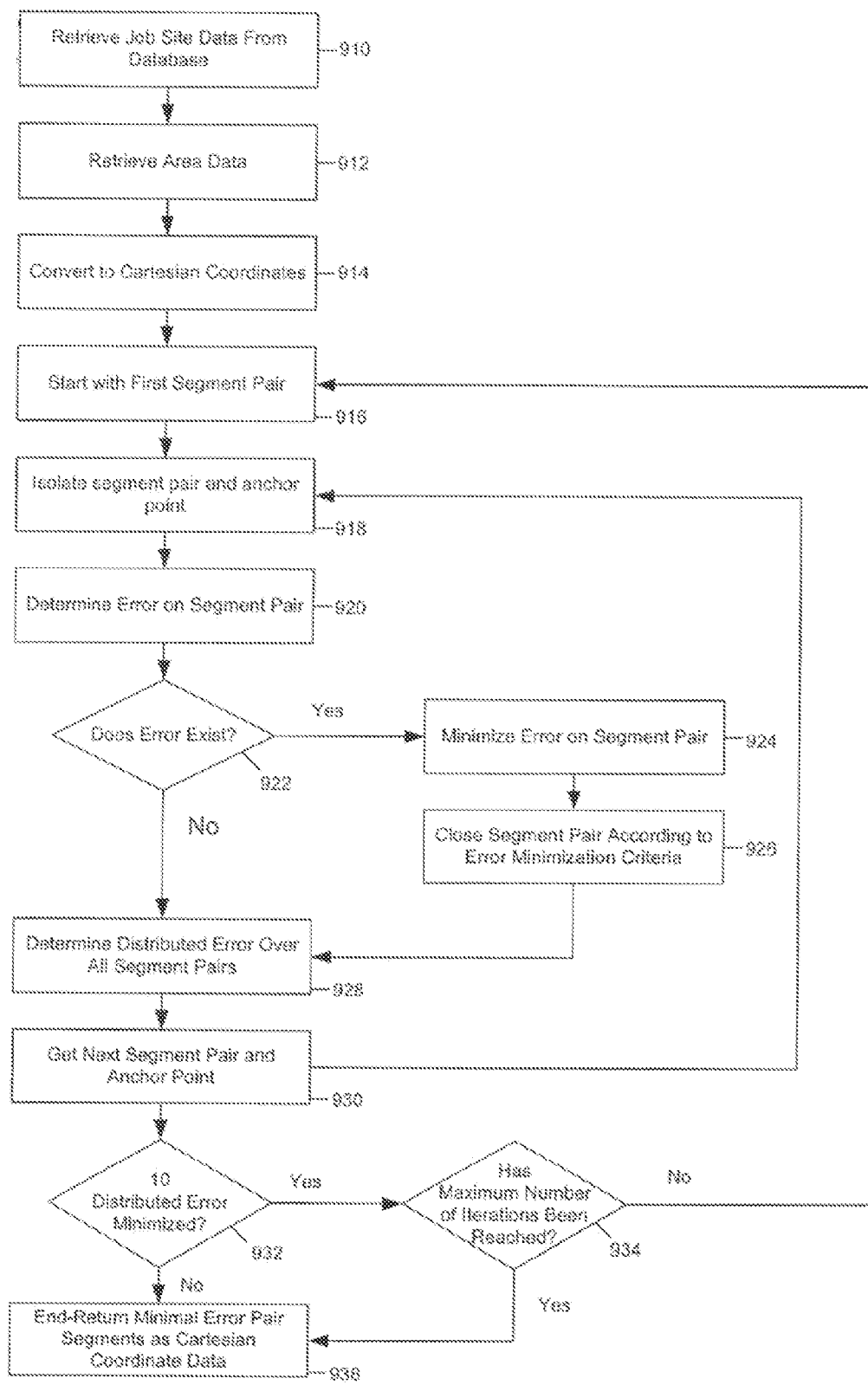
FIG. 26 shows a flowchart of an error minimization routine in accordance with an embodiment of the invention.

FIG. 26 details the steps involved in minimizing the error in the drawn or displayed area-draw image. As shown therein, in step 910 the job-site is accessed or retrieved from the working database. Since the area draw feature is designed first and foremost to quickly create layout drawings of the area of a job-site in which the operator is currently working, only a portion of the job-site data relating to that area may be extracted (step 912). The relational entries are processed to include standard Cartesian coordinates (step 914), using the methods described above, to create a representation of the area that removes any dependence upon the relational links. the position of tach structural element is thus defined in absolute terms, having a set of positional coordinates, lengths, directions etc. The error minimization function starts with a first segment pair (step 916, i.e. first and second adjoining or connected elements are chosen. Referring to the area illustrated in FIG. 5, this first segment pair may include for example wall 1 (step 186) and wall 2 (step 194). In order to calculate the error on this segment pair, the system effectively isolates the pair (step 918), and determines the error on the segment according to a set of built-in rules (step 920), described above. If an error exists, as decided in step 922, then the process attempts to minimize this error according to the rules by adjusting the segment elements slightly with respect to one another and to an independent anchor point (step 924). A primary goal is to close the segment pair (step 926), i.e. to ensure that the individual elements in the segment pair correctly abut one another.

In a similar fashion, having calculated the error on a first segment, the process attempts to do the same for each consecutive segment represented within the area (step 928). This effectively distributes the sum error over the entire job-site. The next segment pair and anchor point is chosen, and the error calculated accordingly (step 930). These steps are then repeated for all other segments. The entire process continues either until the error has been minimized (step 932) to within a predetermined degree of accuracy, or when a maximum number of iterations have been reached (step 934). When finished the relative positions of the elements within the job-site will be adjusted so that the error is minimized according to the chosen rules. These adjusted positions can then be evaluated, converted to coordinates, and written out to a screen or equivalent display device for viewing by the operator.

In another embodiment, the operator may be allowed interactive control over the error minimization process. The operator may be given a set of controls, such as a slider control, which dynamically alters the criteria within the error function while the area is actually being displayed. This causes the display to be dynamically distorted as the system calculates the optimal configuration at each new slider position setting. The interactive slider control allows the operator to introduce some subjectivity into the final drawing, by perhaps favoring perpendicular angled walls at the expense of some error in the wall lengths. The extent to which an operator uses this feature is dependent upon the demands of their customer who will eventually received the final measured drawing, since some customers will be willing to sacrifice some accuracy to have a "prettier" drawing, while other customers will want the utmost drawing accuracy.

User Interface Implementation

The following section illustrates a particular implementation of the system in accordance with an embodiment of the invention, in which the system can be operated using a graphical user interface. Typically the graphical user interface runs or executes as an application on a graphical or windows type platform, for example a Windows CE device, or any other small portable handheld device that provides graphical interfaces. It will be evident that the user interface and Windows described and discussed below are given for purposes of illustration, and that other implementations may be derived that utilize some or all of the features described herein, while remaining within the spirit and scope of the invention.

Figure 28:
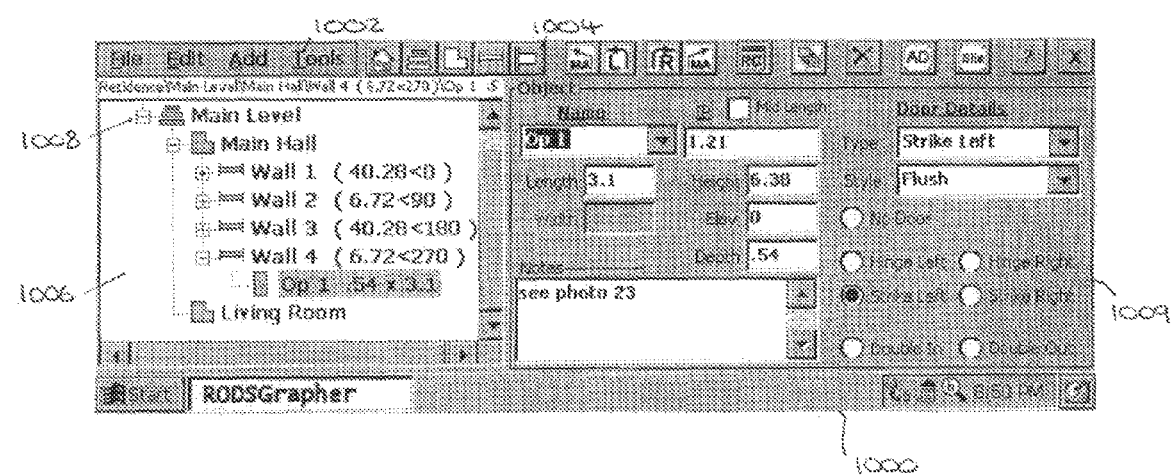
FIG. 28 illustrates a data recording application (Grapher) graphical user interface or GUI in accordance with an embodiment of the invention.

FIG. 28 illustrates a data recording application (Grapher) graphical user interface 1000 or GUI in accordance with an embodiment of the invention. The data recording application interface (Grapher) is used primarily by an operator to take recordings of a building or site in the field. Embodiments of the Grapher application can also be used to provide an all-in-one measured drawing solution, complete with drawing rendering capability and file output options. Typically the Grapher application runs on a small handheld device, such as a Windows enabled PDA or similar portable device that is portable enough for the operator to carry with them while them while they move about the building or site taking measurements. The Grapher interface provides an easy intuitive means to the operator by which they can quickly record data on particular building objects, and associate attributes and values with each object. As shown in FIG. 28, the Grapher interface includes a tool bar 1002 with various icons 1004, and an object hierarchy display window 1006 for displaying on an object tree 1008. The object tree 1008 indicates to the operator the objects that they have currently recorded. An object attribute screen 1009 to the right of the interface allows the operator to enter attributes associated with each object. Some attributes may have default values, for example, a door may include a default type of "Strike Left" and a default style of "Flush". However, these values can be easily changed by the operator to reflect the particular environment they encounter.

Figure 29:
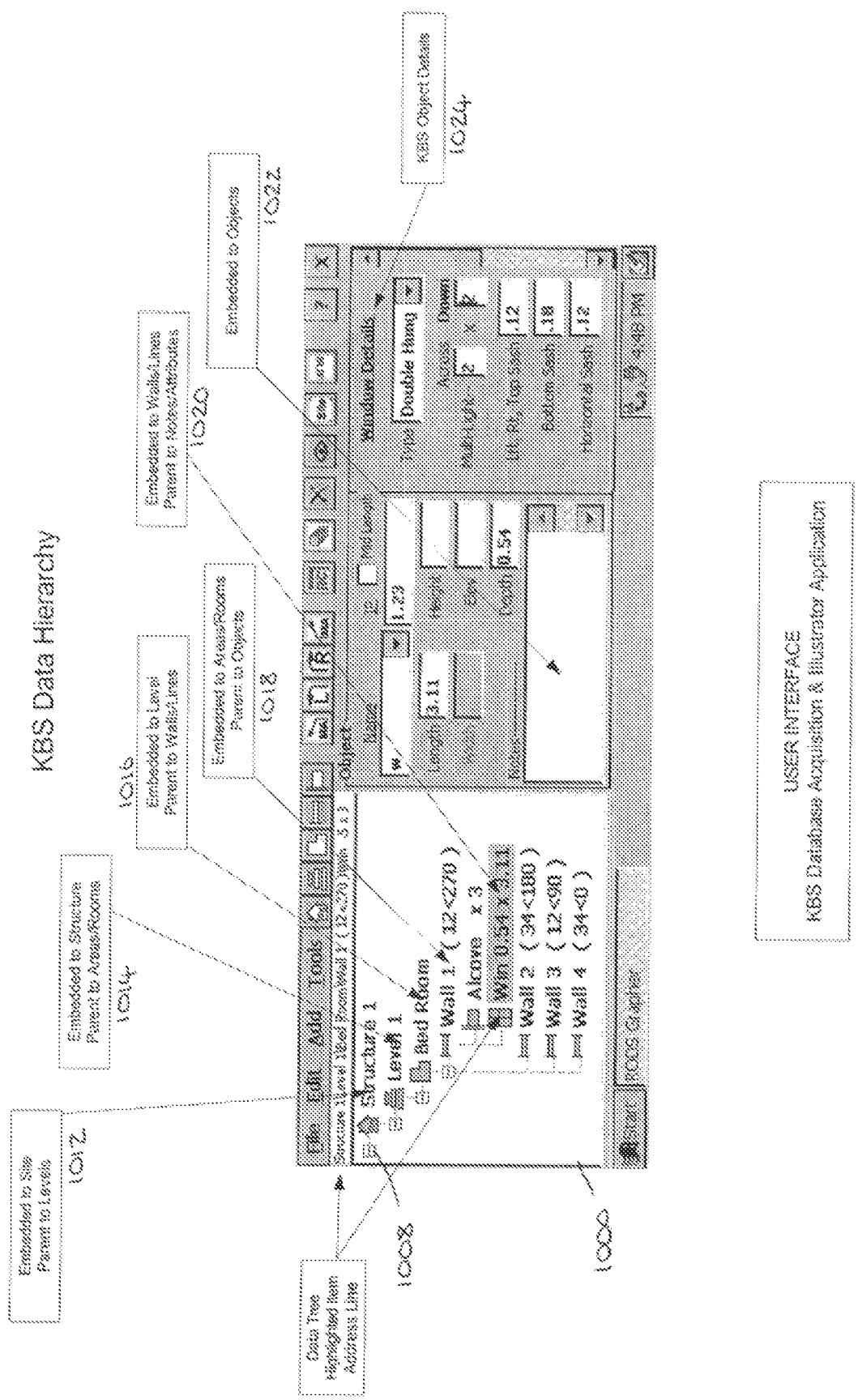
FIG. 29 illustrates a more detailed view of the Grapher interface in accordance with an embodiment of the invention.

FIG. 29 illustrates a more detailed view of the Grapher interface in accordance with an embodiment of the invention. The Grapher user interface is used to provide input into the KBS database. For example, as shown in FIG. 29, the object hierarchy may include a Structure 1, Level 1, first initial room (in this instance a bedroom), walls associated with that bedroom, and then windows associated with that wall. As the operator traverses the data hierarchy, the interface can be designed so that the highlighted item within the hierarchy also appears in the menu or address line. As can be seen in FIG. 29, the Grapher application provides the operator with an easy means by which they can record objects in a hierarchical manner. For example, in the environment shown in FIG. 29, the Structure 1 1012 is embedded to the site parent object 1014 and is in turn a parent to the levels 1014. Similarly, the levels 1014 are embedded to the structure 1012, and act as parents to the areas and rooms 1016. The areas and rooms 1016 are embedded to the level parent 1014 and act as parents to the walls and other lines 1018. The walls 1018 are embedded to the areas and rooms 1016 and act as parents to the objects 1020. The objects 1020 are embedded to the walls and lines 1018 and act as parents to the object notes 1022. As shown in FIG. 29, these notes and attributes may include, for example, name, insertion point, length, height, width, elevation, depth, and particular notes that refer to this object. Since the KBS understands the various attributes that may be associated with an object type, for example, a window type, the system also presents to the operator the ability to record attributes specific to this object type. For example in FIG. 29, the KBS understands that in the example shown this particular object is a window, and provides the operator with a windows details box 1024 which can be used to specify particular attributes associated with this object, i.e., window, for example, the window type, the fact that the window may be multi-lighted and how many lights are in the window, and whether the window is a top, bottom, or horizontal sashed window. It will be evident that if the object is not a window but some other type of object, that the system is intelligent enough to provide a different object specific interface so that the attributes associated with that particular object type can be viewed and/or modified.

Figure 30:
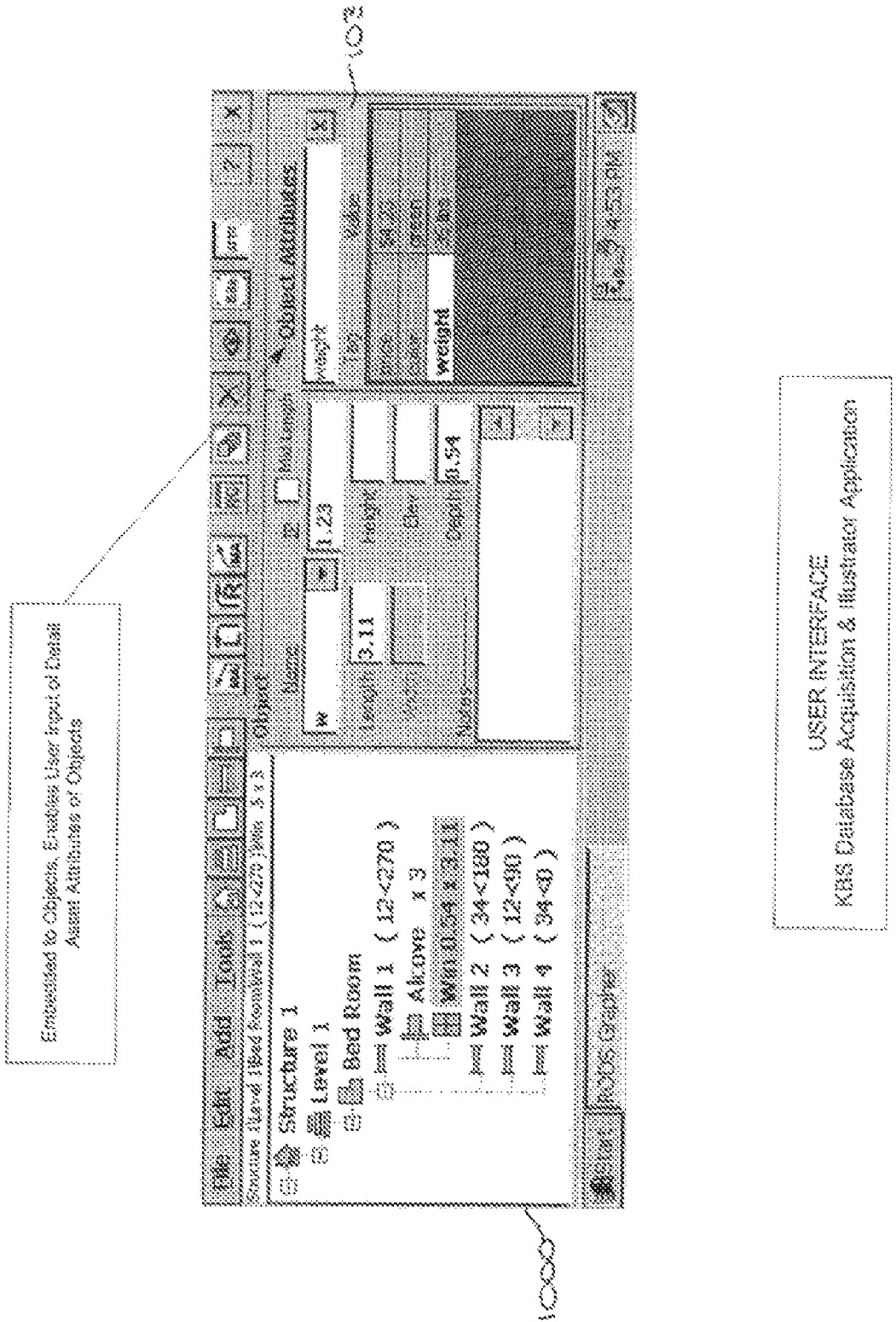
FIG. 30 illustrates an alternate view of the Grapher user interface in accordance with an embodiment of the invention.

FIG. 30 illustrates an alternate view of the Grapher user interface in accordance with an embodiment of the invention. As shown in FIG. 30, object attributes 1030 can be embedded to objects which enable the user to enter input of detail asset attributes for this particular object. For example, the object attributes may include the weight of the object, i.e., the weight of the window, or its color or estimated price. Other object attributes can be entered depending on the needs of the user.

Figure 31:
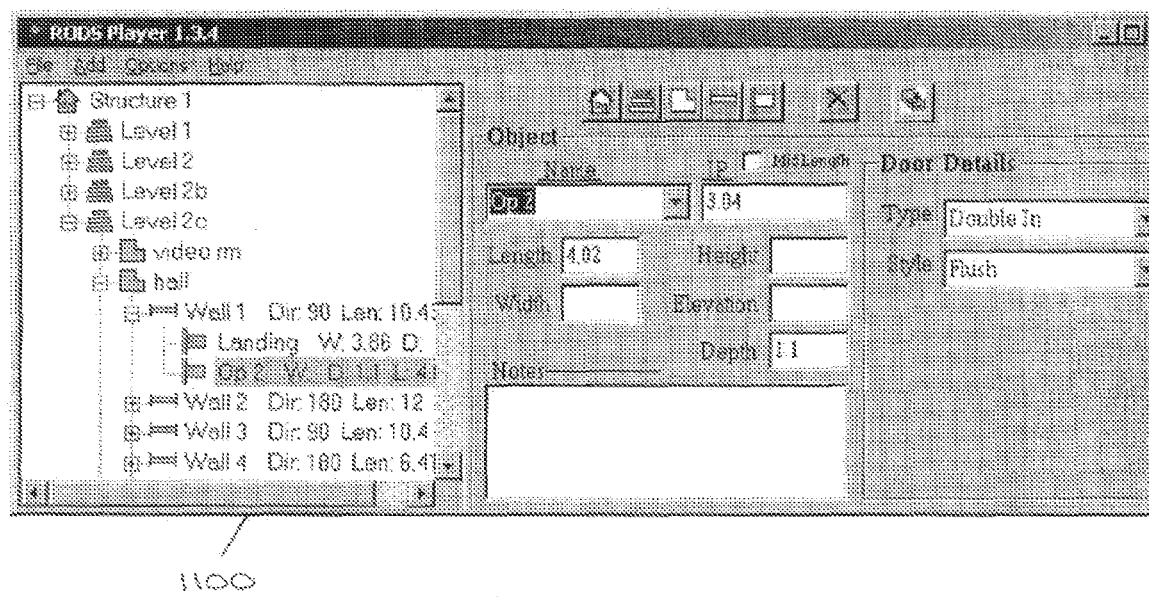
FIG. 31 illustrates a data player application (player) interface or graphical user interface in accordance with an embodiment of the invention.

FIG. 31 illustrates a data player application (player) interface or graphical user interface in accordance with an embodiment of the invention. As shown in FIG. 31, embodiments of the invention may include a player application 1100 that allows a operator or some other user to view or playback recorded data items, amend them as necessary or export them to other CAD applications. In normal use the player application may be part of the portable system used by the operator in the field, or more likely may be part of a larger system used at a base or office at which the player operator uses the player to retrieve and edit data previously recorded and to create measured drawings.

Figure 32:
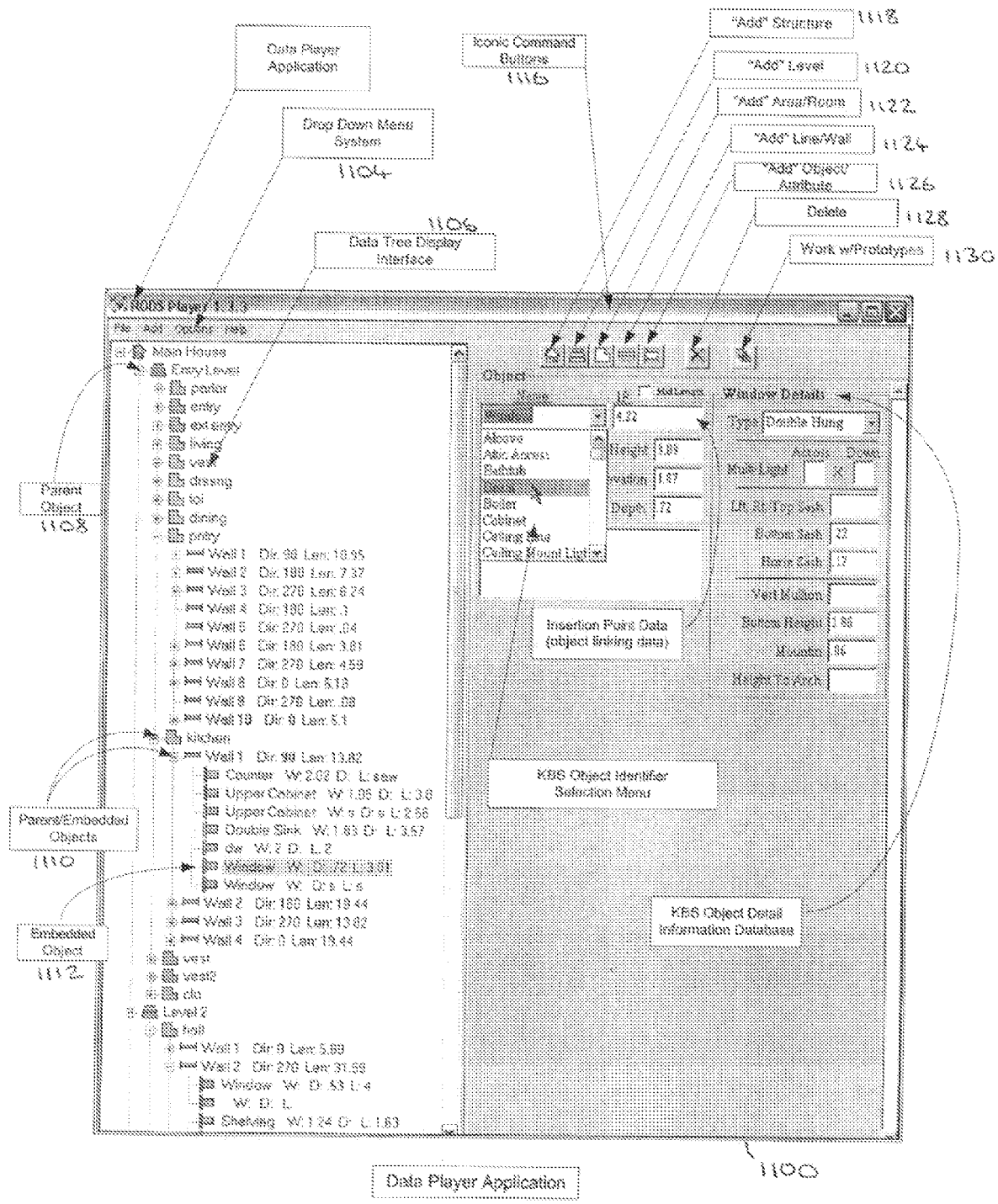
FIG. 32 illustrates an alternate view of the player interface in accordance with an embodiment of the invention.

FIG. 32 illustrates an alternate view of the player interface in accordance with an embodiment of the invention. As shown in FIG. 32, the player interface 1100 largely resembles the Grapher interface for ease of use in operating. As shown in FIG. 32, the player includes a drop down menu 1104 for controlling the player application itself, and a data tree display interface 1106 that largely reflects the data hierarchy recorded in the Grapher application. In the example shown in FIG. 32, the player is displaying a main house site, which includes a number or levels, rooms, and associated objects within those levels and rooms. For example, the parent object 1108 may be the entry level, which includes and embedded object such as the kitchen, and within that embedded kitchen object, various doors, counters, and window objects 1112. A set of iconic command buttons 1116 at the top of the player interface are used to control the embedded objects. These icons include an add structure icon 1118 for adding a new structure, an add level icon 1120 for adding a level within that structure, an add area or room icon 1122 for adding areas and rooms within that level, an add line or wall icon 1124 for adding lines or walls within the area or room, and an add object attribute icon 1126 for adding objects or attributes associated with that wall. An additional icon 1128 allows the operator to delete objects. An additional icon 1130 allows the operator to work with prototypes, described in further detail below. As can be seen in FIG. 32, the operator using the player application is fully able to view and modify data entries previously recorded using a Grapher interface, such as viewing a window object and modifying attributes such as the insertion point or the KBS object detail information associated with that window or object.

Figure 33:
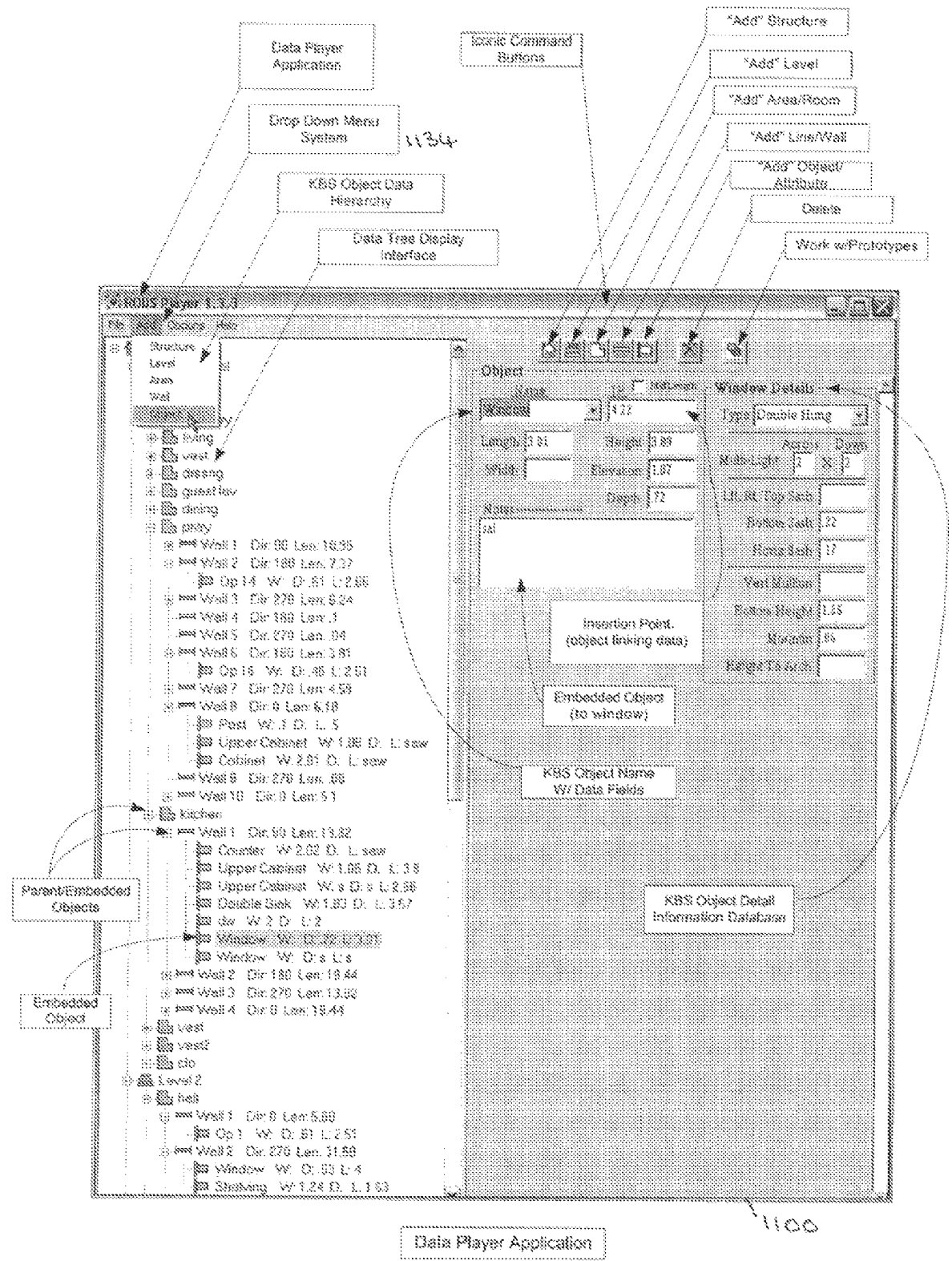
FIG. 33 illustrates an alternate view of the player application interface in accordance with an embodiment of the invention.

FIG. 33 illustrates an alternate view of the player application interface in accordance with an embodiment of the invention. As shown in FIG. 33, the application drop-down menu 1134 includes options to add structures, levels, areas, walls and objects. In addition, notes can be viewed and edited or otherwise associated with any particular object.

Figure 34:
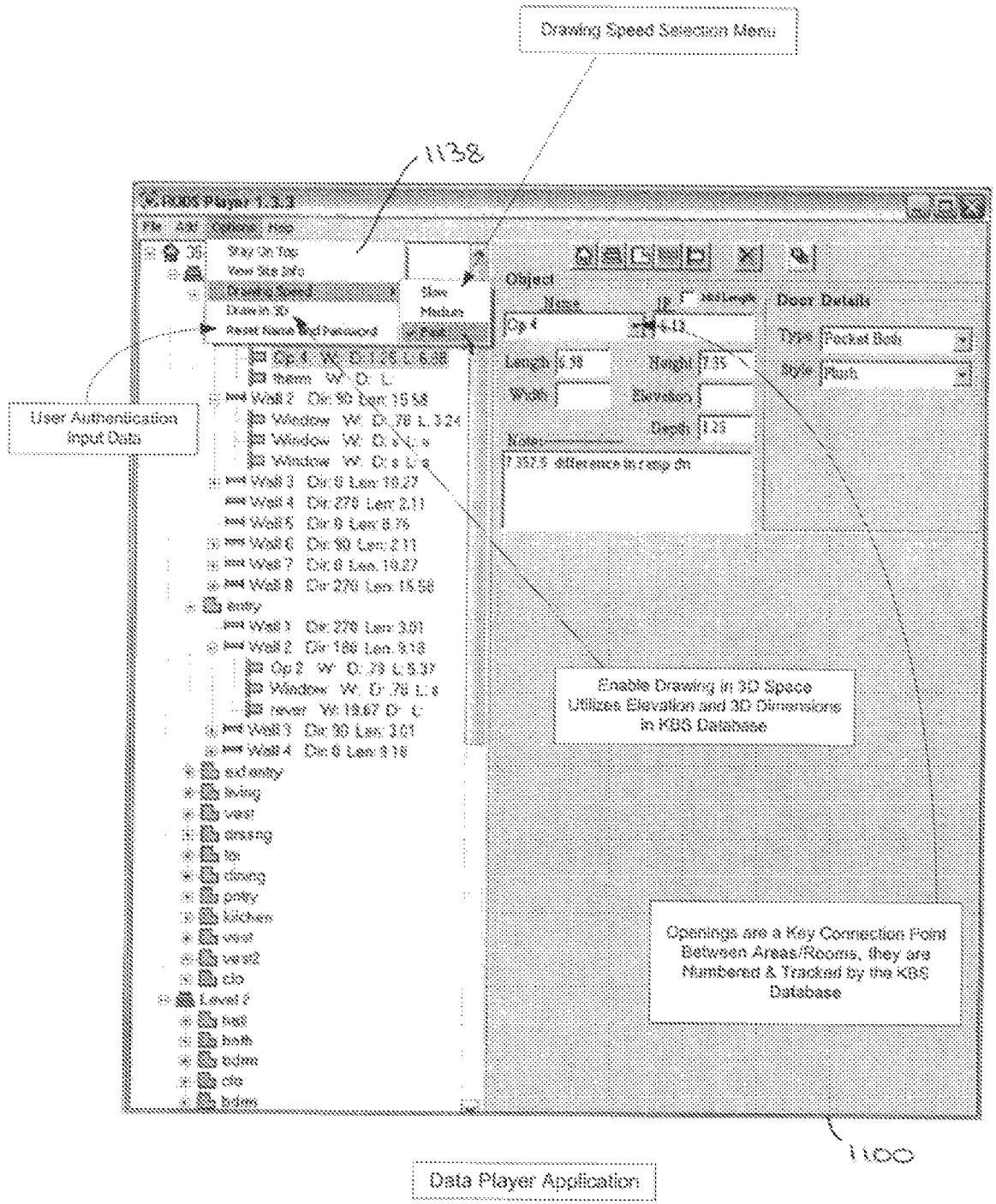
FIG. 34 illustrates an alternate view of the player application interface in accordance with an embodiment of the invention.

FIG. 34 illustrates an alternate view of the player application interface in accordance with an embodiment of the invention. As shown in FIG. 34, the player includes a pull down menu 1138 that can be used to control various player features such as drawing speed and three dimensional drawing.

Figure 35:
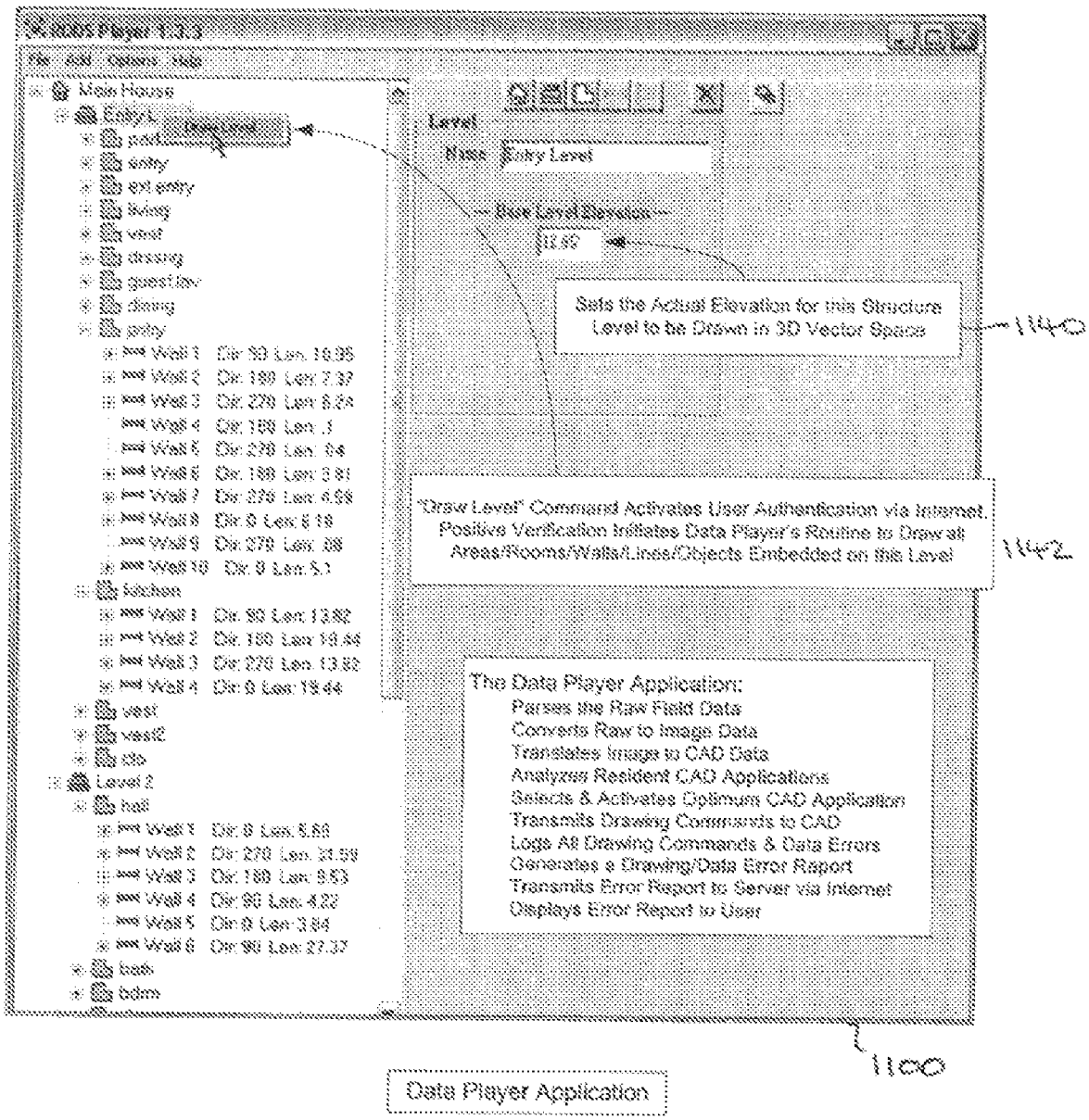
FIG. 35 illustrates an alternate view of the player application interface in accordance with an embodiment of the invention.

FIG. 35 illustrates an alternate view of the player application interface in accordance with an embodiment of the invention. As shown in FIG. 35, the operator may set base level elevations 1140 with any particular level which are then used in creating drawings. A draw level command 1142 can be used to initiate the data players routine to draw all areas, rooms, walls, lines and objects embedded therein. When the draw level command is activated, the data player application parses the raw field data, converts the raw data to image data, translates the image data to CAD data, analyzes resident CAD applications, selects and activates the optimum CAD application, transmits drawing commands to the CAD application, loads all drawing commands and data errors, generates a drawing data error report, transmits error reports to the server via, for example, the Internet, and displays the error report to the user. It will evident that while the steps described above are used in one embodiment of the invention, other embodiments and implementations may use different steps or may vary the sequence of the steps to best suit the needs of the application.

Figure 36:
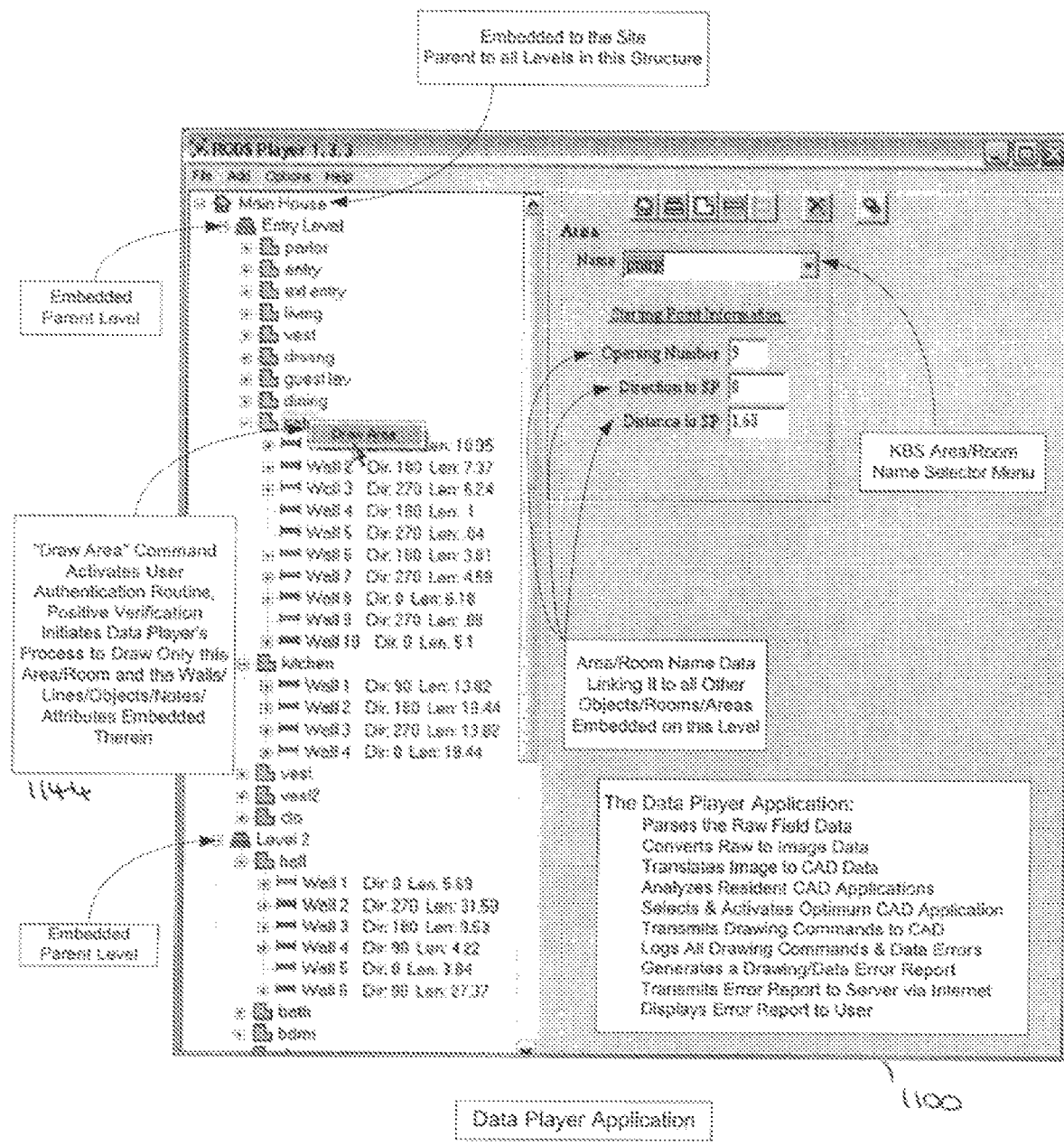
FIG. 36 illustrates an alternate view of the data player interface in accordance with an embodiment of the invention.

FIG. 36 illustrates an alternate view of the data player interface in accordance with an embodiment of the invention. As shown in FIG. 36, a draw area command 1144 can be used to activate any user or authentication routines and draw only the area or room within this particular area of the hierarchy.

Figure 37:
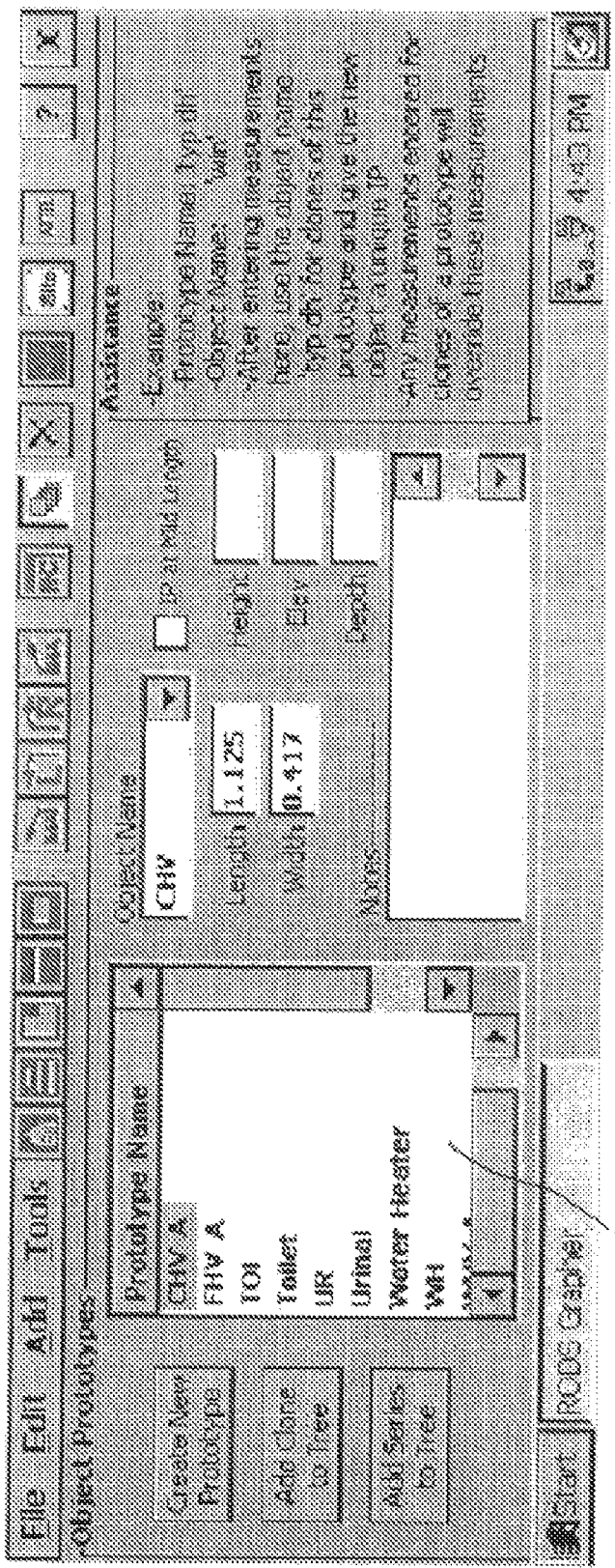
FIG. 37 illustrates how in accordance with one embodiment of the invention, the object prototype library can be defined using a user programmable interface.

FIG. 37 illustrates how in accordance with one embodiment of the invention, the object prototype library can be defined using a user programmable interface. As shown in FIG. 37, new prototypes 1034, i.e., objects can be added for use with the system. The object is typically given an object name, and associated values such as length, width, height, elevation, and depth. Once added the objects can be used by the operator in recording measurements.

Figure 38:
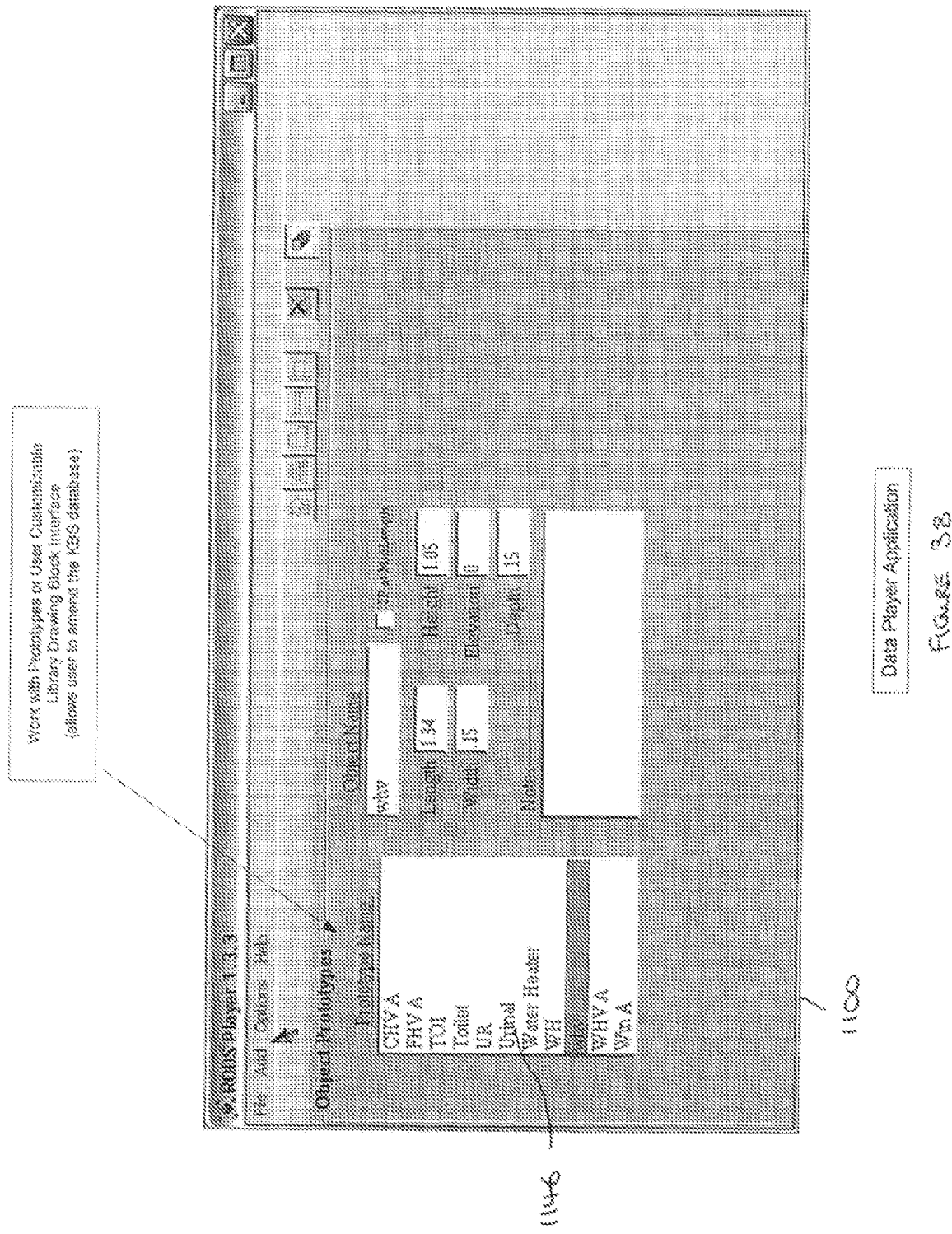
FIG. 38 illustrates a view of the player application interface in which the user can work with the prototypes or user customizable library objects.

FIG. 38 illustrates a view of the player application interface in which the user can work with the prototypes 1146 or user customizable library objects. As shown in FIG. 38, the object prototype includes a number of custom objects together with associated values.

Figure 39:
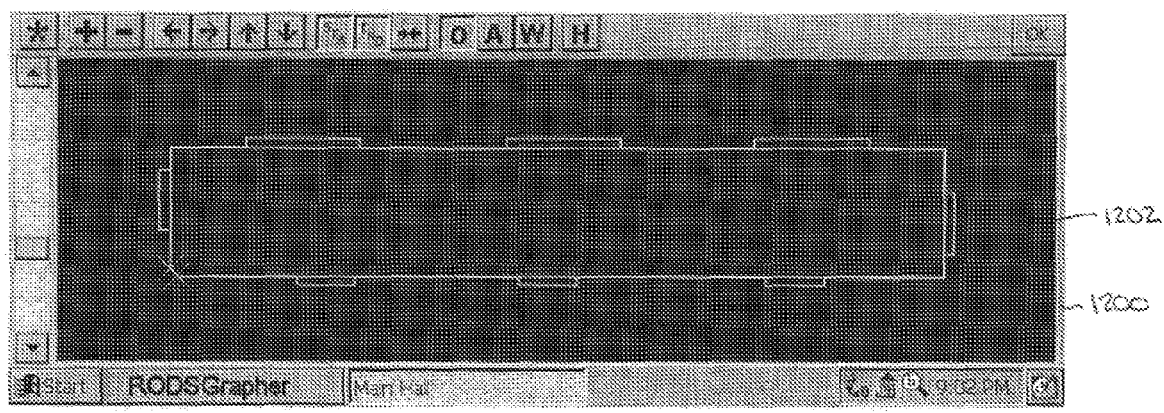
FIG. 39 illustrates a view of the Grapher application as it used to draw an area.

FIG. 39 illustrates a view of the Grapher application as it used to draw an area or prepare a measured drawing. As shown in FIG. 39, the Grapher application includes an area draw interface 1200, that when activated by the operator passes all data entries, or a selection of data entries, included in the current hierarchy of data objects, and displays 1202 the data objects on the screen to allow the operator to view the current area and to make adjustments or correct errors.

Figure 40:
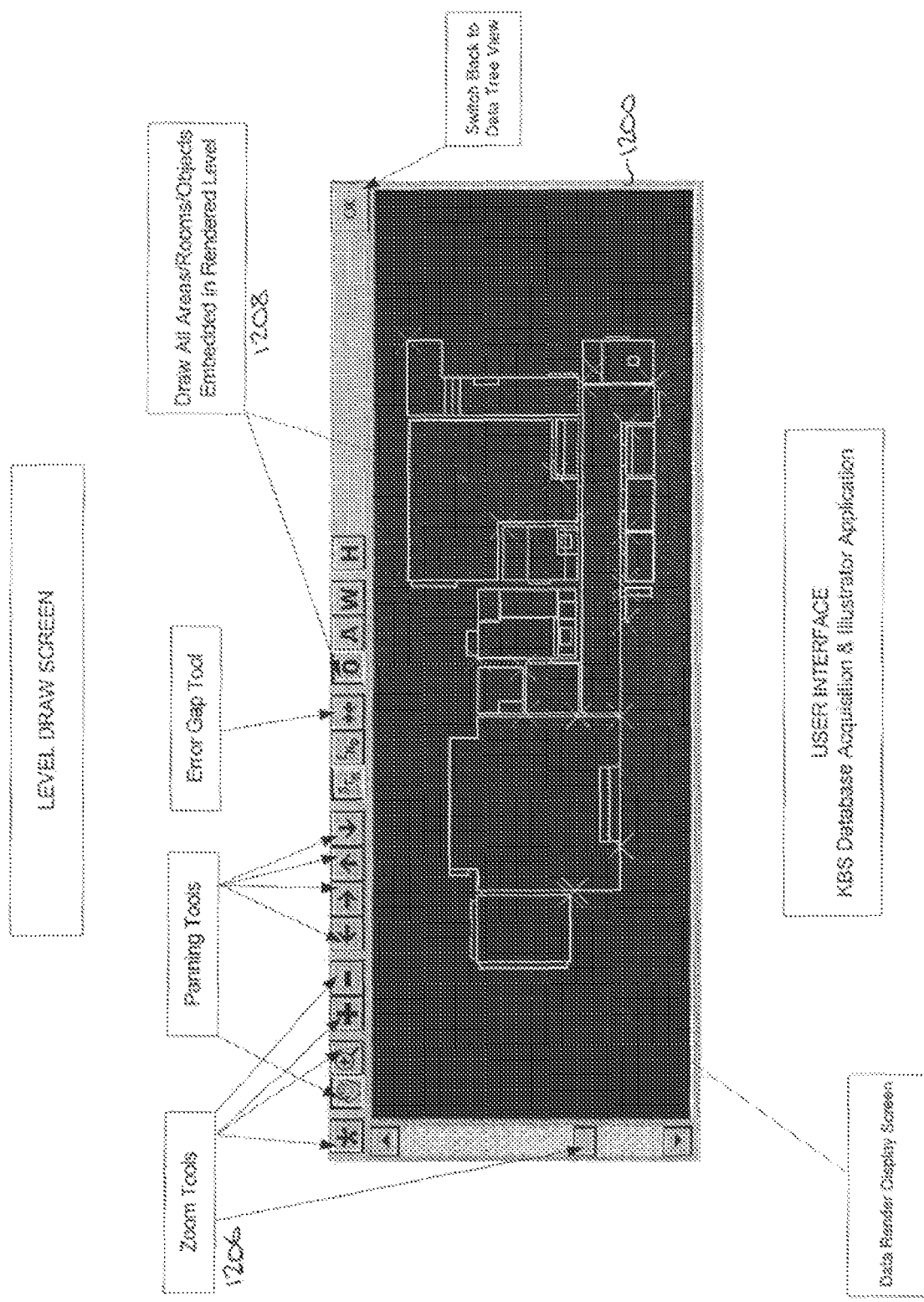
FIG. 40 illustrates an alternate view of the area or level draw interface as it is used to draw a level.

FIG. 40 illustrates an alternate view of the area or level draw interface as it is used to draw a level. As shown in FIG. 40, the user interface for the level draw feature includes a number of icons 1206 that allow the operator to zoom, pan, or calculate gap errors. An additional set of icons 1208 allow the operator to select various areas, rooms, and or objects for further drawing.

Figure 41:
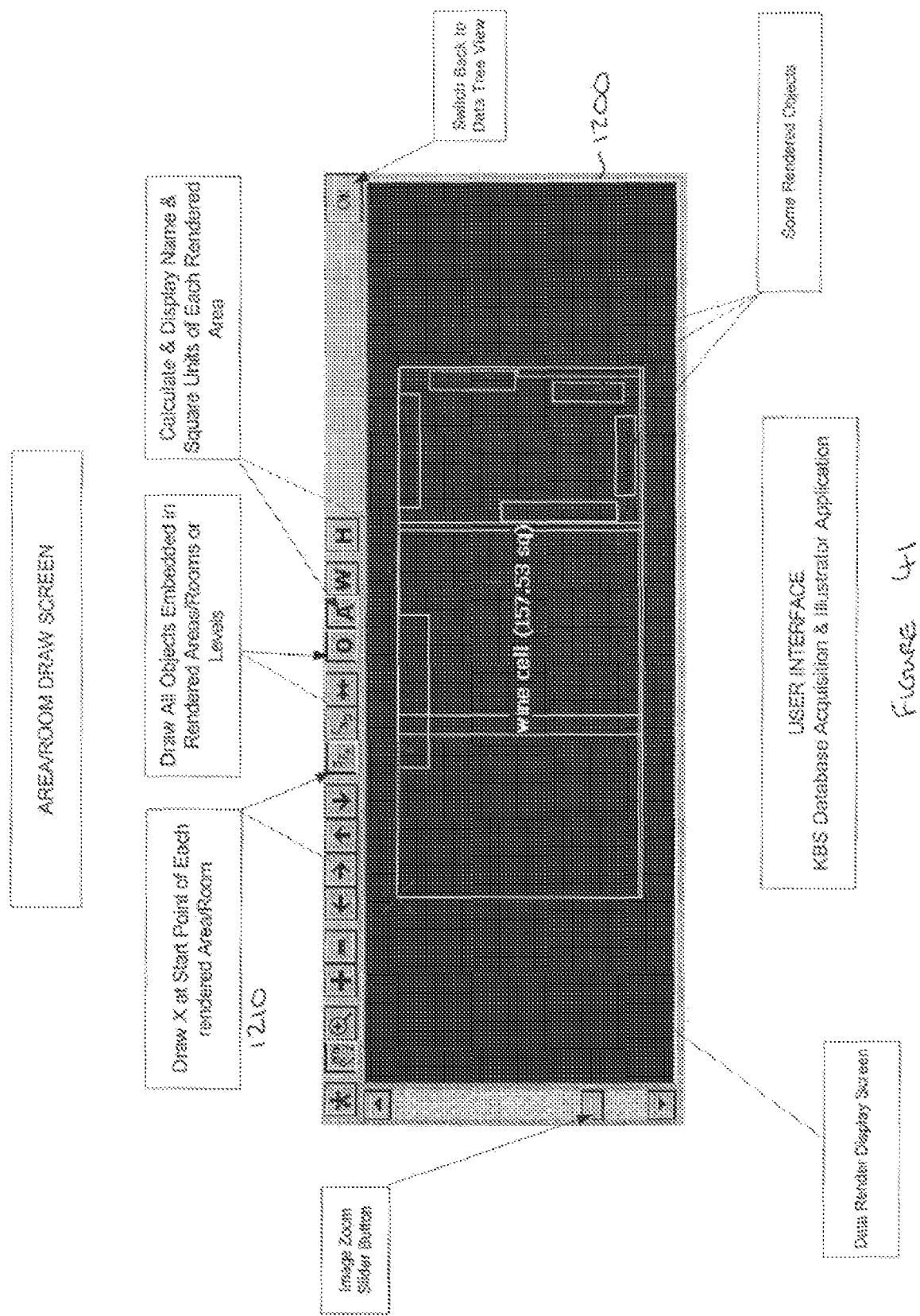
FIG. 41 illustrates and alternate view of the area or level draw interface as it is used to draw an area.

FIG. 41 illustrates and alternate view of the area or level draw interface as it is used to draw an area. Again, the interface includes image, zoom, and slider buttons to allow the operator to move around the display. An additional series of icons 1210 allow the operator to, for example, draw an exit start point of each rendered area or room, draw all objects embedded in the rendered areas or rooms, or calculate and display the name and square units of each rendered area. This information is particularly useful for the operator in the field so that they can check their work, i.e., the accuracy of the recording of the data, while they are still in the field, so that they can get a quick estimate as to what has been recorded correctly and what may need to be rechecked before returning to the office.

Figure 42:
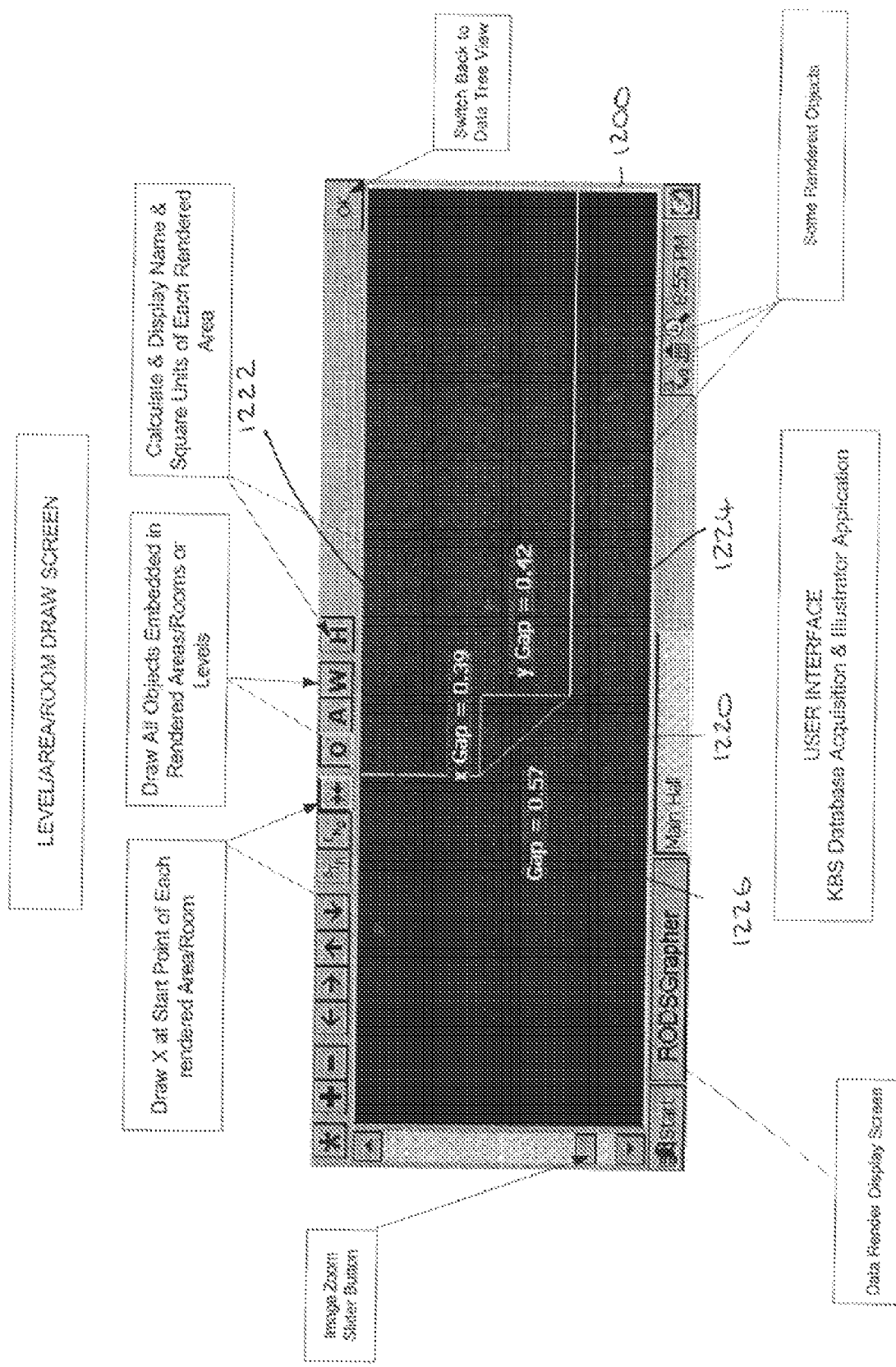
FIG. 42 illustrates an alternate view if the level or area draw feature as it used to perform a gap error analysis.

FIG. 42 illustrates an alternate view of the level or area draw feature as it used to perform a gap error analysis 1220. As shown in FIG. 42, areas in which these recorded objects that do not join correctly can be reflected on the drawing screen as a gap between the objects. The gap error device can be used to calculate a measure of the gap both in x 1222 and y 1224 coordinates, and as a measure of the gap in total 1226. This information can then be used by the operator to judge which item might have been measured incorrectly and which may need to be rechecked.

Figure 43:
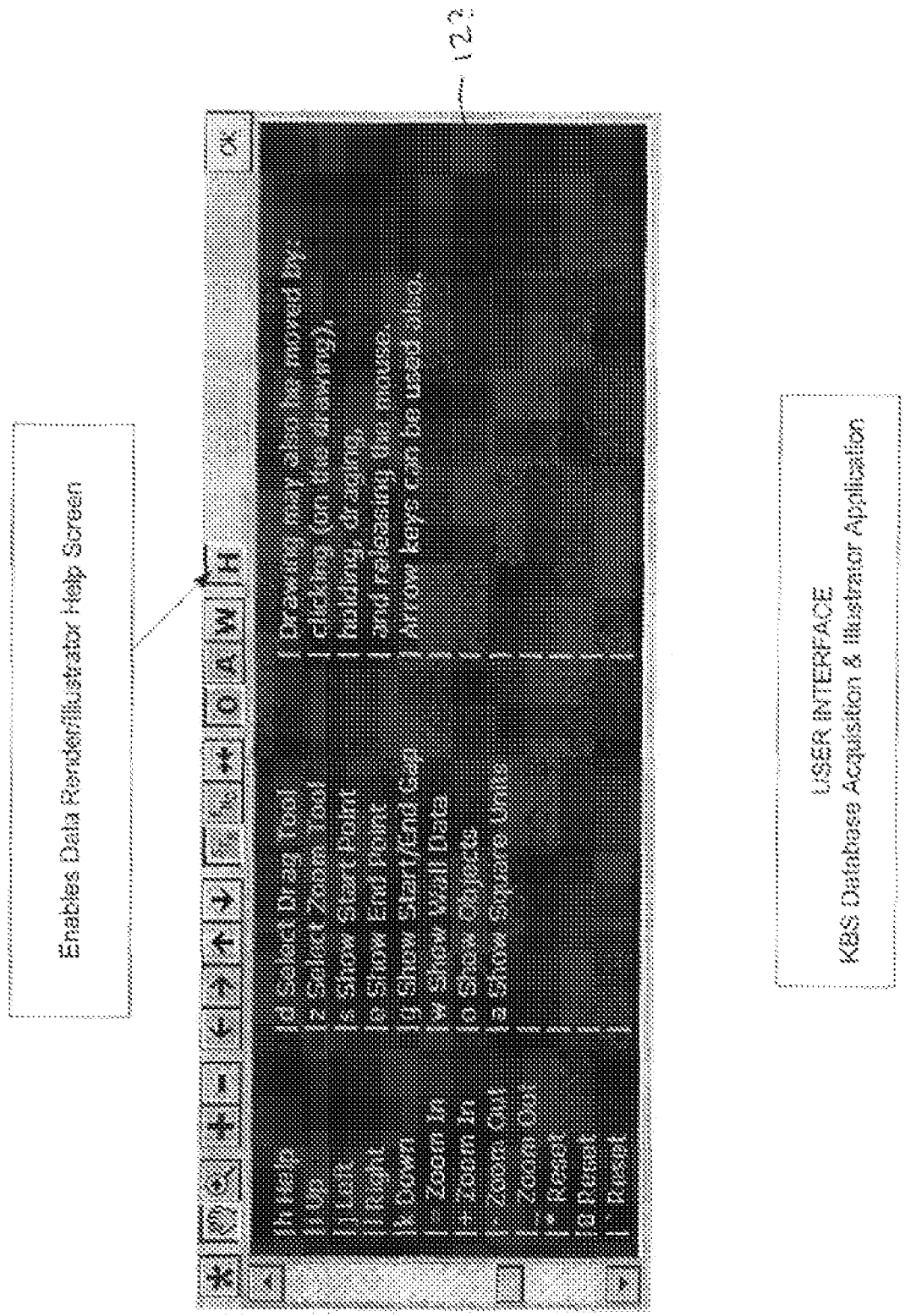
FIG. 43 illustrates a help screen that is typically provided with the Grapher user interface that assists the operator in quickly finding available commands and options for use with the system.

FIG. 43 illustrates a help screen 1230 that is typically provided with the Grapher user interface that assists the operator in quickly finding available commands and options for use with the system.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMs, microdrive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, authorizing a user to work with the application or a specific project file, retrieving user measurement data via a portable data recording device, automatically performing processing functions to parse said data, translating said data into a format suitable for display, displaying the data to allow a user to view an approximation of their recorded data, minimizing the error of the data measurements throughout the set of recorded data, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

The foregoing description of the present invention has been provided for the purposes of illustration and description. It is not intended to be exhaustive or to limit the invention to the precise forms disclosed. Many modifications and variations will be apparent to practitioners skilled in this art. In particular, it will be obvious that the present invention may be employed in areas and applications other than those related to the creation of as-built or measured drawings, i.e. to other forms of data collection and survey that are best represented by relational linking, and to other systems that benefit from the use of a distributed authorization or login procedure. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for recording data for use in creating measured drawings of a building, site, or structure, comprising the steps of:
    acquiring, either automatically by a portable data recording device or as user input into the portable data recording device, a sequence of data describing the components of a building, site, or structure, including any of the levels, spaces, or objects contained therein, wherein for a particular component the data describing the particular component includes at least a partial placement, orientation, or dimension information that relates the particular component to a previously acquired component in the sequence;
    automatically determining a remaining placement, orientation or dimension information for the particular component; and
    storing the data describing the components into the portable data recording device as a plurality of hierarchically linked data entries, so that the data can be subsequently retrieved and parsed to create a measured drawing of the building, site, or structure.

2. The method of claim 1 further comprising the steps of:
    parsing the plurality of data entries, using a knowledge base, to create a set of parsed data describing the physical layout and dimensions of the building, site or structure components;
    converting the parsed data to image render data duplicating the physical layout and dimensions of the levels, spaces, or objects; and,
    translating the set of rendered data into a drawing component syntax format suitable for use by a computer aided drawing application.

3. The method of claim 2 further comprising the steps of:
    drawing the translated data for verification, editing and output as a completed measured drawing of the building, site, or structure.

4. The method of claim 3 further comprising the steps of:
    exporting the measured drawing of the building and its components to a file or directly to another computer aided drawing application.

5. The method of claim 1 wherein the step of acquiring data includes using a knowledge base to intelligently infer data and mandate user input compliance.

6. The method of claim 1 wherein the step of receiving data includes determining for a first level, space, or object, a component type and a set of measured values associated with the physical attributes of the first level, space, or object.

7. The method of claim 6 wherein the component type is any of a level, area, room, wall, line, or object of the building, site or structure.

8. The method of claim 2 wherein the step of parsing comprises:
    accessing a data entry in the database;
    reading the component type of the level, space, object, or component defined by the data entry;
    reading the measured values of the level, space, object, or component defined by the data entry;
    reading the relationship of the first level, space, object, or component to a second level, space, object, or component; and
    determining the physical attributes of the level, space, object, or component, and the relative spatial location of the level, space, object, or component with respect to a second level, space, object, or component.

9. The method of claim 8 wherein the step of determining includes referencing a knowledge base of components wherein the knowledge base includes an entry for the component type, and wherein the entry defines how the physical attributes of the level, space, object, or component are related to the measured values of each level, space, object, or component.

10. The method of claim 9 wherein the knowledge base includes drawing attributes of each level, space, object, or component that are used in creating a drawing containing the level, space, object, or component.

11. The method of claim 10 wherein the step of translating includes:
    generating commands to a drawing program communicating the physical attributes of the level, space, object, or component, the relative spatial location of the level, space, object, or component, and the drawing attributes of the level, space, object, or component.

12. The method of claim 1, further comprising the steps of:
    outputting a drawing of the building and its components.

13. The method of claim 12 wherein the drawing is a drawing of a level of the building.

14. The method of claim 13 wherein the step of receiving data includes the steps of:
    determining a first level, space, object, or component of the building, including:
        associating a component type with the first level, space, object, or component,
        measuring a physical attribute of the first level, space, object, or component, and
        determining a coordinate location of the first level, space, object, or component,
    relative to a fixed origin; and
    determining a second level, space, object, or component of the building, including:
        associating a component type with the second level, space, object, or component,
        measuring a physical attribute of the second level, space, object, or component, and
        determining a coordinate location of the first level, space, object, or component, relative to the second level, space, object, or component.

15. The method of claim 14 wherein the step of outputting includes:
    displaying the components on a graphical screen to represent the spatial location and dimensions of the components as collected in the data.

16. A system for creating measured drawings of a structure comprising:
    a portable data recorder device that allows an operator to record information about the content and layout of objects in a building structure, the portable data recorder including:

a data interface that enables automatic acquiring of data or allows a user to enter a sequence of data describing the components of a building, site, or structure, including any of the levels, spaces, or objects contained therein, wherein for a particular component the data describing the particular component includes at least a partial placement, orientation, or dimension information that relates that component to a previously acquired component in the sequence;

a knowledge base that automatically determines a remaining placement, orientation or dimension information for the particular component; and a data storage that stores the data describing the components as a plurality of hierarchically linked data entries, so that the data entries can be subsequently retrieved and parsed to create measured drawings.

17. The system of claim 16 further comprising:
a login interface to authorize a user to access the system.

18. The system of claim 16 wherein the input interface includes a touch-sensitive pad.

19. The system of claim 16 wherein the input interface may be used to connect an automatic measuring device to the recording device for the communication of measurement data.

20. The system of claim 19 wherein the automatic measuring device is a laser plane device with distance measurement logic.

* * * * *